(12) United States Patent
Amijee

(10) Patent No.: US 9,477,380 B2
(45) Date of Patent: Oct. 25, 2016

(54) SYSTEMS AND METHODS FOR CREATING AND SHARING NONLINEAR SLIDE-BASED MUTLIMEDIA PRESENTATIONS AND VISUAL DISCUSSIONS COMPRISING COMPLEX STORY PATHS AND DYNAMIC SLIDE OBJECTS

(71) Applicant: Afzal Amijee, Cary, NC (US)

(72) Inventor: Afzal Amijee, Cary, NC (US)

( * ) Notice: Subject to any disclaimer, the term of this patent is extended or adjusted under 35 U.S.C. 154(b) by 0 days.

(21) Appl. No.: 14/101,031

(22) Filed: Dec. 9, 2013

(65) Prior Publication Data

US 2014/0282013 A1 Sep. 18, 2014

Related U.S. Application Data

(60) Provisional application No. 61/801,971, filed on Mar. 15, 2013.

(51) Int. Cl.
*G06F 3/00* (2006.01)
*G06F 3/0482* (2013.01)
*G06F 17/30* (2006.01)

(52) U.S. Cl.
CPC ....... *G06F 3/0482* (2013.01); *G06F 17/30056* (2013.01)

(58) Field of Classification Search
CPC .................. G06F 17/30056; G06F 3/0482
USPC ....................................................... 715/732
See application file for complete search history.

(56) References Cited

U.S. PATENT DOCUMENTS

| | | | |
|---|---|---|---|
| 7,500,197 B2* | 3/2009 | Whitmarsh et al. | 715/744 |
| 2003/0018663 A1* | 1/2003 | Cornette et al. | 707/500.1 |
| 2003/0192049 A1* | 10/2003 | Schneider et al. | 725/51 |
| 2005/0069225 A1* | 3/2005 | Schneider et al. | 382/305 |
| 2005/0071736 A1* | 3/2005 | Schneider et al. | 715/500 |
| 2007/0168413 A1* | 7/2007 | Barletta et al. | 709/203 |
| 2008/0162430 A1* | 7/2008 | Gossweiler et al. | 707/3 |
| 2009/0132441 A1* | 5/2009 | Muller et al. | 706/11 |
| 2009/0164939 A1* | 6/2009 | Ishimitsu et al. | 715/805 |
| 2012/0089914 A1* | 4/2012 | Holt et al. | 715/728 |
| 2015/0177928 A1* | 6/2015 | Holt | 715/214 |

\* cited by examiner

*Primary Examiner* — William Titcomb
(74) *Attorney, Agent, or Firm* — Williams Intellectual Property

(57) ABSTRACT

The invention provides computer-implemented means for engaging in visual discussions of slide-based multimedia content comprising nonlinear and complex, multidimensional data structures which convey narratives to one or more members of an audience, said data structures comprising visual depictions of slide content displayed as discrete pages linked according to spatial and temporal relationships and portrayed in a virtual discussion space, wherein said visual depictions comprise proportional and accurate, interactive graphical representations of said data structures. Multiple parties using mobile devices and individually distinguishable identities may participate in the generation and editing of said data structures in said visual discussion space, thereby participating in said virtual discussions; and a plurality of advantageous means for navigating among and controlling the behavior of virtual slides therein are provided.

24 Claims, 23 Drawing Sheets

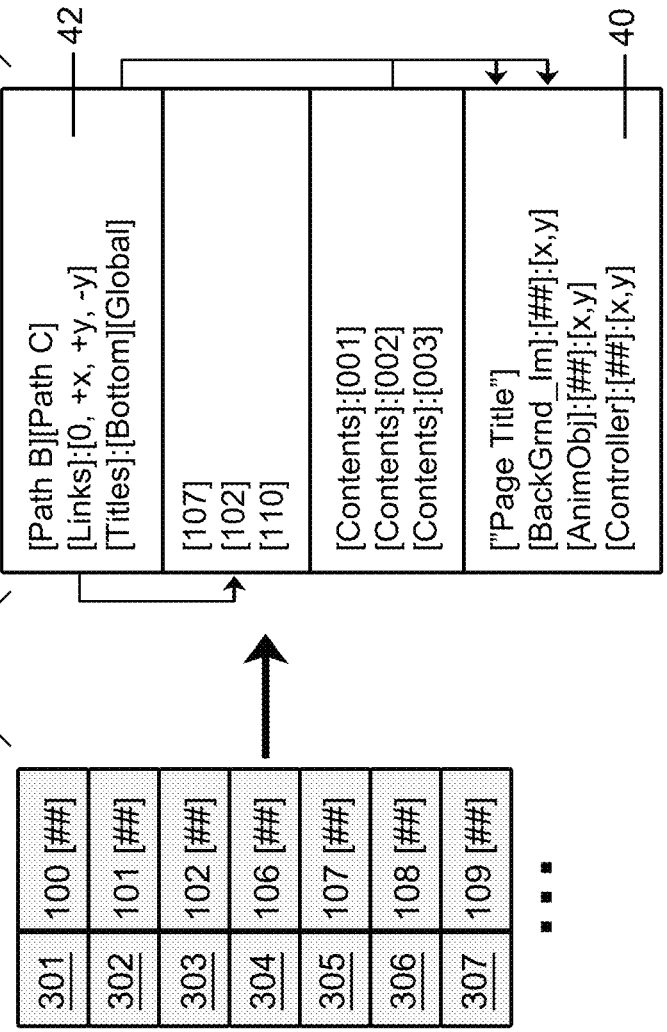

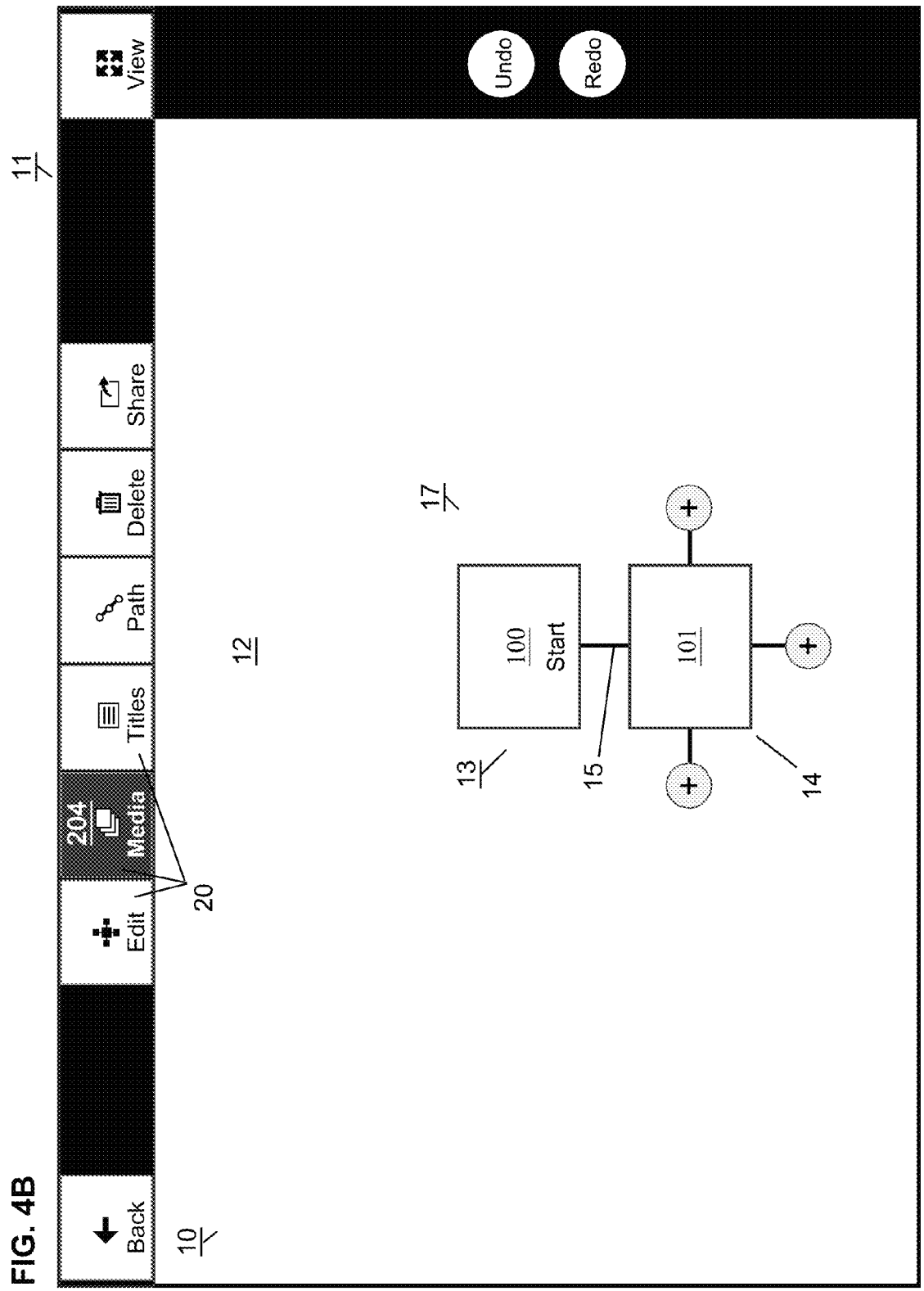

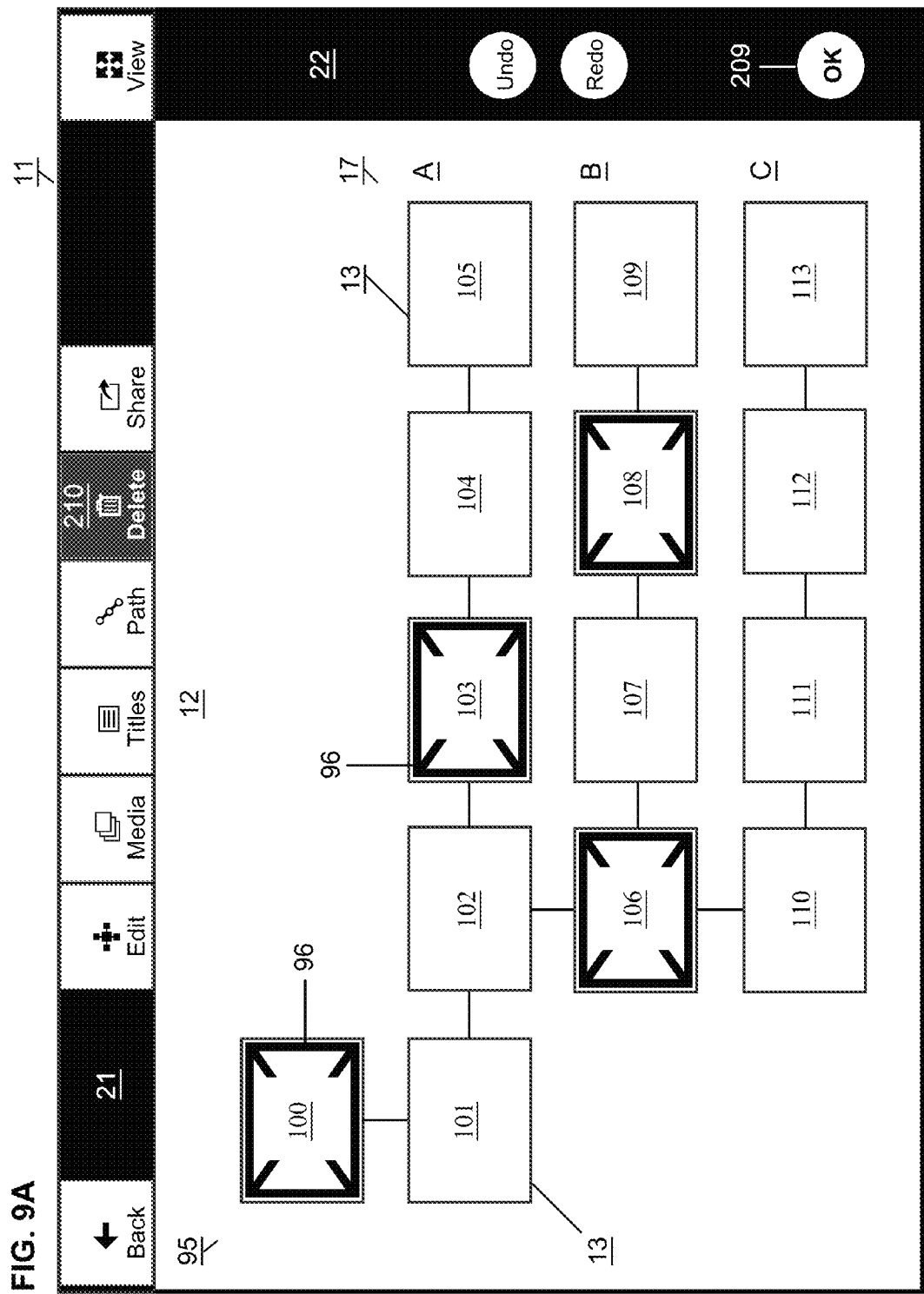

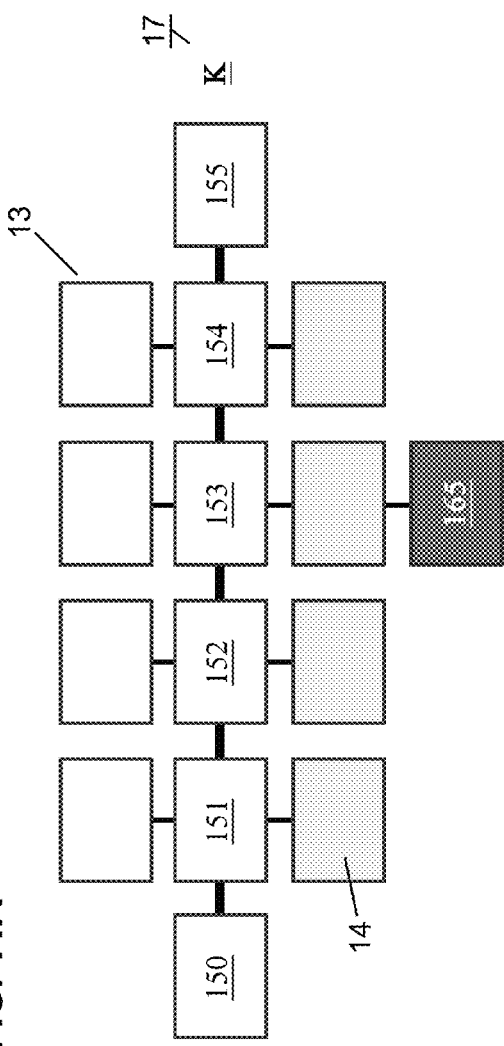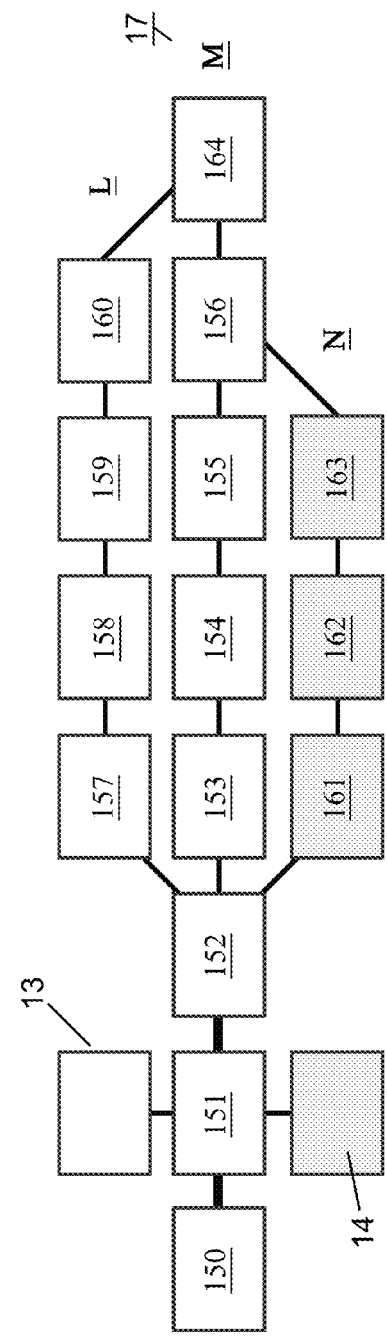
FIG. 11A
FIG. 11B

SYSTEMS AND METHODS FOR CREATING AND SHARING NONLINEAR SLIDE-BASED MUTLIMEDIA PRESENTATIONS AND VISUAL DISCUSSIONS COMPRISING COMPLEX STORY PATHS AND DYNAMIC SLIDE OBJECTS

This is a Nonprovisional Application for letters patent claiming the benefits of U.S. Provisional Application No. 61/801,971, filed on Mar. 15, 2013, entitled, "Interactive Nonlinear Story Presentation Software," the entirety of which is hereby incorporated by reference.

FIELD OF THE INVENTION

The present invention relates to computer-implemented systems and methods for generating and publishing slide-based narratives, somewhat related to digital slide shows, but wherein slide objects form dynamic and nonlinear data structures portrayed in a virtual graphical environment and presented as visual discussions of a topic embodied by said data structure(s); and more specifically, to platforms and software products enabling the creation, management, and sharing of collections of slide objects that are linked together in dynamic and nonlinear story paths that are graphically represented and displayed in a navigable virtual environment defining a multidimensional "visual discussion space" wherein said story paths provide a visual means for representing spatial and temporal relationships among component concepts within one or more broader narratives or topics.

DESCRIPTION OF THE RELATED ART

The following review of related art is intended to provide edifying examples of problems and pitfalls in the design and use of computer-implemented slide-based presentation systems, methods, and software. The mention of these examples does not constitute an admission that any of the following methods or devices constitute prior art applicable to the present invention. The discussion of the references states what their authors assert, and the applicant reserves the right to challenge the accuracy and pertinency of any of the documents cited herein.
Multimedia Presentation Platforms and Programs The state of the art in multimedia presentation platforms, which can be defined for example as digital and/or computer-supported means that enable a person to present a lecture, seminar, slideshow, performance or other organized display of information (a "presentation") to an audience, relies upon a decades-old paradigm: a linear mode of unilateral communication in which a prearranged linear series of slides, comprising a stack or queue of discrete slide images, is displayed via an audio/video output means in consecutive linear sequence via a presentation software program, while a presenter controls a means for commanding the program to transition from a presently displayed slide to the next slide in said series. The "slide" analogy is a legacy from the preceding state of the art which used actual slides developed from 35 mm film, arranged in a rotating carousel, projected by a slide projector onto a presentation screen via a light source and a projection lens in the slide projector. The limited navigation controls of the prior art are another legacy from the era prior to the mainstream use of mobile communications and touch-responsive input means (i.e., "touch-screens").

Slideshow presentations have traditionally derived their utility as a means for distilling a narrative of information, such as a sales pitch or educational lecture, into a series of easily-digestible slides displayed one-at-a-time in consecutive order, which series was typically presented to an audience in conjunction with a scripted narrative delivered by a presenter. Presentations via computerized means were developed so that slide presentations could be made using a desktop or laptop computer equipped with a presentation application program and an external display, such as a projector or a large monitor, and so that digital images could be used instead of actual slide film. Presentation software of the prior art have created an expectation among both presenters and audience members that a performance shall be a monologue and that the performed monologue shall deliver a rigidly scripted narrative having a beginning, and one path leading to one predetermined ending. Although some developers have attempted to impart flexibility to this paradigm, they have failed, to the detriment especially of the educational and business-meeting fields. The framework of these prior art applications simply was not designed to accommodate the mobile digital age.

In prior art slide-based presentation software applications, typically, the presenter has access to a user interface of the presentation program on a master terminal (e.g., a laptop or other computer apparatus), whereby he or she can access various some features of the software, but extensive manipulation by the presenter typically cannot occur during the actual performance of a presentation, because it is first necessary to exit the program's "presentation mode" in order to access the main user interface. While in presentation mode, the presenter is typically limited in the scope of his or her control over the slideshow to skipping either forwards or backwards by one step in the series of slides. The 2013 version of PowerPoint includes an adaptation in its "Presenter View" feature which finally allows the presenter to see his or her notes, or to see a different view, while the audience still sees only the Presentation View being performed (PowerPoint is a trademark of the Microsoft Corporation, of Redmond, Wash.), but this patch suffers from its remaining bound by the same old underlying presentation paradigm. PowerPoint 2013 has also added a "Jump to a slide" feature controlled by a "Slide Navigator" feature permitting the presenter to browse to other slides in the presentation, either by scanning forwards or backwards through the linear sequence of the unidimensional slide queue or by viewing a set of thumbnails and clicking manually on a desired slide, but it does not enable the multidimensional linking of these thumbnails nor the creation of complex story paths through a slide library, nor does it provide a navigation means for moving seamlessly throughout a slide collection at any time, even during a presentation. Microsoft's "PowerPoint" dominates the market in this arena of the art, while "Keynote" is very similar program adapted for the Apple platform.
Slide Editing and Content Slides of the prior art have advanced slightly, in that they can have layers analogous to those in an illustration software such as Illustrator and PhotoShop (Adobe, Inc.), wherein, for example, a text object can be overlaid upon an image object. But conventional presentation programs have always been poor at handling interactive content, such as websites and animations, or files which required execution of another software application, like Spreadsheets (requiring Excel, for example) and multimedia content, like MP4 files (requiring Quicktime, for example) without launching an external program. Scripts provided by third party vendors like those provided by Flash (Adobe, Inc.) are not always integrated into these presentation platforms, so there are risks associated with attempting to launch other external programs offering greater functionality during a slideshow whenever using the prior art products, because doing so is likely to disrupt the linear presentation flow of the slideshow, or worse, to stall and/or crash the platform altogether. Although some presentation programs now accommodate APIs and means for allowing external applications to interface with slides to varying extents, they have not succeeded in solving these problems reliably. See, for example, US Pat App. Pub. No. 20090265632 to Russ et al., entitled, "Non-Linear Presentation Canvas," published Oct. 22, 2009.

Sharing and Publishing

In the corporate environment, slideshows are often conducted over a network to a distributed audience scattered among a variety of remote locations, and a number of specialized "virtual meeting" and "web-conferencing" applications have been developed that incorporate prior art methods for providing slideshow content into their platforms. Basically, these applications allow for the unilateral delivery of slide presentation to remote audience members in a streaming audio-video feed, while separately a telephonic or chat-based conference is taking place. The insufficiency of these and other prior art products to satisfy the creativity and needs of consumers is evidenced by an increasing proliferation of third-party "add ons" or plugins for presentation programs which can be used in parallel with slide presentation platforms. For example, one plug-in of the prior art allows PowerPoint slideshows to be exported as a Flash animation or PDF document, thus making delivery through removable media or publishing on the Internet easier. It would be ideal if the presentation software itself offered power and diverse functionality in the arenas of sharing and publishing, and the present invention addresses this unmet need in revolutionary ways.

Visual Design Systems

Slides of the prior are generally comprise components such as text, images, HTML pages, or documents which can be added and removed by the designer prior to the presentation. Slides are analogized to containers which may be atomic (e.g. these which cannot be decomposed into sub-components), or complex (e.g., which can contain one or more other sub-components). Some containers of the prior art, such as a general-purpose "area" container for example, provided in U.S. Pat. App. Pub No. 20130238977, filed Mar. 6, 2013, entitled "Method and System for Master-Page Based Integrated Editing and Dynamic Layout Activation," can contain components of multiple types, and some containers are limited to containing only specific types or classes of contained components (such as photo album container which may only contain picture files). Container components can be nested to a number of levels, but because the presentation mode is based upon the linear progression through a slide stack, the most common resort for presenters is to avoid including many elements on a single slide, but rather to create more slides. This diminishes the efficiency by which audience members maintain a conceptual visualization of the topic being presented because a first sub-concept may require ten slides to discuss before a second sub-concept may be addressed in the linear progression through the queue. It would be preferable if there were means for enabling audience-members to skip around through the presentation, and for presenters to alternate between parallel sections of a presentation while showing the entire layout of the topic as they navigate, rather than having a single linear path that after being presented is irretrievable thereafter unless the presenter backs up in the presentation by skipping backwards through the slide queue one-at-a-time. The present invention provides novel means for accomplishing such dynamic presentation schemes, including those that enable audience members to navigate through a slide collection independently of the presenter but while still confined to the story structures provided by the presenter.

Business Presentations

Presentation programs are useful for communicating business information. In prior art products, participants in a meeting can view the presentation on a display while remotely located participants may be able to establish a network connection that enables them to view the presentation remotely. Both local and remotely located meeting participants are typically provided the same view of the presentation, which is the current focus of the current presenter. In a representative invention, a number of client computers are configured with a presentation client application. A server computer is also provided that is configured with a presentation server application. The presentation server application is configured to maintain and synchronize a presentation state among the client computers. The presentation state might include a presentation, presentation collateral, notes, questions, an attendee list, chat data, annotations, and/or other information. In other embodiments, a peer-to-peer network might be utilized to synchronize the presentation state between the client computers rather than a server computer. Other mechanisms might also be utilized to render a presentation file for remote viewing through a mobile device. These applications all rely upon external networking infrastructure and logic, being conformed to the prior art methods thereof rather than taking control of these networking and sharing modes via proprietary and integrated means. In contrast, the present invention advantageously provides an independent Player/Viewer software platform to enable the slide collection platform to operate independently for multiple audience members, on mobile devices, and to remote participants, while using the proprietary logic and interfaces of the platform of the invention.

Alternative Approaches

Microsoft Corp.'s U.S. Pat. App. No. 2009/0265632 to Russ et al., entitled: "Non-Linear Presentation Canvas" describes an alternative to PowerPoint's linear slide queue paradigm which, in the configuration mode, comprises a single slide of infinite length and width, which they refer to as "the canvas." On each canvas, a user can attempt to generate a "presentation" by inserting multimedia files, documents, hyperlinks, text, and nested workspaces onto a "non-linear presentation canvas, which provides a virtually infinite workspace." But this language overpromises the described functionality and does not truly output multimedia presentation content. The only product on the market incorporating this paradigm to date is Microsoft's "Visio" program. According to the disclosure, "the non-linear presentation canvas is a virtual space," which means one single compartment, as opposed to the present invention which provides a true virtual environment having a distinctive user interface. Although useful for generating reports, charts, and posters, this paradigm has failed to be adapted for effective utility in the multimedia presentation market, and is particularly unfavored for live performances, particularly because it is extraordinarily cumbersome to create new content and to place it in the canvas amongst the existing content previously made and arranged there.

Distinguished from Dynamic Graphics (a.k.a. "Smart Art")

Dynamic graphics are a means for assembling repeating modular graphics elements into groups or charts, which potentially include an unlimited number of modular graphics elements in any given smart art structure. Dynamic graphics allow users to easily create sophisticated and highly polished graphic diagrams that include textual or numeric data. Each successive modular element can be dynamically added, positioned, and sized; and any number of text items (0 . . . N) may appear in each modular elements/shape. One type of dynamic graphic is a tree diagram in which new shapes are dynamically added, sized, and positioned each time a new data module element is added to the diagram. This paradigm facilitates the creation of complex charts and diagrams, but is not a means for creating multimedia presentations.

Barriers to Innovation in the Prior Art

Innovation in the field of presentation software has been hamstrung, not only because early market-dominant products gained monopoly control and kept it (e.g., PowerPoint), but even more so because they had been modeled on the old bricks-and-mortar paradigm wherein a presentation constituted the sequential and transitory display of lifeless slide objects confined to a linear queue (analogous to a rotating slide carriage holding 35 mm slides, each slide comprising one image). Furthermore, the way in which previous file formats are created and structured to store a collection of graphical surfaces, typically called a presentation, has several drawbacks. For instance, previous presentation file formats are created in the form of a single file containing inseparable elements (e.g., the component slides and slide contents are not individually transferable outside of the platform or even outside of a presentation file, notoriously as in Microsoft's ".ppt" file format). Because proprietary formats are generally used to create these single files, each company that builds presentation platforms develops a different file format. Because the data within these different file formats is monolithic and inaccessible in its discrete parts, slideshow presentation programs are poorly integrated with and have not evolved apace of social media platforms and trends; social media products dominate the Internet today and their use occupies a large portion of the time spent by individuals online, representing a massive untapped market for novel concepts in slide-based multimedia presentation applications.

Being restricted by the prior art to a linear and unilateral mode of communication has several major drawbacks. For example, a presenter is unable to adapt gracefully to unexpected or changing conditions during, or shortly before, her performance if it turns out she has miscalculated the optimal sequence and composition of her slideshow. Spontaneous discussion and other forms of audience participation are discouraged by the rigidity of the linear format, and the presenter is unable to harness much feedback from the audience, particularly as it relates to individual attention levels or opinions about particular elements within a slideshow. More importantly, linear communication is inherently deficient because it does not resonate with the non-linear cognitive mechanisms that constitute the human mind. Neural networks inherently seek to link new concepts to multiple related and unrelated concepts in nonlinear patterns. Ideal human conversation entails both parties sending and receiving information simultaneously without any functional or structural barriers preventing instant access to any particular piece of information (i.e., any "slide"). One idea or slide may be logically related to many others, and in different ways or to varying degrees, but in a linear data structure none of these relationships can be represented.

The Insufficiency of the Linear Monologue Paradigm

In light of the above, there exists a need for improved slide-based presentation platforms, systems, software, and methods, that are more modular, dynamic, flexible, and interactive. A new paradigm is required not only for improving the art of performing live presentations given from one presenter to one audience, but also for distributing and personalizing presentation content among remote parties and heterogeneous audiences, as well as individually identified persons therein, particularly via mobile networks, social media platforms, and the Internet. There exists a vast reservoir of untapped power and functionality applicable to presentation software for both personal and professional uses. Unlike the prior art, software of the present invention enables the easy and intuitive creation of nonlinear and dynamic narratives having multiple intersecting and overlapping story paths within one slide collection; and unlike the slide queues created by the prior art programs, created in their disjointed slide creation environments within a cumbersome software platform, the slide collections of the present invention comprise slide-based structures controlled by intuitive touch-sensitive commands which are viewable and navigable in an interactive virtual reality, such that slides may be arranged and linked spatially in ways that are representative of their logical relationships, and such that multiple alternative presentations may be provided simultaneously in one slide collection, wherein edits and additions can be made in seconds and there is no barrier between the presentation mode and the rest of the platform (e.g., there is no sequestering of the edit mode or slide-creation environment from the presentation and performance environment).

Now, creators and presenters of multimedia content and other narratives comprised of discrete pages may share, perform, and discuss their creations with real-time control and total flexibly, more engagingly and dynamically, using the tools of the present invention in ways that could never be achieved using the prior art, said prior art being wholly and irredeemably based upon a linear and/or monologue paradigm comprising the creation of slide presentations in which slides are linked by static and one-dimensional connections to each other and then straight-jacketed within a monolithic "presentation file" format.

So while the prior art merely enables a presenter to deliver uni-directional monologues to an undifferentiated audience, the present invention enables true dialogue involving two-way communication, alternative story paths, real-time modifications of slide sequences using touch-responsive or "touch screen" controls, and even "multilogues:" wherein different members of an audience receive different data structures to view and are enabled to provide personalized responses and feedback relating thereto. The platform of the present invention comprises software tools that allow presentations to be performed from a computer through a projector to an audience as did the prior art, but advantageously, presentations via the platform of the invention may also be performed directly within the virtual graphical environment of a software application without the need for a separate and static "presentation mode," and this avoids the necessity to prepare and adhere to lifeless slide sequences made by the presenter a priori of the performance (which is an insurmountable drawback of the prior art paradigm), and furthermore this enables the slide collection to be represented and discussed as a visual depiction of slide-based concepts in an interactive visual discussion space where the slide collection and its organization actually represent and reinforce the logical relationships among slide objects and story paths. Moreover, the present invention is advantageously designed based on logic for mobile devices and tablet PCs, rather than the PC, mouse and keyboard of the prior era.

The present invention also abolishes the use of inflexible "slide presentation files" (such as the .ppt file that predominated in the prior art), but instead enables the modular output and sharing of slide collections and data structures for use and viewing by others according to a virtually unlimited range of presenter-specifiable options. The invention makes it easy to create slide objects almost instantly and to connect them into complex paths or intercalate them into existing presentation data structures, using logic not found in prior art presentation tools, which thereby enables users to rapidly communicate and interact during discussions of content, to record and share these discussions, and to distribute them as media content within the software platform of the invention as well as outside in third party platforms, including social media and business meeting/conference environments, according to features explained in more detail herein below. And, rapid slide creation tools grab content from almost anywhere and from almost any file type and conform it to the data structures of the present invention to create story paths and update slide pages quickly, even automatically.

In the real world, discussions of concepts within a broad topic move rapidly from one focus to the next, and prior art tools have never been able to accommodate this interactivity nor keep up with its fast pace. Presenters impose their content on the audience in a monologue, and there is no effective means for accommodating the diverse interests and educational levels of individual members thereof. The present invention provides the first truly interactive and modular platform for delivering slide-based presentations that are dialogues, even multilogues, wherein the presenter's comments are delivered simultaneously with a visual representation of the narrative and its data structure, and whereby audience members may explore such content individually according to their interest or need, so that multiple parallel channels of communication are established all at once, enabling a new type of presentation paradigm: a "visual discussion." Using dynamic slide objects and modular slide-based data structures distributed on a software platform that provides both presenter and audience with access to one virtual visual environment wherein slide objects are arranged and explorable, the invention delivers flexible and portable means for engaging other people in multilateral, context-rich, visual dialogues and multilogues. Rather than a mere slideshow software, the present invention is a mobile visual discussion engine.

SUMMARY OF THE INVENTION

The present invention provides these and other improvements over the prior art, chiefly by providing systems and methods for generating and publishing nonlinear slide-based multimedia presentations that sidestep the genre of the "slide show" and usher presenters into the mobile digital age using a novel paradigm that can more appropriately be called the "visual discussion." This summary of the present disclosure will first outline individual features underlying this novel paradigm, and second, will illustrate the collective results of their implementation in some practical examples of the invention being used to deliver powerful new varieties of slide-based multimedia presentations (a. k. a., "discussions," or "performances") before turning to the detailed descriptions of the several drawings.

The principal presentation software program of the platform of the present invention has been developed for optimum use on tablet computing devices or other computing means having a touch-responsive input means (e.g., a "touch-screen"), whereby presenters and participants may engage in dynamic discussions of topics or narratives comprising visually-represented content and visually-expressed relationships among component concepts and subtopics, permitting true dialogue instead of the rigidly scripted monologues of the prior art. The invention's intuitive organizational tools, nonlinear story path creation capabilities, and touch-responsive multi-dimensional navigation means enable the visually displayed slide contents of a presentation, which comprise individual slides and their particular linkage relationships and even the slide collection data structure as a whole, to keep pace with discussions in real time, without requiring strict linear adherence to any previously-planned presentation script. Furthermore, the graphical representation of the story map itself contributes content to the narrative of the presentation. In particular, the present invention provides computer-implemented platforms and software products enabling the creation, management, visualizing, discussing, and sharing of presentations comprising slide objects, as well as groupings of slide objects, which are linked together in complex story paths, where said story paths provide a graphical, interactive, and dynamic means for representing and analyzing relationships among component concepts within one or more broader narratives or topics. Various supporting tools of the invention enable the integration of responsive real-world data into story data structures comprising, for example, presentation feedback from audience-members, discussion dialogue, on-the-fly editing choices made by a presenter, and streaming content regularly updated by content providers either inside or outside of the platform. Extensive mobile and networked implementations of the software programs are also provided.

Generally, the term "multimedia" as it relates to the present invention comprises a plurality of discrete slide objects organized into complex, interactive and dynamic data structures whose organization and content are visible in a virtual graphical environment comprising a visual discussion space (a. k. a. "stage area"), said discussion space in preferred embodiments providing a 3D virtual reality comprising images of slide objects and their linkage relationships arranged according to a grid system, such as a Cartesian or coordinate grid system comprising x, y, and z dimensions. As part of this environment, novel navigation control means for exploring a slide collection in multiple dimensions and perspectives (e.g., levels of detail and/or zoom) have also been developed and utilize intuitive touch-sensitive commands, thus enhancing the sense of actually being in a virtual space and interacting with a visual manifestation of the narrative(s) being presented therein, and also thus enhancing the speed and fluidity of real-time narrative presentations among groups of participants. The invention differs from prior art products that comprise a grid-based canvass area for organizing graphics in a planar presentation space, such as Microsoft's "Visio," because the present invention applies story paths comprising actual linkage data structures to the grid, whether as a lone story path or a complicated story map, and because the data structure is itself an interactive entity that dynamically adapts as a whole to changes made in any part of it. Rather than arranging objects on a canvass to form a rigid and disjointed chart, the present invention enables the visualization of an accurate and proportional graphical representation of a narrative, based on its underlying data structure, by providing a means for depicting said data structure and then by artificial intelligence assigning the objects therein to the grid of the visual discussion space, where they can be directly manipulated, edited, and presented to the world in real time or in recorded performances. The invention provides visual tools and controls for interactively presenting and discussing topics to diverse audiences and individuals, topics which are not merely described in slides but are also described by the visual representation of the slides' relationships to each other both positionally and sequentially in the visual discussion space. The invention provides these tools through novel presentation software applications, comprising a developers' presentation software package on the one hand and a portable Player/Viewer module on the other hand, in the preferred embodiments, but also offering other advantageous means for presenting, publishing, and sharing content, as explained more fully herein below.

In most preferred embodiments, the presentation or performance to the audience takes place in this same visual discussion space wherein it is created, rather than by the prior art paradigm that requires the execution and output of a rigid linear slideshow routine via a distinct "presentation file." However, the invention does provide for the output of slideshow objects and movies based on automated presentations of a slide collection, as well as means for recording activity in real time as it occurs in a presentation space and then packaging said activity history into a share-able or viewable presentation output object.

In fact, the present invention is replete with features, designed from the bottom up, to enhance and emphasize the modularity, portability, share-ability, interactivity, flexibility, and idiosyncratic utility (e.g., customization options) of said slide objects and data structures, which provide the fundamental units of a presentation, like building blocks, so that almost any combination of story structures and slide behaviors, publication schemes and visual formats, can be combined by any individual presenter to deliver a performance that best suits their particular topic and audience under any set of circumstances. For example, embodiments of the present invention comprise subservient applications which can be distributed to an audience and controlled by a presenter, said applications comprising for example one or more Viewer/Player modules that individual audience members my download onto any mobile electronic or personal computer in order to participate in visual discussions hosted on a server or by a networked presenter from her own computing device, wherein said audience may receive all or part of the slide data structures of the presentation, or receive supplemental content to enhance and buttress the presentation, and even receive means for contributing content and feedback to the presentation and/or the presenter. Advantageously, this feedback feature comprises means for capturing and recording audience-member feedback automatically, for example by evaluating any individual's activity during their engagement with the program, as explained more fully herein below. These and other tools of the invention provide means for engaging in multilateral visual discussions, or multilogues, in part by creating a dynamic and network-accessible visual discussion space, the sum of which enables both presenters and audiences, even individuals or groups within audiences, to interact with and respond to presentation content in ways not possible using platforms of the prior art. Thus, using the software products of the invention (which may be marketed under the tradename "tabloMedia") any multimedia presenter, developer, or performer can create content that includes features not previously available in commercial presentation software products, particularly by providing applications of the software adapted for efficient use on mobile electronic devices, and also by providing the option to deliver a presentation live while also (even simultaneously) providing the same presentation for the audience to peruse and interact with independently on their own personal electronic devices, anywhere and at any time, and for any extended amount of time. Thus, not only does the invention create a visual discussion space enabling unprecedented narrative freedom and a new mobile communication platform, but it also creates living presentations that can be updated and evolved over lifespans that are theoretically unlimited.

The present invention provides unprecedented power and utility in its graphical user interface, enabling presenters to assemble content quickly from multiple and diverse sources (such as the included media libraries, external drives and libraries; the Internet and the Cloud); to create and edit narratives by dragging and dropping content into slide objects, and slide objects into data structures, and story paths into slide collections, within one virtual graphical environment. A presenter can instantly created and edit multiple alternative and intersecting story paths through the pages of a slide collection using the fingertips (on a touchscreen-capable device) and/or with the assistance of an artificial intelligence (by the included editing tools and slide-linking means). These novel means for creating intelligently-designed slide arrangements and story paths in slide collections, using interactive and intuitive touch-responsive graphical controls, combine to generate a novel type of presentation delivery mechanism altogether, where one can see both the forest and the trees, and where the relationships that one sees are logically meaningful and contribute content to the presentation that the prior art cannot provide.

Now these many features will be recited and defined individually, while letters will be used as alphanumeric identifiers, e.g., (a)-(z), for helping to distinguishing each feature from the others (but these distinctions via alphanumeric identifiers should not be construed as limiting in any way, nor should the omission of any feature in the list of lettered features be regarded as a nullification of that feature as a patentable element of the invention, but rather as only for facilitating description herein). See table 1 below for a quick-reference index summarizing these features and their corresponding alphanumeric identifiers.

Advantageous Features of the New Paradigm

The invention provides numerous improvements over the prior art, prominently via novel systems and methods for generating, manipulating, sharing, and visualizing slide objects, and data structures comprising slide objects, including story paths and slide collections; wherein, (a) a slide object is a data structure representing a distinct collection of information for display as a page on a computer screen or other audio-video output device, somewhat analogous to a "slide" of the prior art, but comprising more dynamic behaviors; and wherein a (b) slide collection comprises at least one data structure wherein two or more slide objects are arranged in a spatial relation to each other, and wherein (c) story paths are data structures within a slide collection defined by user-specified (d) story links that may connect any slide to any other in a particular sequential order, not limited to a linear sequence, but able to accommodate multiply branching, nonlinear, complex and dynamic arrangements. A slide collection, which itself constitutes a data structure, may comprise an array of slide objects each having one or more links (e.g., pointers, references, addresses) connecting it to one or more others such that one or more story paths traverse the slide collection to make one or more continuous narratives therein, and such that the (e) presentation of a story comprises the sequential display of the slide objects in one or more story paths within a slide collection, for example, or more broadly: a presentation can be defined as a performance taking place in the visual discussion space where a graphical representation of the slide collection data structure with its linkage relationships is depicted, for example; and wherein a slide collection may comprise more than one story path, and may comprise more than one layer of slide objects and story paths, such that a sequence of linked slide objects in a slide collection may have alternative beginning and ending points, and may traverse a virtual space of a slide collection in two or more geometric dimensions.

The capacity of the present invention to generate a plurality of complex, dynamic, and interactive story paths in a single slide collection arises from distinct features of the data structures underlying the slide object element, including (f) logic encoding linking means for linking slide objects, which linking means enable the creation of story paths that may branch via an unlimited number of ramifications at any slide object (i.e., node, position, point, slide, etc.); said features being supported by a novel (g) graphical user interface for visualizing and manipulating a slide objects and slide collections and novel (h) means for navigating slide collections and slide presentations in multiple dimensions, such as within a coordinate grid system corresponding to the visual layout of a slide collection along at least an x-axis and a y-axis, but also optionally along a z-axis and even more complex architectures. This navigation may be controlled solely by the presenter, or may include (i) means for distributing all or some of a slide collection to an audience for their independent viewing and navigation on a (j) stand-alone Viewer/Player module of the software platform of the invention, which in turn may comprise (k) means for collecting and recording feedback comprising behavior and comments from individually identified audience members during a presentation or during their interaction with said distributed content back to the presenter. The modules enabling such distribution, and/or the individual presentations viewed on the platform, and/or files types of the present invention, may be referred to as a (l) "TABLO," or in the plural, "TABLOs" as a shorthand reference to the putative product name "tabloMedia." Generally, a TABLO is a means for packaging story paths and slide objects into modular data files that may be shared among tabloMedia platform applications and their users, or published outside of the platform in third-party applications such as websites and social media, wherein the contents are separable and may be independent of the file container and even the platform itself. The platform also allows for inclusion within various parts of the graphical interface and data structures of (m) annotations and presenter notes, which, in addition to audience feedback or other commentary may be incorporated into the data structures associated with such interactive presentations, so that rearrangement of slides also re-arranges the order of an associated dialogue file or of the annotations in presenters' notes.

The utility of the present invention as a slide-based presentation platform supersedes the prior art not only because it allows for dynamic, interactive and complex story paths, but also because it enables the (n) graphical representation of the slide collection itself to be useful as a means for presenting information in a visual format, for example, when a presenter builds a slide collection data structure that can itself be used to visually display the relationships among a group of concepts wherein each of said concepts is encapsulated in one slide object and visible as one "page image" in the visual discussion space. A presentation of the invention is thus enabled to visually convey at least two distinct forms of narrative information simultaneously, said narrative information comprising a first direct form conveyed by the sequentially displayed pages of one or more story paths, and a second inherent form conveyed by an accurately and proportionally recapitulated geometric simulation of a given slide collection data structure, whereby the conceptual relatedness and/or logical relationship among any two or more displayed pages in the grid is inferred from the relative spatial proximity of said displayed pages in the grid, as well as from their linkage relationships in the spatio-temporal context of the slide collection as a visualized whole. In other words, the invention enables presentations in which ideas take shape in living bodies made from interconnected pages. This utility is particularly advantageous in fields like the research sciences and long-term projects where complex models cannot easily be assimilated unless they are broken down into groupings and hierarchies of related component concepts, where the relationships are defined by links created in a flexible and logically-representative manner, and where a data structure may be too large and complex to be fully comprehended without an easily-assembled and easily-edited visual model to play with. And, by providing one virtual environment in which a slide collection can be created, edited, and presented in a performance (live or digitally recorded by the software of the invention), there is no need for a suffocating "presentation mode" as there is in the prior art. And, very advantageously, multiple individual presentations can be generated from one slide collection data structure by choosing alternate paths, and therefore it is never necessary to create multiple or redundant presentation files on the same topic as it is presented to different audiences over time.

The feature of the "story path" in the present invention is sharply contrasted with the prior art concept of a slide deck (a. k. a. slide stack, queue, carriage, or other prior art synonyms), in that a story path is a dynamic and complex data structure having unique linking capabilities, including multiple links (e.g., story links extending from one slide object in at least the four cardinal directions of the visual discussion space) and comprising a plurality of (o) link descriptors, such as a directionality parameter, and/or a dimensionality parameter, and/or an ordinal value representing a position in a numeric sequence of pages, and so on, where said descriptors are may be variables stored in the slide object data structures as part of the linking means. For example, an ordinal link descriptor may identify whether a link is the first or second order of a preferred departure path from a slide object, and for example, a plurality of link-type identifiers may classify a link as of a special type such as "start," "end," "contingent," "dynamic," "branching," "hub," and such. Classification and type identifiers may also be assigned to slide objects. Therefore, instead of the presenter being limited to narrating a story by traversing a rigid and linear slide slide deck forwards or backwards, as in the prior art, the presenter using the present invention may choose to include nodes in a story path whereby the story may turn right, left, up, or down, higher or lower, and such, into different narrative terrain than if an alternative route had been taken, and including only certain types of links and slide objects, depending upon the circumstances during a presentation. Alternative story paths may be designated by the presenter before a presentation or elected on the fly (and recorded for later retrieval from memory, for example, by saving the impromptu order of presentation as a new data structure overlaid upon the old), and the presenter need not worry about getting "lost in the wilderness" because she is not straying but rather proceeding down a planned alternative route, or a structured emergency escape route. Users may automate the preferred path of a presentation through a slide collection by assigning priority values to links whenever multiple link options proceed forth from a node slide object, such as by creating multiple overlapping story paths which may not individually branch but which effectively combine to create a nonlinear story map, or by any creative use of animated and automated behaviors that can be applied to slide data structures. One example might be a pop-up prompt requesting the audience to choose what they want to hear about next. The invention not only permits such maneuvers but offers macros to execute them quickly and efficiently; for example, numerous command options are provided in the controls of the GUI comprising various specific (p) navigation controls and commands, examples of which may include functions for creating the "hub connector," the "line path," the "tree," the "jump," and the "wheel and spokes" data structures which will be described later in detail.

In summary, a slide collection comprises a plurality of slide objects represented in computer memory by a slide collection data structure but visualized in the software environment as a physical arrangement of discrete "pages" occupying specific positions in a graphical virtual environment and having specifically assigned relationships to each other forming one or more story paths therein, whereby a person may create, edit, manage, navigate in, publish, and present narratives that comprise: multiple story paths, complex story paths, intersecting story paths, recursive story paths, and/or story paths having dynamic (e.g., optional, contingent, varying, automated) slide sequences. Any of these story paths may be prepared a priori or they may be generated on the fly during a presentation, for example, based upon navigation decisions made during the progression of the narrative to the audience, or based on feedback from members of an audience. Rapid and in some cases automated page-creation tools allow new slide objects to be created and inserted on the fly, even by multiple parties at once, thus enabling a true "visual discussion" of a topic. What is even more revolutionary, is that a distinct "viewer" or "player" application, script, or module of the invention can be distributed to audience members allowing them to navigate through a TABLO (which as introduced above in item (l) is a portable file, and which may be associated with the novel file type ".tab"), or to navigate in certain regions thereof, independently while the presenter leads a discussion of the slide collection; and furthermore, it allows the audience members' and/or discussion participants' movement through the slide collection to be monitored, stored, and returned to the slide presenter for immediate and future analysis of metrics relating to audience participation, interest, and attention. This is accomplished, for example, via the means for collecting and recording feedback introduced as feature (k) above.

A further advantage of the present invention, is that slide objects, story paths, and the other data structures created by the presentation program can be created, managed, and shared independently of any master presentation file, because the TABLO file is modular and cross-platform-compatible according to best practices of the mobile digital marketplace of today, being heavily influenced by Cloud-based computing and social media APIs, and it also may be shared independently of any slide collection, for example, when a TABLO comprises only one or more slide objects or story paths, for insertion into another slide collection rather than as a presentation itself, or for publishing or distribution in online forums and marketplaces, libraries and other means for sharing content on the world wide web. Because the invention defines said data objects as discrete independent entities that can be individually moved and shared, or moved and shared as groups having linking relationships therein, they are specially adapted for cross-platform use and easily conformable for integration with any venue in any online community, marketplace, or other creative application. And the TABLO provides a transparent vehicle for delivering any of these modular data structures along with instructions for a particular end use, whether it be for controlled and monitored playback on an audience member's specifically identified network connection using the software of the present invention, or for incorporation into any third party platform wherever multimedia content is shared, traded, bought, sold, and published.

Additionally and advantageously, the present invention provides novel concepts and solutions responsive to the unique opportunities and challenges that arise from the nonlinear paradigm, which concepts and solutions comprise: (q) logic for resolving conflicts in data structures caused by adding and inserting new slide objects between existing slide objects in a complex story path or slide collection data structure; control means for enabling the convenient use of a touch-screen via a graphical user interface to create complex hubs, jumps, and other branching mechanisms which can be overlaid onto a parallel layer above any of these data structures; and specialized means for visualizing and navigating a non-linear slide collection while it is represented graphically in a virtual reality.

For example, the invention provides a (r) navigation control means for intuitively navigating through a visual representation of a slide collection. In preferred embodiments, a navigation control means comprises a control object depicted in the graphical user interface and resembling an interactive compass, wherein said compass feature may allow a user to move about the slide objects of a slide collection in up to six or more directions (along each coordinate axis of the x, y, and z planes of a three-dimensional coordinate system) while simultaneously providing information about the user's current position in the data structure with regard to the relative depth and pan, for example, of a position (i.e., of a currently selected/displayed slide object) within the data structure, and while allowing further control of the zoom and perspective of a virtual "camera" control that governs the view of the grid in the virtual discussion space. The output means of the present invention may comprise any method or device for displaying multimedia content to a person, and may also comprise one or more network communication means for transmitting and receiving user generated content to/from other systems and devices, such as those connected to the Internet or a local area network, or on a cellular network, any wireless networks, and the like, as understood by persons of ordinary skill in the art of digital communications.

Fundamentally, the present invention provides specialized data structures comprising discrete objects and modules, said data structures having distinct identities, whether they be individual slide objects or complex story paths, which data structure identities may be further refined by the inclusion of additional content and parameters. For example, slide objects may contain contents that impart artificial intelligence and self-modifying behaviors to them and associated data structures, for example, slide objects may comprise slide content data that are programmed to receive RSS feeds or regular updates from an outside source, or that make navigation decisions based on any conceivable criteria. The invention is, from an abstract standpoint, a means for building and discussing concepts out of virtual building blocks where the shape and behavior of the building blocks is highly customizable, and wherein all the building blocks are interactive and dynamically related to the others, and they each occupy a meaningful spatio-temporal position in the visualization of the presented content that reflects relationships and meanings established by the unique construction of the data structure(s). A slide object is essentially a data structure representing a conceptual module, sometimes called a container by persons familiar with the relevant arts, which comprises a means for storing or referencing a plurality of data items collectively referred to as "slide content" such as text strings, graphics, images, animations, media files, controls and executable code, hyperlinks, shells for opening third-party software, and anything else desirable to include in a page of a presentation during its visual discussion, as well as a means for controlling the display of the slide object itself as it appears during the presentation of a story (such as links determining the path options available to and from other slide objects, automated transition graphics, timeline information, display resolutions and codecs, etc.). Slide objects and TABLOs may comprise logic governing their use and activity within the software and platform of the invention, or on external and third party platforms, where for example such code would be responsible for integrating and formatting said data structures as appropriate for the particular API of said third party provider. The term "slide object" is therefore used broadly herein, in order to distinguish it as a genus comprising more species than that which may traditionally have been associated with the term "slide."

Thus, it is an objective of the present invention to provide systems and methods that enable a presenter (e.g., anyone using the platform to create, present, perform, develop, manage, edit, discuss, share, or publish content) to generate a multimedia presentation comprising one or more nonlinear series of slide objects/page images linked to each other by story links, wherein a presenter may assemble data structures for visualizing concepts, and wherein said data structures may adopt complex arrangements such that more than one path can be traversed from the beginning to the end of one slide collection, or of any group of slides within a slide collection, even in real-time while performing or publishing a multimedia presentation. Furthermore, these story paths need not be linear, but they may branch and intersect within a two-dimensional, three-dimensional, or more complex coordinate geometry; and, audience members may independently navigate through the slide collection, and provide feedback to the presenter about their behavior and impressions while doing so, via scripts encoded in TABLOs or any other sharing options, mobile discussion means, annotation means, and visual discussion tools of the invention.

It is another objective of the present invention to provide a platform for visually organizing, analyzing, and discussing discrete concepts in a graphical format, where each slide object generates a visible page that portrays a discrete concept that is a component of a particular broad topic governing the slide collection or a story path therein. The invention facilitates visual discussions of these structures within a virtual graphical environment comprising an accurate and proportional portrayal of the topic in a visual discussion space which can be easily and intuitively explored, modified, and presented to others, and optionally in partnership with others; and wherein said environment provides a visual space in which alternative story paths can be drawn and tested, becoming more refined and extensive over time. Structurally, the visual representation of a data structure imparts new depth to a multimedia presentation, for example by permitting the presentation of relational groupings and hierarchies, or distinct subtopics, within a common set of constituent conceptual elements arranged in a slide collection according to their spatio-temporal relationships. This objective not only provides a potent intellectual tool for visualizing and organizing concepts to understand an overarching topic, and how to present it, but it also eliminates the need for a person to prepare redundant slide show files and redundant slide collections in order to be prepared for performing and publishing presentations about said topic to different audiences, or for different purposes, or after the information content has been updated, or that which requires from the audience different levels of background knowledge, interest, attention spans, access permissions, etc.

It is still a further objective of the present invention to provide a unique and proprietary platform laying the foundation for integration of multiple users, collaborators, and consumers over a network, such that slide collection data structures, story maps, and slide libraries can be shared and built by teams, freelancers, advertisers, business collaborators, or any other parties, and such that slide content, pre-made slide objects, multimedia presentation products, or other useful content can be shared, traded, discussed, published, and commoditized. Use of the invention may occur via the Internet, an intranet (at a university, business, or research facility) or an internet-based server-side application maintained by a business for providing paid access to the invention, preferably including a community of subscribed users. Any of the features described herein may be included in any of the plurality of (s) business methods of the present invention, where said business methods claim embodiments of the invention which further comprise methods for assessing fees, for requiring memberships, for controlling access to and security of the various features of the invention and presentation content generated by use of the invention, and other means for conducting financial transactions and generating revenue based upon the use of the invention and its features.

The touch-responsive input means in preferred embodiments of the present invention is a touch-screen, such as the type commonly known in the art of tablet computers, but in other embodiments it is a virtual "glove" apparatus where an analogous control means is accomplished upon a virtual graphical user interface without any screen being physically present. Therefore, the "touch responsive input means" feature is functionally defined herein such that it includes any apparatus that enables a user to manipulate the graphical control means, slide objects, data structures, multimedia content, and other visual objects in a graphical user interface by directly interacting with the corresponding computer-rendered images thereof (as opposed to indirectly interacting with them through a physical "pointer" such as provided by a mouse or a joystick). Virtual or holographic interactivity is accomplished presently through various technologies that provide a means for directly interacting with graphical objects using the hands and fingers, or even using thought alone. The invention anticipates that emerging technologies are providing input devices and new computer control apparatus which enable analogous control means to be accomplished using the electrical output of the human nervous system (e.g., brain waves, neural activity, synaptic transmission, neuromuscular stimulation, etc.), such as via microchips implanted in the body, prostheses and external devices worn on the body that detect neurological activity, and the like; while other technologies are using hologram display means to create graphical user interfaces and other environments for controlling computer hardware and software, and also motion detectors that monitor the movement of the person to calculate which of the illusory items he or she is "touching" or attempting to manipulate in the holographic or virtual 3D environment (e.g., the in FORM interface). All such control means discussed in this paragraph are hereby defined as equivalents to the touch-responsive input means of the present invention because they involve the computer-rendered illusion of directly manipulating objects and controls within a user interface environment, or a virtual world.

It is another object of the present invention to provide (t) problem-solving means for governing the rules of slide path relationships and preventing conflicts or errors when changes are made to complex data structures (i.e., providing a plurality of methods related to feature (q) introduced above). Intuitive graphical controls and functions, comprising message windows and artificial intelligence, address and overcome the distinct challenges relating to adding and removing slides objects and story links from dynamic and complex non-linear slide collections and story paths. Also, slides can be layered and grouped within a story, and said layers and groups can be assigned (u) classifiers and other descriptive labels to demarcate a subset of slide objects according to priorities assigned by a user or chosen from among criteria-based options or designated by artificial intelligence. For example, classifiers or labels may include a numeric value representing relative importance to a theme or position within a hierarchy, or one or more tags indicative of subject matter relevance, temporal data such as creation/deletion dates, author data, title banners, and so on, and also navigational classifiers like depth and pan parameters which indicate a relative position in a data structure and its corresponding coordinate grid, etc. Subsets, groups, nodes, and layers of pages may overlap and intersect with each other in any given story map or slide collection, and may even be cross-connected among slide collections. With so many overlapping data structures, it becomes necessary to provide means for reconciling conflicts whenever changes are made within a slide collection. For example, notifications and prompts may correspond with user actions in a story editing mode that help avoid path conflicts, link breakages, or "dead space," and in certain instances a default mechanism inserts a "placeholder" slide in such dead space. These problem solving means comprise a significant innovation of the present invention in the art of multimedia presentations without which nonlinear presentations of the types enabled by the platforms and software products of the present invention would be impracticable.

The presentation software applications and platforms of the present invention are adapted for performance of a presentation to one or more audiences both remotely and face-to-face, both live and/or pre-recorded, and/or either controlled by a first party or interactively controlled via the participation of multiple parties, where said parties may be both presenters or members of the audience. In addition, a variety of output options exist for displaying a performance through hardware means such as projectors and video screens, as well as individual devices which can be identified, for example, by IP address, URL, computer ID or other name, by applications resident on a receiving device, by remote log-in from another device, and any other means for exchanging multimedia content. Thus the structure of an audience may be defined in a variety of ways using a range of output options, and both the content and functionality of TABLOs may be tailored differently for particular recipients or audiences. TABLOs and Player/Viewer applications or modules of the invention are easily distributed and downloaded to mobile devices and other personal electronic devices (e.g., smartphones, tablet PCs, laptops) according to means for distributing multimedia player software over networks understood by persons of ordinary skill in the relevant arts. The Player/Viewer applications or modules may further comprise means for instructing said devices to engage in two-way communication with the presenter, or a device of the presenter for receiving data from second parties who are using the applications to view and interact with presentation content.

The systems of the present invention, including the presentation program software product(s), have a distinctive and advantageous "Look and Feel:" The entire design of the present invention from its user interface, control elements, underlying computer instructions, functions and navigation means has been conceived in a paradigm that takes full advantage of the possibilities afforded by digital technology and distributed or mobile computing. One of the intended design principles of the present invention is to create presentation content that portrays concepts in ways that parallel the intricacy and plasticity of neural networks and the cognitive mechanisms of the brain. The present invention, from its user interface to its dynamic slide objects to its intuitive slide path creation features, as well as its integration with open-ended library resources and multidimensional navigation controls enable presenters to generate, organize, evolve and publish richer and more effective stories, seminars, and other informative multimedia productions, as well as to organize conceptual information visually by a simultaneous arrangement of multiple links, relationships, hierarchies, and the like which can be easily managed and navigated using touch-responsive controls. The analogy by which the above described means for creating and organizing content in the present invention are compared to the neuronal architecture of a nervous system, and this is an important theme underlying the spirit of the invention. For example, it is more appropriate to regard the linking means of the invention as structures resembling the synaptic terminals of neurons, because said linking means comprise multiple plastic junctions impinging upon other slide objects and data structures, which in turn can be regarded as upstream and downstream "neurons" and "ganglia," respectively, rather than to regard the slide collection and story maps of the present invention as equivalent to the carriage of a 35 mm incandescently-illuminated slide projector or the linked lists of the linear slide queues of prior art presentation programs.

Because the system of the present invention emphasizes flexibility and cross-platform compatibility, which emphasis includes the partitioning of data structures into discrete data files or objects which need not be bundled into a monolithic presentation file (but which may be incorporated into a TABLO), it fully harnesses the power of the Internet, mobile computing, and social media. Unlike the prior art wherein the file is a container that contains the entire presentation in one indivisible mash, the container is effectively divisible from a maximum size to smaller sizes, where the largest batch of data in a TABLO might comprise an entire software application comprising a complete means for executing the controls and functions of the presentation software program on another device (i.e., a tablet computer of a person viewing the TABLO); while an intermediate-sized TABLO may comprise a stripped-down application solely for viewing TABLOs in a specialized Viewer/Player; while a smaller TABLO would comprise only data structures and slide contents, such as a TABLO comprising a slide collection; while the smallest TABLOs might only carry one or two slide objects in a short story path, perhaps also include instructions for integrating into a third party social media application or other forum. Thus the invention can populate and reconstitute slide collections on any device running the software with previously created TABLO content, enabling stories to grow and evolve, and rapidly if desired, even in real-time during a live presentation of a visual discussion.

The presentation program incorporates (v) plug-ins for browsers, social media applications, drop-boxes, and other cloud-computing tools to allow a presenter to draw from and contribute to the rich stock of resources in the Cloud. For example, a plug-in for the present invention may allow a user to directly convert images viewed on a web page of the internet into slide content in a slide object within a slide library of the presentation program of the invention, simply by dragging and dropping, for example. Slide libraries may be assembled separately from slide collections, and thus their contents may be shared and managed like any other media library commonly known in the arts of digital multimedia entertainment (e.g., iTunes, Netflix, Photo albums). Advantageously, the content of a user's personal media libraries and slide libraries of the presentation program may also include complex data structures: for example, instead of a user merely saving individual slide objects into a library, the user can save story paths, fragments of story paths, selected groups of related slides, and of course users may store entire slide collection data structures and story maps. Users may even take screenshots of particular views of the stage environment in a slide collection and save said screenshots in an image library, or they may record their navigation actions in real-time during a performance in the visual discussion space and save the resulting clip as a movie in a media library. Thus, there is a seamless progression of presentation-generating possibilities, and of the nature of a presentation output, provided by the present invention, beginning with output that comprises the visualization of slide objects and slide collections, progressing through output that comprises the capture of screenshots and user actions, proceeding farther to the delivery of a live presentation on a single screen or broadcast to a group of mobile devices, for example, and proceeding even farther to the publishing and sharing of TABLOs playable by other users on their own personal computing means. A distinct TABLO Player/Viewer may be provided in association with a TABLO which enables audience members to follow a presentation, independently navigate in a presentation data structure, and send feedback to the presenter, even when they do not have a resident version of the full tabloMedia software platform running on the computing device they are using to view and/or participate in the presentation. In cases where a person does not have their own version of a software to run a TABLO or participate in a visual discussion, the platform hosts the content on a web page and allows users to participate via such an online portal.

Additional objects, features, and advantages of the present invention will be more readily apparent from the following detailed descriptions of some preferred embodiments thereof. The present invention is not limited in its application, details, or components merely to those set forth in the following description and illustrations. The present invention resides not merely in any one of the features set forth in this specification, but also in the particular combination of all of the features and improvements claimed. Methods and devices consistent with the present invention are capable of other embodiments. In general, the order of the steps of disclosed processes may be altered within the scope of the invention. Also, the phraseology and terminology employed herein are for the purpose of description and should not be regarded as limiting unless explicitly stated as such.

While the subject matter described herein is presented in the general context of program modules and features that execute in conjunction with the execution of an operating system and application programs on a computer system, those skilled in the art will recognize that other implementations may be performed in combination with other types of program modules and operating systems using equivalent features. Generally, program modules include routines, programs, components, data structures, and other logic that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and any other presently known or future developed computing means known in the art.

BRIEF DESCRIPTION OF THE DRAWINGS

FIG. 3A is a schematic view of one possible embodiment for a story data structure being stored in the memory of a computer.

FIG. 3B is a schematic view of one possible embodiment for a slide object being stored in the memory of a computer.

FIG. 4B is the front view of the preceding screenshot after a second slide object has been added by tapping on the touch-screen of the GUI, where said second slide is a new adjacent slide object in the story path and where a story link has been established between it and the preceding slide.

FIG. 9A is a screen shot showing the graphical user interface of the invention in a delete mode wherein several slides have been designated for deletion by a function of the software.

FIG. 11A is a first example of an improved slide presentation scheme enabled by the platform of the present invention, where the story map resembles the shape of a bottle-brush, or feathers on a stalk, indicating that each step along a main path has parallel layers of supporting information above it and below it.

FIG. 11B is a second example of an improved slide presentation scheme enabled by the platform of the present invention, where the story map is a story morph, in that the visual depiction of the data structure suggests a shape of a distinct thing.

DETAILED DESCRIPTION OF THE DRAWINGS

Figure 1A:
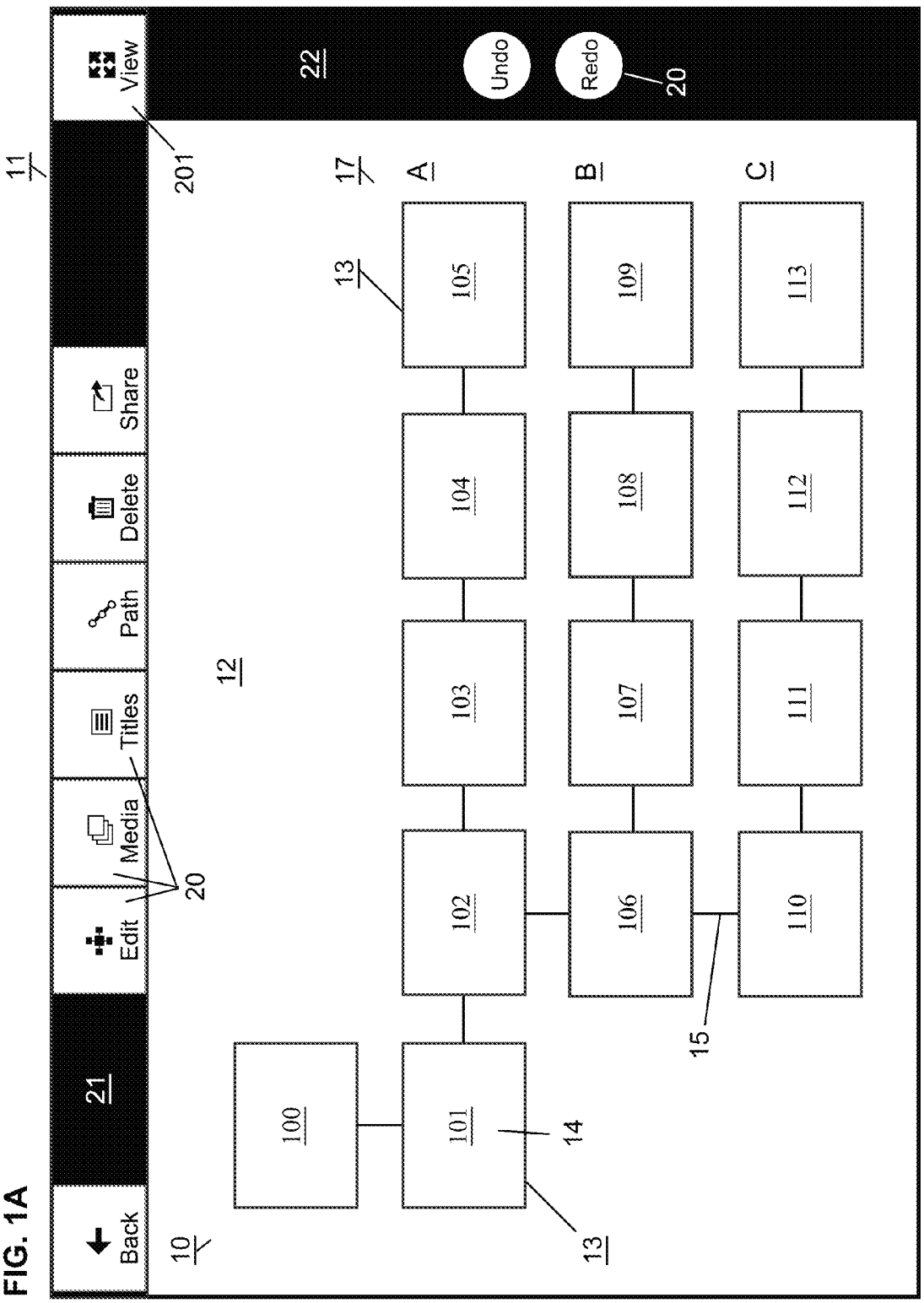
FIG. 1A is a front view of a screenshot of the graphical user interface in the environment of the slide collection mode, wherein multiple story paths have been assembled among a collection of slide objects.

Throughout all the Figures, same or corresponding elements are indicated by the same reference numerals.

FIG. 1A shows a front view of a screenshot of the graphical user interface 11 ("GUI") from a presentation software program (e.g., a commercial software product, potentially marketed under the tradename: "tabloMedia") of the present invention, said screenshot having been taken from the environment of the slide collection mode 10, which is also a visual discussion mode (e.g., analogous to, or more correctly stated, an advantageous alternative to the prior art's "presentation mode."). Various other display mode options for the GUI of the present invention are selectable by the user to determine what information is visualized and what controls and functions are available, and how data objects are represented geometrically or graphically within the visual discussion space 12. In this drawing, a slide collection data structure 13 is represented as an array of flat pages 14 occupying a three-dimensional field of the discussion space 12 and connected by a plurality of intervening story links 15, wherein each story link is visually represented by a story link image comprising, in this embodiment, a solid line connecting one page to another page. A virtual "camera" (not shown) provides a first-person perspective view into the visual discussion space 12, which camera can itself be moved within the coordinate axes of the space (e.g., panning and zooming) to create the illusion of moving throughout the visual discussion space 12.

The slide collection data structure 13 is associated with a story map 17, which is a data structure or calculation that comprises the information necessary to display a series of story paths among the pages of a slide collection 13, and this story map 17 portrays multiple story paths (A, B, and C) that have been defined by the linking means 42 of the individual slide objects 100-113 as they were assembled in this slide collection mode 10. For simplicity, slide objects may be referred to herein as "slides" and "pages" 14 or other colloquial terms without negating their underlying structural and functional distinctions from the prior art; although these terms may be used interchangeably in some contexts of the discussion, the precise terminology is: that a slide object is a data structure and the fundamental building block of any story data structure, while in FIG. 1A each slide object happens to be represented by a single square page 14 in the visual discussion space 12 of the display 11. Moving up to a higher level of organizational complexity, a story data structure 17 or "story map" comprises multiple slide objects 14 linked together in a particular spatio-temporal arrangement by story links 15 connecting one slide object to one or more other slide objects, where spatio-temporal is a term indicating that the individual slide objects in a story path are conceptually related to each other based upon both (a) their different coordinate positions in a virtual physical space (e.g., as objects in a virtual graphical environment based upon a Cartesian grid) and (b) their ordinal positions in a series of linked slides (e.g., as pages within a sequence of linked pages or a story path).

Logic in the software of the invention generates a page image for each slide object 14 in the visual discussion space 12, and this page image may be displayed differently in the visual discussion space, or other views, depending on the mode the user is operating in, or depending on the pan and zoom of the view. Each slide object 14 is therefore depicted in the visual discussion space 12 as an image, whether static or animated or video, thus being a "page" displaying its "page image," which for simplicity's sake are also represented by the numeral 14 in the drawings. Conceptually, each page image is a graphical representation of the slide contents 40 of the corresponding slide object, and a principal utility of the slide object arises from its representing an individual concept or clip relevant to the topic of the broader narrative of the presentation being performed or the slide collection being discussed. Hence, the pages 14 are analogous to pages in an animated magazine while the slide collection data structure, in the configuration and view of FIG. 1A, would resemble a room-full of miniature flat-panel video screens each displaying a unique quantum of information, either static or animated. This is modular visual storytelling. Hereby the presenter, or one or more audience members, may navigate in the visual discuss space or traverse any story path(s) to obtain the benefit of this novel type of "slide presentation," as will be explained in more detail below.

In FIG. 1A, a visual discussion space 12 (or more colloquially, a "stage area") is generated as part of the software platform within a virtual graphical environment that also comprises a graphical user interface comprising control panels 21 and 22, for example, and which comprises a multidimensional virtual graphical environment defined by a coordinate map, Cartesian grid, or other type of means for establishing a geometric framework for a virtual reality environment. The currently displayed story map 17 has a distinctive overall shape that reveals information about the logical relationships among the pages and certain groups of pages, in that said story map 17 forms a tridentine geometry from left to right as it digresses from a common starting page 100 (a root page) and branches into three parallel story paths (A, B, and C) terminating in three different endpoints (105, 109, and 113, respectively). The slides have been assigned locations (via logic encoding algorithms of the invention) on the coordinate grid of the stage area where the horizontal direction is the x-axis and the vertical direction is the y-axis in this example of this view, such that the entire slide collection data structure 13 is arranged into an optimal geometry that best matches the linking arrangement in the underlying data structures, and so that the graphical rendition thereof is proportionate with regard to the relative distances between the slide objects in their linked sequences of the intangible corresponding data structure(s). In embodiments featuring three-dimensional slide images (not shown), there is a z-axis mutually perpendicular to these two axes, and even greater dimensional complexity is attainable according to the features of the presentation platform. Thus, the computer-implemented logic of the invention encodes means for depicting in said visual discussion space 12 an interactive graphical representation of the slide collection data structure 13, while means for deriving a geometric simulation of the slide collection data structure 13 are provided to accurately and proportionally recapitulate all positional relationships among the slide objects 14 and the story links 15 which are established by all of the linking means 42 therein. Also provided are means for superimposing each of the corresponding page images 14 and story link images 15 in the slide collection 13 upon the coordinate grid of the visual discussion space 12, such that one page is depicted for each slide object, and in preferred embodiments, all are depicted in a best-fit geometric arrangement.

Immediately, the above offers a novel and advantageous means for providing an audience with a true "road map" of a presentation, because a presenter may begin a presentation by giving the audience a glimpse of the story map 17, and may demonstrate her progress through the story map 17 visually throughout the presentation. In the example of FIG. 1A, the presenter has organized a presentation based upon a particular topic, but she has provided three options (story paths A, B, and C) as mutually exclusive alternatives for delivering the presentation to an audience who she can accommodate by whatever determining criteria apply to lead her on one of the three alternate paths. Meanwhile, the other two alternative paths remain accessible if unforeseen questions arise, or if she has misjudged the audience. Furthermore, the alternatives by their very depiction are useful for visually implying information about relevant matters outside the scope of the conversation, or in the conceptual neighborhood of the main topic of the presentation. These alternatives story paths and their page images are accessible during the presentation, unlike the prior art which would have required an editing of the slideshow and the creation of a new version of the presentation file that excluded all content not directly in line with the linear slide show. Presenters thus now have more flexibility and viewers can obtain a better perspective and richer understanding of the topic being presented.

A story map 17 comprises the information about how the slides in a collection are arranged relative to each other and/or relative to the coordinate grid or some other reference point (e.g., a "start slide" and/or "end slide" or a "zero point" of the coordinate grid, and the like), and it may also store information about the linkages among said slides, such as their identities, sequence/order, and/or position in the slide collection. In FIG. 1A, the story map 17 is a graphical representation of a nonlinear story data structure 18 (not shown here, but see FIGS. 3A and 3B) comprising paths A, B, and C.

Live presentations may be performed and/or digitally recorded (by a multimedia recording feature of the software program of the invention) while the presenter is interacting with the slide collection. This is one type of presentation output, and it may be saved as a specialized file type associated with the platform of the invention, for later publication or sharing, or it may be saved as a standard multimedia file like .mov, .avi, and so on. The stage view of the stage area 12 is maneuverable, in that a person may zoom in and zoom out, or scroll left and right and/or up and down, or shift the point of view (i.e., change the angle of perspective) thereof using any suitable control means provided by the GUI and/or the action of the user's hands on the touch-screen, and these views comprise an aspect of the presentation output. Note that the graphical user interface 11 is specially adapted for use with a touch-screen, as in a tablet PC. Therefore, in preferred embodiments, the act of zooming into the slide objects of the slide collection is accomplished seamlessly, such that the slide contents of the slides become visible as they would appear in a full-screen presentation of said slides as the zoom level encroaches towards it/them. When zoomed out, the slides may become gradually abstracted and the contents become simplified or obscured according to logic encoding means for generating page images, introduced above. Importantly and advantageously, the stage 12 is not a data structure, nor a slide file, nor a canvass, but it is a virtual multidimensional space in the graphical virtual environment of the platform; this distinguishes the present invention from Microsoft's "Visio" and other unrelated products known in the are of productivity software, and this feature provides a means for the platform and software of the invention to produce dynamic and vivid representations of complex story data structures, including three dimensional representations, as explained throughout this disclosure.

Figure 1B:
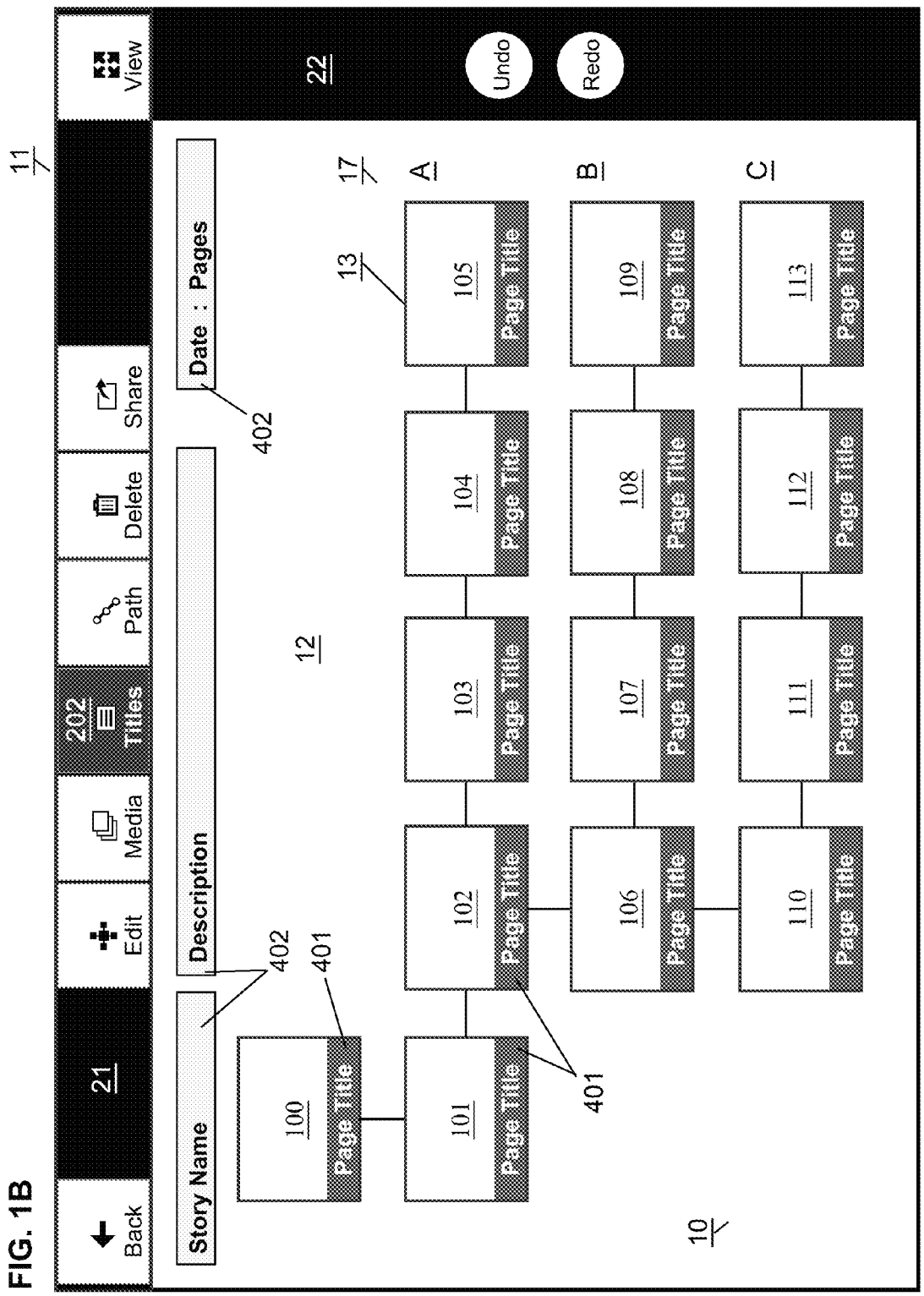
FIG. 1B is the front view of the screenshot of the graphical user interface in the environment of the slide collection mode, wherein a global command, "add titles," has been executed upon the slide collection by activation of a control object from among the various control means.

In both FIGS. 1A and 1B, a top control panel 21 and a side control panel 22 contain several control means 20 for interacting with the graphical user interface 11 represented by icons and/or written titles in each. For example, in the top right corner a GUI object (e.g., a touchable button) entitled "view" 201 is a control means for adjusting the stage view, or the virtual camera governing the stage view as described above. Similar adjustments can be made when the user performs standard touch-screen actions upon the stage view when the presentation program is run on a tablet PC or other touchscreen-capable device, whereby the user may swipe, tap, scroll, zoom, and pan with his or her fingers, for example, in the stage area 12. The contents of the control panels 21 and 22 in visual discussion mode 10 may comprise different and other control objects 20 than would be found in other program modes or display schemes which can be selected and customized by the user. In this embodiment, the structure and contents of a slide collection 13 can be edited, arranged, and otherwise managed and manipulated using the various control means 20 visually and in real-time in the slide collection mode 10. These actions may be performed live and displayed to an audience in real time, and may also involve the participation of audience members, either of which eventualities enables the platform of the present invention to truly generate "visual discussions" of a slide collection, as explained in greater detail herein.

In FIGS. 1A and 1B a human user of the presentation software program has created three story paths: Path A proceeding from slide 100 to slide 105, Path B proceeding from slide 100 to slide 109, and path C proceeding from slide 100 to slide 113. This arrangement signifies that the user has created three alternative "stories" (i.e., slideshows, presentations, depictions, animations, etc.) within one slide collection 13, wherein the topic introduced in the start slide 100 is elaborated in slides 101 and 102, but then three alternative sequences of slides proceed thereafter pursuing different avenues of elaboration. Page 102 is thus a type of a "node" slide object, because it represents a decision point or junction of multiple paths. Hypothetically, if the topic of this slide collection were "The tabloMedia Company Introduces A Revolutionary New Software Platform," path A might be directed to an audience of consumers and might discuss the commercial appeal of the new product, path B might be directed to merchants and might discuss its projected sales performance, and path C might be directed to IT specialists and might discuss its technical features. In most real-world scenarios, a presenter will embark upon the most logically appropriate story path, but may skip among any of the pages in story paths A, B, and C as desired or whenever necessary.

Some of the control means 20 are global, in that they affect all or a group of slide objects with one command. For example, FIG. 1B illustrates the same screen shot of FIG. 1A after the "add titles" function has been triggered by the activation of a "titles" control object 202, (shaded; located near the center of the top control panel 21) which is a control means whose function can be specific to only one slide object, to a group of slide objects (e.g., those in one story path), or to all slide objects in a slide collection. In the drawing in this example, the action was performed upon the entire slide collection 13, and the result is that a data content object 401 was added to the slide contents of each slide object, said data content object 401 being a text box wherein title text may be applied. Additionally, when the "titles" button 202 was activated, one or more text string/data entry fields 402 appeared at the uppermost region of the stage 12. Data may be typed into the text fields and saved in association with information, actions, or objects on the stage 12 or in the story map 17, and such; these fields 402 may contain prompting text, as shown, indicating the type of input requested by the program. Alternatively and additionally, one or more of these fields 402 may display statistical data or other information instead of receiving input, for example, displaying the date and time and page number of an object placed on the stage 12, and such. These fields 402 are not necessarily tied to this particular "titles" function, that is, not to the exclusion of them having other or independent functionalities. Also, the position of the responsive "page title" slide content object 401 may occur in other positions besides at the bottom of the slide, as selectable by the user.

Figure 2B:
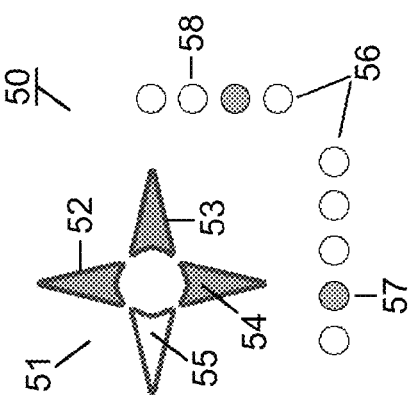
FIG. 2B is an enlarged view of a navigation control object of the navigation means resembling a compass, as well as the associated punctae which are position-indicating means for indicating a slide's relative depth on particular dimensional axis within a data structure along.
Figure 2A:
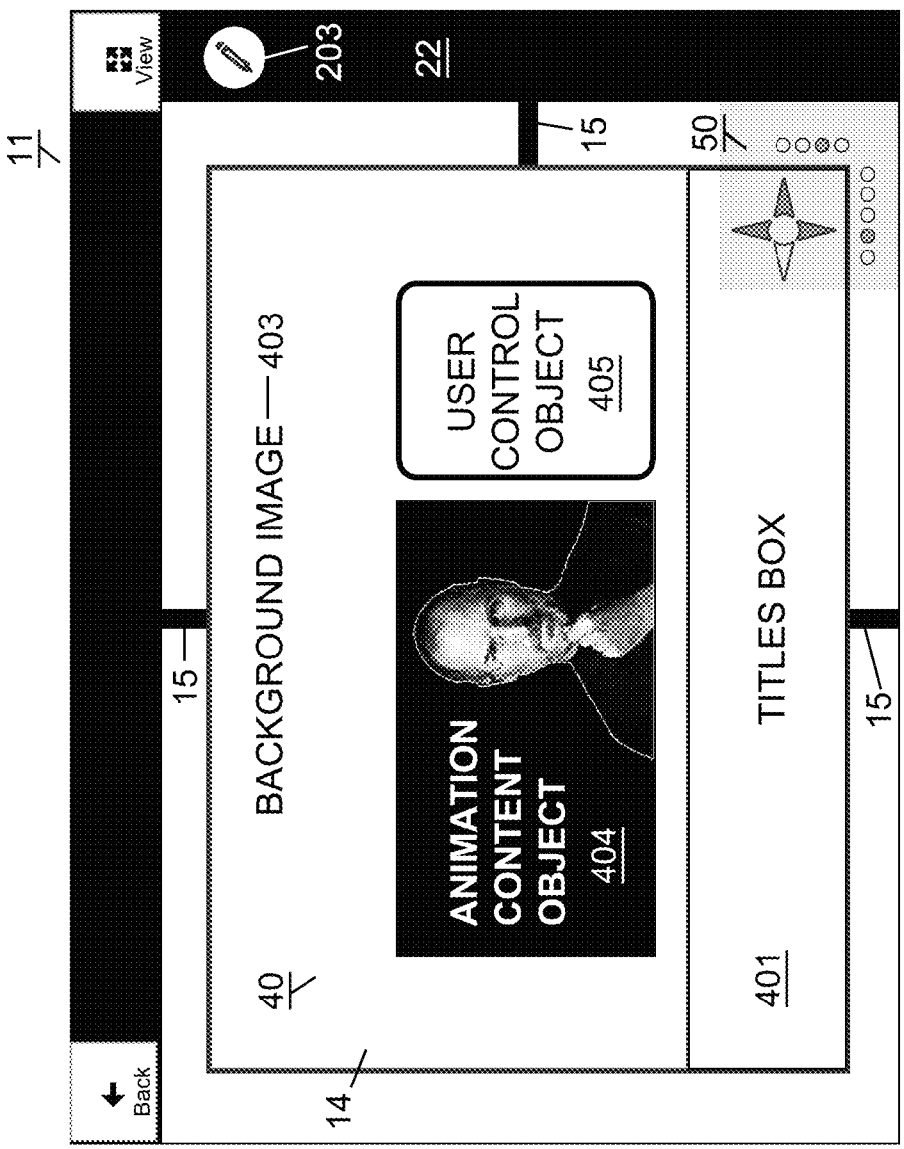
FIG. 2A is a front view of a screenshot of the graphical user interface in the environment of a slide editing mode, wherein the slide contents of one slide object are enumerated, and wherein a multidimensional navigation control means is portrayed.

FIG. 2A is a simplified view of the GUI 11 of the presentation program featuring a slide object's page 14 showing the arrangement of a plurality of slide contents 40, where any one of said slide contents 40 may comprise any data such as media or displayed images suitable for use in a presentation or in the communication of information to a person, including but not limited to animation, photographs, video, audio, text, spreadsheets, documents, files, computer-executable code (which is an example of a slide content that is not necessarily displayed visually, but may nevertheless be present within the slide object 14 as data), audiovideo/multimedia content, control objects for controlling said content objects, interactive objects like buttons and menus, and such. As depicted in FIG. 3A, a slide object 14 comprises a data structure analogous to a container, or a means 41 for holding an assortment of related slide content data 40, which may be represented in logic by any appropriate means understood by persons of ordinary skill in the art, wherein said container means 41 may comprise, records, arrays, databases, scripts, html pages, xml pages, databases, and such. Said slide object 14 may also comprise, either in the data structure of the container means 40 or apart from it, other instructions and features (examples of which are explained below, the notable example being: a linking means 42 for creating story paths).

In FIG. 2A, the user has entered a slide editing mode focused upon the particular page image 14 shown in the center of the stage 12, and entry into this mode may have occurred by default when the person zoomed into said slide from the slide collection mode 10 of FIGS. 1A and 1B. A slide editing mode, and/or a slide creation mode, is an alternative GUI environment wherein slide contents and their page images can be generated and finely honed using specialized commands and control tools that automatically populate in the control panels 21 and/or 22 when the mode is entered. Alternative routes into slide editing modes are also provided in the invention, including: via the user-selection of a slide, via the clicking/tapping of a slide image in a slide collection, and via the activation of a "slide editing" function 203 of a control object 20. Editing tools of the present invention comprise text editors, tools for resizing and cropping content, tools for making art and drawing, and any other useful feature for creating and editing content in a presentation or discussion.

Among the slide contents 40 of the page 14 in FIG. 2A, there are: a titles box 401 as described in relation to FIG. 1B; a background image 403 (image not shown; represented by the phrase "Background Image"); and, superimposed over the background image 403, an animation object 404 plus a controller object 405 therefor. During a presentation, the user would start and stop the animation of the animation object 404 by manipulating the appropriate control means (not shown) in the controller object 405 (although, if no controller were present, the animation might simply begin automatically as soon as the slide is displayed during the presentation). A control means 203 in the side control panel 22 is an example of a specialized tool for editing, given here as an example of the many editing-specific tools whose functions are not relevant to the present view; it is only important to note that the program of the present invention is equipped to automatically change the organization and attributes of the control objects of the control panels depending on what the user is doing in the stage view. During a presentation or in a published presentation output of the program, the entire screen may be filled with the page image and the GUI would not be displayed.

Figure 5A:
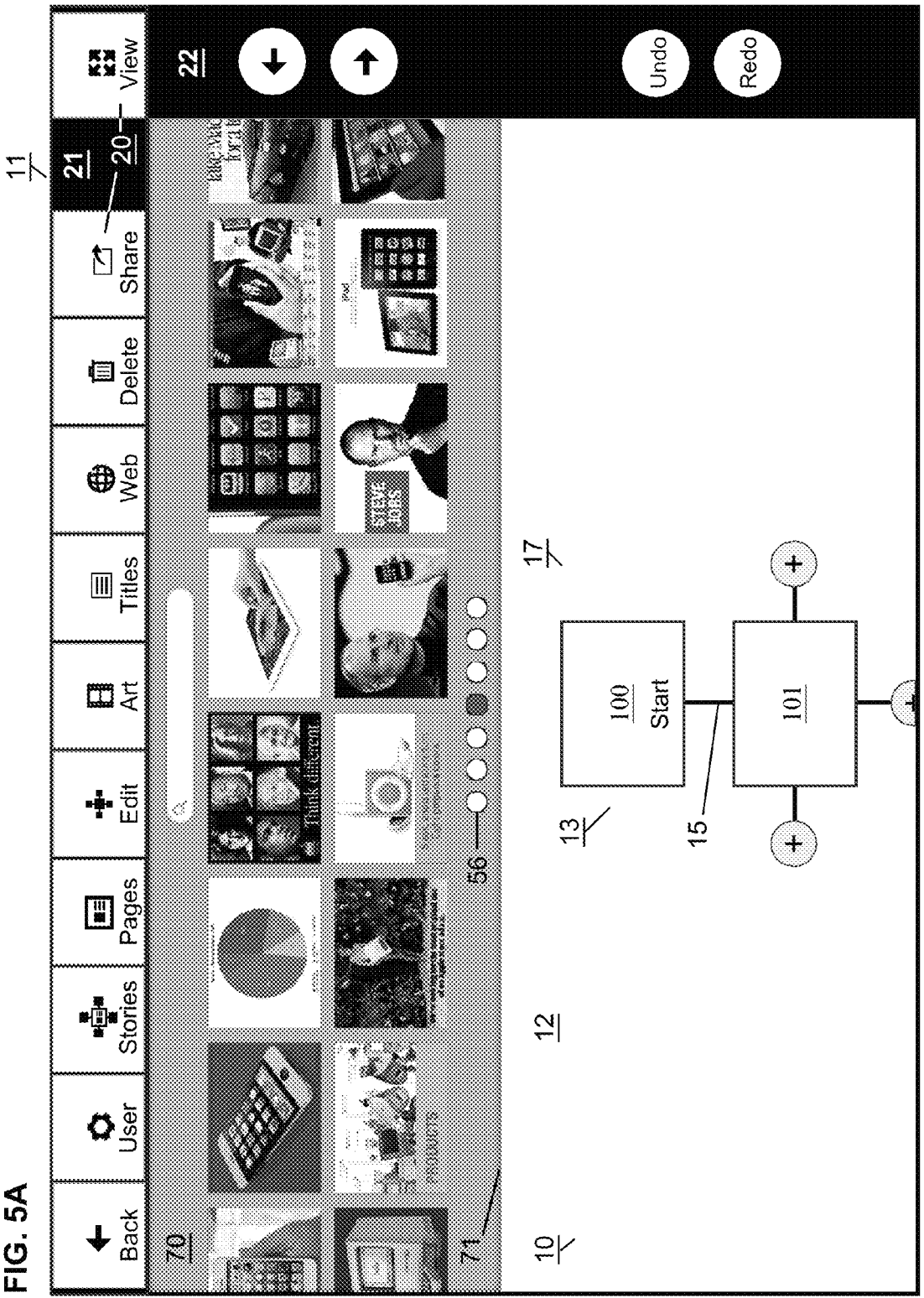
FIG. 5A is a front view of a screen shot in the slide collection mode showing the invocation of a media library, where access to the media library is obtained when a library panel drops down to occupy a portion of the view.

During slide creation, or whenever a user desires to add or edit the slide contents of a page, the user may drag a file or other data object from a library (not shown; but see FIGS. 5A and 5B) or other source, including on the world wide web ("the web"), from a personal library stored in computer memory, on sharing resources and forums hosted by third parties, and such. Conversely, to remove items from slide contents 40, a user may drag it off the page, select and delete it, and such. Once a slide content data item is placed in the slide container means 41 (which action is visually represented by its being placed into the page image, as illustrated here), the precise arrangement of it can be determined by manual manipulation, such as by dragging and dropping using the touch screen 60. Automated "centering," spacing, and alignment functions are also provided among various editing toolbar objects (not shown; all of which can be generically represented in this example by the editing tool 203). Also, and advantageously, the link images 15 are visible on the outermost edges of this view, extending from the edge of the page 14 towards the boundaries of the view; these link images 15 are indicated by one shaded rectangle extending upwards from the top of the page 14, one extending downwards from the bottom, one extending to the right, and not any on the left. Thus, the actual trajectory of the story path(s) impinging on this slide are visually indicated in this mode (this slide object, for example, has links arranged like those of slide 106 of FIGS. 1A and 1B). An alternative/additional indication of the same is provided via the navigation control means 50, as follows:

FIG. 2B is an enlarged front view of a graphical control object of a navigation control means 50 of the invention. The navigation control means comprises a navigation control object 51 resembling a compass having at least 2 coordinate axes depicted, which in this example are depicted as triangular arms 52 and 53 of said compass. A filled portion 54 of an arm of an axis of the compass (e.g., the filled triangles extending N, E, and S from the compass) indicates that a story link is present linking the currently selected slide to another adjacent slide, and therefore a route within a story path lies in each of those directions. In contrast, an open portion 55 of an arm of the compass (e.g., the unfilled triangle extending W from the compass) signifies that no link extends in that direction within the slide collection data structure and/or story map.

Also in FIG. 2B, two perpendicularly aligned sets of circles, or punctae, are graphical representations of position indicating means 56 for indicating at least one depth parameter pertaining to the relative position of an active slide object among a plurality of other slide objects arranged along one of said directions within the slide collection or other data structure. These circles comprise a means for visually representing the number of layers in the slide collection along a specified dimension or axis, where the first horizontally aligned set 57 indicates there are five columns of slide objects in this slide collection data structure, and where the second vertically aligned set 58 indicates there are four rows of slide objects in this slide collection data structure. Structurally, said graphical position-indicating means may be depicted as any shape, not limited to circles, and they may be shown smaller in the GUI 11 of the preferred embodiments of the invention compared to the scale in which they are shown in the several drawings of this disclosure; they have been illustrated in a larger size herein for pragmatic reasons, e.g., to make them easier to see. Said means/punctae may also be active objects that are "clickable," in that clicking on a particular circle/punctum will shift the frame of the stage view to the depth level corresponding to the clicked (i.e., selected, activated) circle/punctum. Depending on user settings and preferences, these sets of indicators may configured to display the same parameters for a story path within the slide collection rather than the entire slide collection data structure. One of each sequence of said circles is filled to represent the currently emphasized level of depth in the view on the stage. For example, set 57 indicates that the presently selected slide is on the second column of the data structure, while set 58 indicates that the selected slide is in the third row of the data structure. As an alternative example, if there were six pages of slide objects in the slide collection along the x-axis, there may be six circles/punctae in a linear sequence along the x-axis at the bottom horizontal of the stage view; wherein one of said six circles/punctae would be filled or otherwise distinguished to indicate that is the position of the selected slide or of the presently visible page, or of the presently visible group of slides in the slide collection, or of the presently selected/active region of the story map, and so on. The precise parameter represented by these graphical position-indicating means may vary from one embodiment to another, and may also be selectably variable according to user preferences, said preferences, for example, being adjustable via a control menu of the presentation program. Likewise, the interactivity of the control object of the compass 51 may be alternatively specified and/or clickable to shift the frame of the stage view. Farther below, a further advantageous feature of this control object 50 will be discussed, wherein said compass can be rotated in any dimension to shift the perspective (as opposed to shifting the frame) of the view.

FIG. 3A shows a hypothetical story data structure 18 corresponding to path B of FIGS. 1A and 1B. Locations in computer memory (301-307) store information about the slide objects that are contiguously linked to form Story Path B, and associated with each entry is a pointer to a location in memory where the corresponding slide object data structure is stored. FIG. 3B is one such hypothetical example of a slide object data structure 14, or equivalently the slide container 41 defining said slide object, corresponding to slide 106 of the preceding drawings. A portion of a linking means 42 defines certain parameters of the slide relating to its position in the slide collection data structure and story maps; for example, the three story links extending to/from slide 106 among adjacent slides 107, 102, and 110 are represented with a directional indicator as links extending in the +x, +y, and −y directions relative to the slide object 106. These latter indicators are an example of a positional or directional indicator parameter that can be assigned to differentiate story links from one another, or to classify slides and story links into typological categories and groupings. Any other means for identifying adjacent slides in a slide collection, or for representing the multidimensional arrangement of a set of graphical objects in a data structure, can be applied here as would be understood by persons of ordinary skill in the art. Slide contents 40 are enumerated in another part of the container 41, and each entry therein further comprises a pointer to a file wherein is stored the corresponding item of said slide content as well as other information about the action or position, for example, of the data content item on the slide image of the slide object 14, 106. The slide object 14 may comprise a file, such as an XML markup file, a metadata file, a SQL database, a textual file, or any other appropriate storage medium, including a specialized file type exclusively used for data structures of the present invention.

Slide objects may also comprise instructional contents as slide content data, such as instructions relating to the performance of the slide or of objects in the slide container, like animations during a presentation. For example, slide content data may include automated commands for playing sound and video, animations, timers and timeline information, contingency-based navigation cues, transition effects, and any other logic or functionality.

Figure 4A:
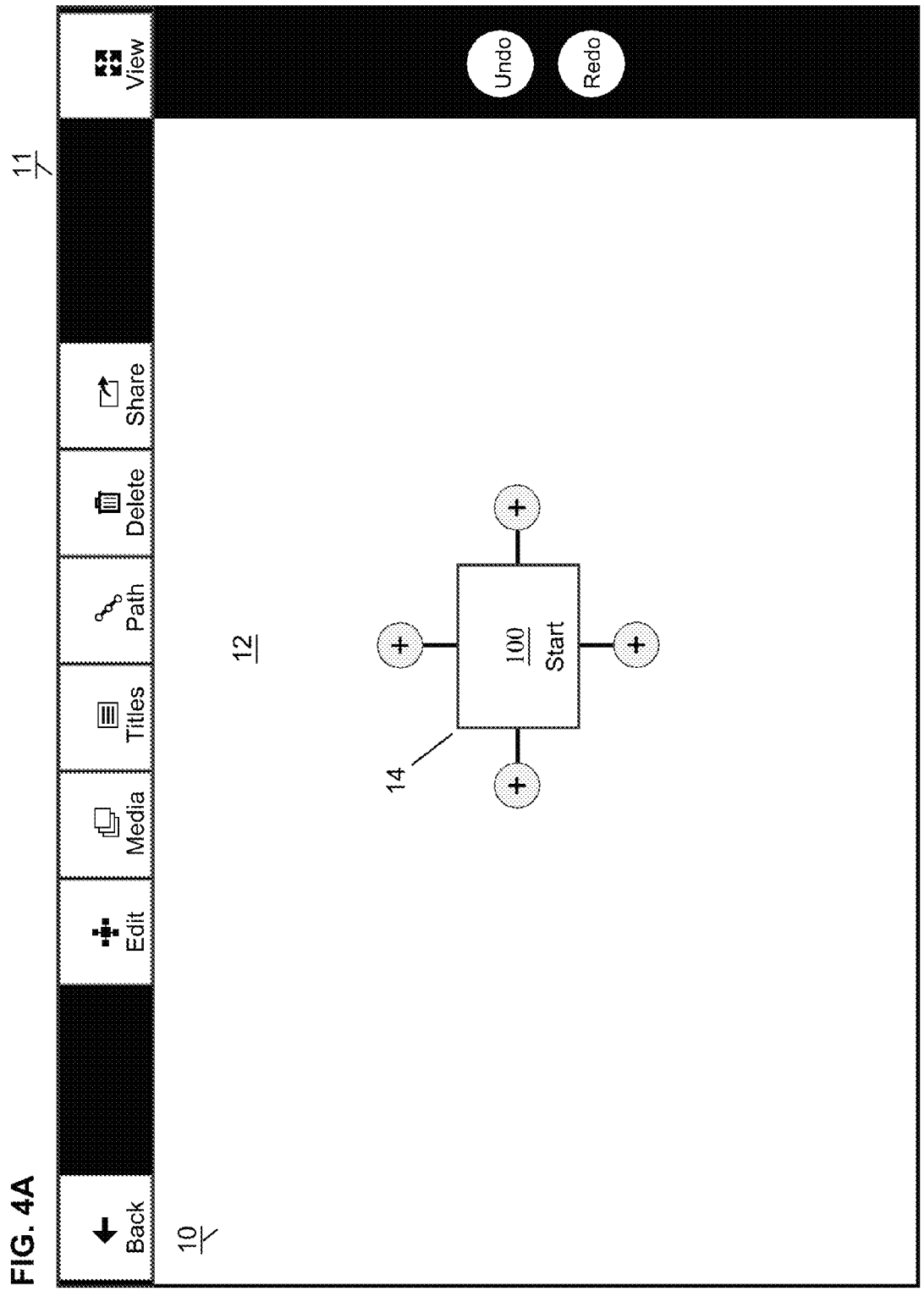
FIG. 4A is a front view of a screen shot showing the step of initiating a new story path in a new story map of a slide collection.

FIGS. 4A-B and 5A-B illustrate a typical method for creating a story map of the present invention. For example, the method may have been used to create the slide collection and story map 17 of FIGS. 1A and 1B as follows. First, as shown in FIG. 4A, in the environment of the GUI 11 of a slide collection mode 10, a first slide object 14, corresponding to slide image 100, is placed in a stage view 12 of the visual discussion space. By tapping in a region adjacent to said slide object 14, said regions being indicated by mock story paths extending in the four cardinal directions from slide 100 and terminating in a target (a circle with a "+" in its center), a user may summon an adjacently linked slide object, represented by the slide image 101 in FIG. 4B. The new slide object is automatically linked by story link 15 to the prior slide object, thus beginning the creation of a story map 17. As these events occur in the GUI 11 they are mirrored by the operation of the logic of software whereby the appropriate data structures are created and stored in memory, as was demonstrated in FIGS. 3A and 3B.

Within the environment of the slide collection mode 10, but not exclusively within this mode, a user may access one or more internal or external media libraries wherein are stored data and objects to use as slide contents, as well as storing previously prepared slide pages, and even more sophisticated slide-containing data structures like story paths and slide collections, etcetera. These and any other media for use in the present invention, or stored in the libraries of the present invention, comprise data, media, and objects which may all be included within the broadly defined term "user-generated content." For example, in FIG. 4B, the user has selected the control object 20 entitled "media" 204, which causes the events depicted in FIG. 5A to occur, said events comprising the step of causing a library panel 71 to drop down into a portion of the view. In the GUI of the library panel of this media library 70, there are stored a population of slide objects represented by slide images (i.e., "pages") which can be dragged and dropped onto the stage 12 to become part of either the slide collection 13 and/or the story map 17. Alternatively, a library 70 may contain any other type of data for use as slide content, such as images, animations, and other art, or it may contain links to web pages on the internet, actual web pages (i.e., pages and frames of content rendered from html, xml, flash, etc.) and any such source of potential slide content, or any useful information that might be required by the user who is researching and preparing a presentation on an informative topic. Thus, the library mode has an equivalent functionality when called, as by tapping the media button 204, while a user is working in a slide editing mode, such that slide content data from a library 70 comprising data items may be dragged and dropped into a slide container 41 represented by its corresponding page image 14. Note that in FIGS. 5A and 5B, the top control panel 21 has populated with new control objects 20 specific to the media library environment. Moreover, in this environment the invention may also provide navigation control means 50, such as that shown at the bottom of the library panels 71 and 72, which is a position indicating means 56. Two arrows pointing left and right in the side control panel 22 enable the user to scroll through the contents of the library 70.

Figure 5B:
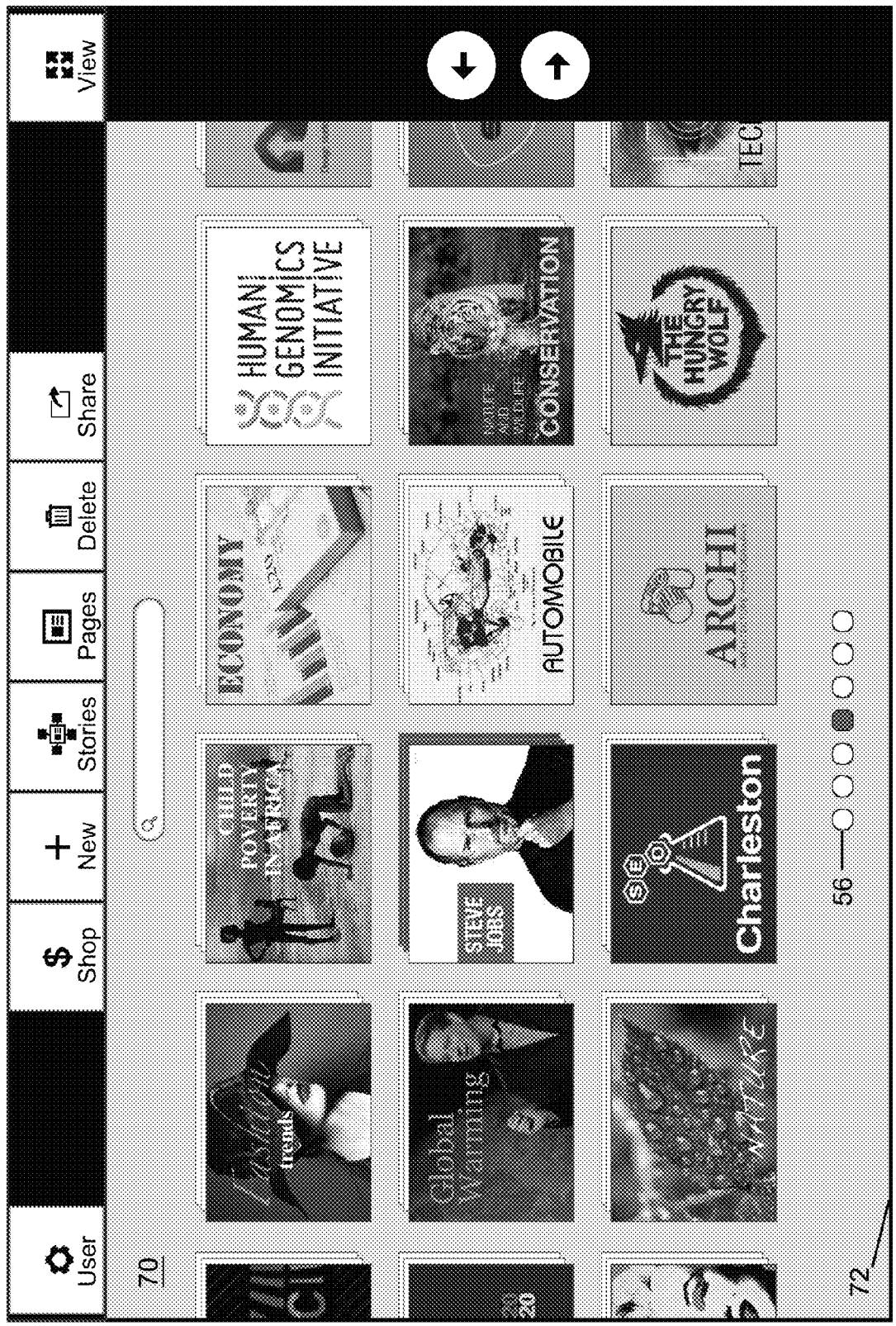
FIG. 5B is a front view of a screen shot in a media library where the library occupies the entire view.

FIG. 5B depicts the full-screen view of a media library mode 70, wherein the library view 72 occupies the entire visible space of the stage view. A search box enables the user to search within the contents of whatever collection of data is displayed in the view 72, which may comprise locally stored files, remotely stored files, web-hosted objects (e.g., slide objects and stories available for purchase online, media available for download online, a web browser window), and the like. The data in a library 70 may be user-generated content of the present user or of another user who has published or shared their library. Said user-generated content comprises any of a plurality of slide objects, slide contents, slide collections, story maps, presentations, and data stored in the memory means of the system. The invention also features a web-browsing mode (not shown), where the same events occur as when calling the library panels 71 or 72, but the panel is instead populated by one or more frames or windows showing a web content on the Internet, like HTML or XML, Flash and the like. Thus, libraries may comprise displayed content from a local source, such as a hard drive, or from a remote source, such as a resource on a network.

Advantageous Means for Rapid Slide Creation

An alternative slide creation procedure comprises an overlay means for showing a workspace analogous to any of the views depicted in FIGS. 4A through 5B wherein the GUI is rapidly toggled from a currently displayed mode, typically a visual discussion or presentation mode, to a "rapid slide creation" mode. The rapid slide creation mode comprises means for rapidly creating slide objects and page images from external content of diverse file types and media such that one or more presenters, or participants in a visual discussion, may add new user generated content to a slide collection and story map in real-time, or with a rapidity that preserves the fluidity, timing, and continuity of a live conversation among people via the platform of the present invention. For example, a rapid slide creation means may comprise logic encoding functions that enable a presenter to use the touch screen to demarcate visually displayed content from any source outside of the platform, such as on an Internet website or an online chatting forum (in which case the input content may comprise the actual text from a conversation), preferably by doing so using the touch-screen of a tablet PC (or comparable device having a touch-responsive input), and in one step, or very few steps, transform it into an image or object suitable as slide data content 40 in a slide object 14 and/or 41 of the invention, which is then automatically displayed in a page as a page image, and which can be dropped into a slide collection at any point in the slide collection data structure 13 and/or story map 17. Thus, as part of this method and in one continuous operation, a rapid slide creation means creates a new slide object and stores the imported image and/or object automatically, which can then be used immediately as a page in any presentation or visual discussion.

In some embodiments of this means for capturing external content into a slide object, the source content is a file or a page from another application, said application perhaps being a web browser wherein is displayed a page from a website on the Internet, or a page from another slide presentation file (which is converted into an appropriately compatible input for the present invention by specialized logic for recognizing and importing external file content), or a page from a .pdf document, spreadsheet, movie, and any other multimedia content displayable by a computer. In a preferred embodiment, a method comprises a step of "freezing" a view of a targeted external data file or object(s) and transforming it into an image, where the resulting image may be a bitmap, a table, or some other predetermined structure whose identity may be predetermined according to the file type of the external source content. Whereas, in other embodiments when the source content is a simple image file, or a demarcated region thereof, then the elected pixels are simply imported into a new image file as is done via a commonly understood function called a "screen capture."

In most cases, the image from the external source is transformed by said logic, such as transformed into a bitmap, and then it is included as a slide content file within a spontaneously generated new slide object, where said slide object appears bearing said image in a previously empty space in the stage area, or in a library panel. That slide object is then immediately ready to be dragged and dropped into a slide collection data structure and/or story path, the entire method from the step of demarcating the desired content through deposition in a slide object taking a few seconds or less, depending on the power of the particular device on which the platform of the invention is running.

Hereby, visual discussions can transpire in which participants may contribute new slide objects having new content, or impromptu content, that is generated and intercalated into a growing data structure in real-time, on the fly. This is a vivid example of one conceptual pillar of the novel paradigm embodied by the term "visual discussion." The applicability of this rapid universal slide generation module and method extends to business meetings, social media, and even visual telephony.

Advantageously, the software of the platform and its programs is built with especially fast bridges to libraries where user content is stored, such as files for use as slide content, as well as assembled pages and data structures, so new content can be assembled and deployed rapidly within the virtual graphical environment; for example, a new page can be created and intercalated into an existing slide collection and a story path therein, in a matter of seconds, even in circumstances where the changes alter the arrangement of multiple pages in the geometric simulation and displayed graphical rendition of the slide collection data structure.

And still furthermore, the method comprises embodiments adapted for capturing video and audio data, such as whole or partial segments of files such as .mov, .avi, .mp3, .wav, and any other, where the same automatic slide creation process is called but wherein further steps are included to add media control buttons or elements as appropriate for the content being captured and imported and assigned to said new slide object. Helper tools comprising automatically generated prompts may assist the user in these more complicated types of rapid slide creation.

Any type of data or file may reside in a slide object of the platform of the present invention as the slide content data of a page, because slide objects are data structures which are not bound to any particular presentation file format, and never need to be bundled into any presentation file output format, so therefore they may behave as true data containers or like pages on a website. The software of the invention includes algorithms for converting specific file formats identified by file types of external commercial applications, like .doc, .htm, .ppt, .xls, and so forth ad infinitum, into images, stored data contents, pages, and slide contents suitable for use in the various modes of the invention. Additional features are provided to perform operations that extract data from prior art commercial presentation software and/or to convert external files or objects into slides compatible with the software of the present invention.

Embedded Libraries, Dynamic Slide Objects, and Automatic Updates

The presentation software application of the invention also comprises a means for storing library content embedded within the software application, which is different from the prior art, such as PowerPoint, where slide libraries are stored outside the application (typically in another folder on a hard drive). The present invention, because of its major focus on providing its goods and services on mobile devices and networks, comprises means for populating individual user libraries with content via transmission over a network, and doing so automatically, or by subscription services. Such regular update features may allow a user to synchronize one or more local libraries with a central repository, or to generate dynamic slide collections comprising dynamic slide objects whose pages display regularly updated content hosted and provided by third parties, such as news, weather reports, blog and RSS feeds, advertisements, marketing dept updates, feeds from social media services (like Twitter and Facebook), and the like. Such dynamic content may be made available within a library, for optional use in future-created story data structures, or imported into previously created slide collections to refresh dynamic content in one or more appropriately configured slide objects therein. Thus, a presentation output made using the present invention may be intentionally designed to change and be updated according to a presenter's specifications using dynamic slide objects and dynamic slide data contents.

Unlike the prior art, there is not confining "presentation mode" required in the present invention, but a presentation may be given from within the slide collection mode, and virtually any other mode. The integration of the library mode 70 and/or panel 71 with the other modes and the GUI of the invention enables presenters to effectively manipulate the content of a presentation while delivering it, without aborting the presentation. This advantage extends even beyond stored content such that the presenter can harvest and assemble content from their libraries, web, external memory, and other remote cloud based locations without leaving the visual discussion space of the software application. For example, the library panel 71 may instantly convert to a web browser panel; an object for conducting a search operation of the content in the library is provided for receiving text input constituting a search string, which can be instructed to search in a specific location, such as in a local library, on a library stored on a remote server, or on the world wide web, and text from third party applications for chatting or sending SMS, and the like, may be applied in dynamic slide objects as dynamic slide contents. By this and other means, the present invention enables a user to create and manage different versions of the same content, and audience members may contribute. These flexible means for assembling, organizing, and managing content permit a user to quickly and easily adapt one story or presentation for multiple audiences and occasions, or to make changes to an existing slideshow by simply dragging and dropping story path images (e.g., graphical lines representing story links) instead of moving the content, and to instantly (even effortlessly) incorporate user feedback and audience/teammate contributions into a presentation. It is not necessary to edit or destroy a pre-existing slideshow in order to create additional slideshows using some or all of the same slide objects, because the equivalent outcome can be accomplished using alternative story paths from within one slide collection. If desired, slides can be linked across collections. And, these alternative and dynamic presentation outputs can be optionally created either as a single data structure comprising multiple branching and/or interconnected paths, or as a collection of separate and distinct data structures each having only a single linear path, as well as in every conceivable arrangement intermediate between these two extremes.

Slide content data items may be downloaded, uploaded, imported and exported from and to external storage locations, shared among different users over the internet or any other network, transferred across platforms, and bought or sold via commercial services. The data structures of the invention have been specifically designed to be cross-platform compatible and easily transferred among individuals. Additional resources assess and evaluate user actions, library content, and other log data and return customized recommendations for slide content creation and management, some of which are discussed below in the section dealing with speaker notes. Libraries and subgroupings of slides, or any data structure comprising one or more slide objects, may be shared as public resources over a network and may incorporate privacy management features. Networking and sharing functions are integrated with optional collaboration modes whereby multiple users may create, edit, share, comment, and otherwise cooperate on a single presentation project. The contributions from different users may be identified by a color scheme or by confinement to a specific layer, such as the types of layers discussed in the next section.

Specialized Slide Objects and Layered Story Paths

Figure 6A:
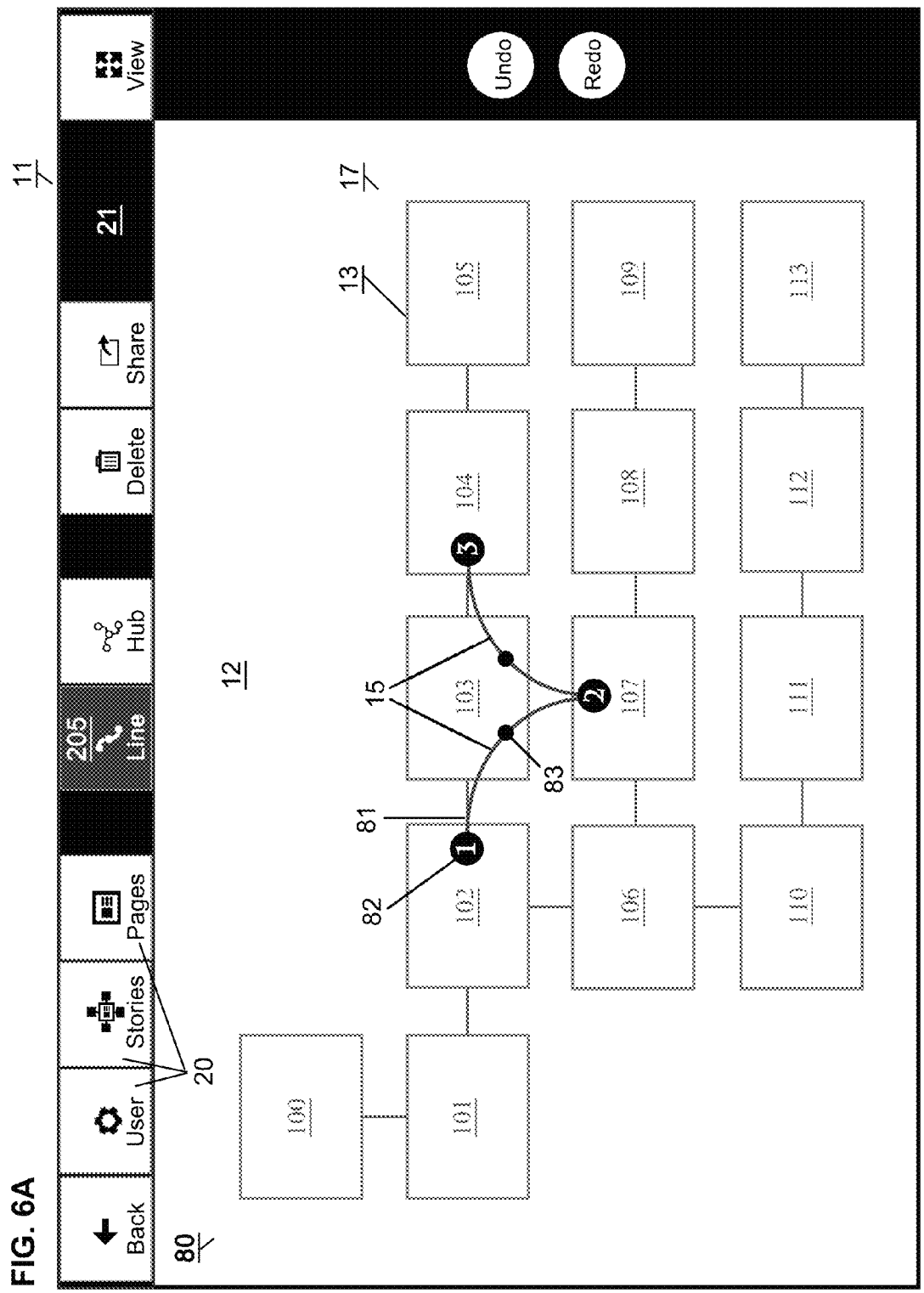
FIG. 6A is a front view of a screen shot of a slide collection illustrating a mechanism and method for creating a line path within the slide collection.

The present invention provides novel species of slides, as well as novel control means for arranging slides of a slide collection. For example, FIG. 6A, illustrates the "line path" overlay operation 80, which is a specialized command or mode for superimposing a new story path data structure on top of an existing data structure of a slide collection or story map. The user has selected the "Line" button 205 from among the control objects 20 in the top control panel 21. The stage view 12 is altered as the program enters into an editing mode, and the slides of the slide collection 13 are grayed out and rendered inactive (as compared to their activity when in visual discussion mode). Now the stage 12 is responsive to a different set of user commands, as via the touch screen: when any page is tapped the software creates overlay nodes 82 represented by solid numbered circles overlaid upon the pages (102, 107, and 104) in FIG. 6A. Nodes have story links 15 connecting them, which are represented as curved lines to distinguish them from the underlying straight-line story link images of the foundational slide collection 13, and both these nodes 82 and their curved story link images 15 may be dragged and dropped onto any of the pages (100-113) of the slide collection 13, thereby tracing the sequence and structure of the new superimposed "line path data structure," 81. It is also possible to layer multiple layers upon each other.

A line path 81 may be a distinct story path object that can be saved separately from the rest of the slide collection, or it may be an alternative story path within the presently displayed story map 17 or slide collection data structure, depending on user preferences. This enables the rapid creation and expansion of stories, improvisation in story structures during presentations, and the tracking of multiple users' input, and other such distinguishing traits, by confining certain types of pages or input into these distinct layers. The line path 81 of FIG. 6A was created, for example, by the user tapping first on slide image 102, which triggered the deposition of node "1" anchored there; next slide 107 was tapped, creating node "2," and the intervening link 15 was automatically drawn by the logic of the software program; and finally slide 104 was tapped, creating node "3" and its intervening link 15, and then the user terminated the function by tapping the Line button 205 again. The smaller solid circles 83 are intervening nodes which can be dragged and "snapped" into position on top of intervening slides (i.e., slide 103) to further specify the route of the line path 81 through the underlying data structure (e.g., 13, 17), or to anchor it to the underlying data structure(s).

Figure 6B:
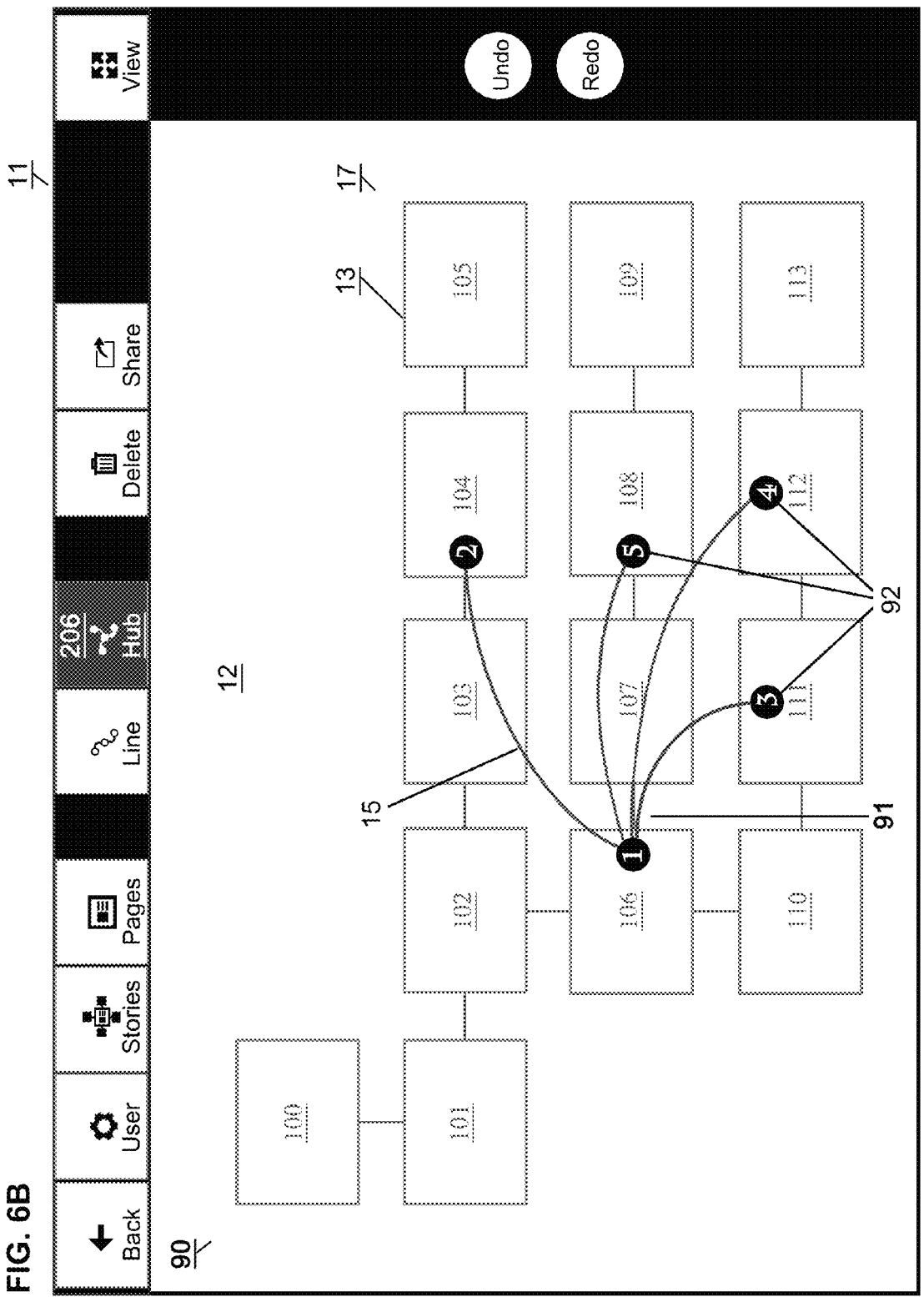
FIG. 6B is a front view of a screen shot of a slide collection illustrating a mechanism and method for creating a hub path within the slide collection.
Figure 6C:
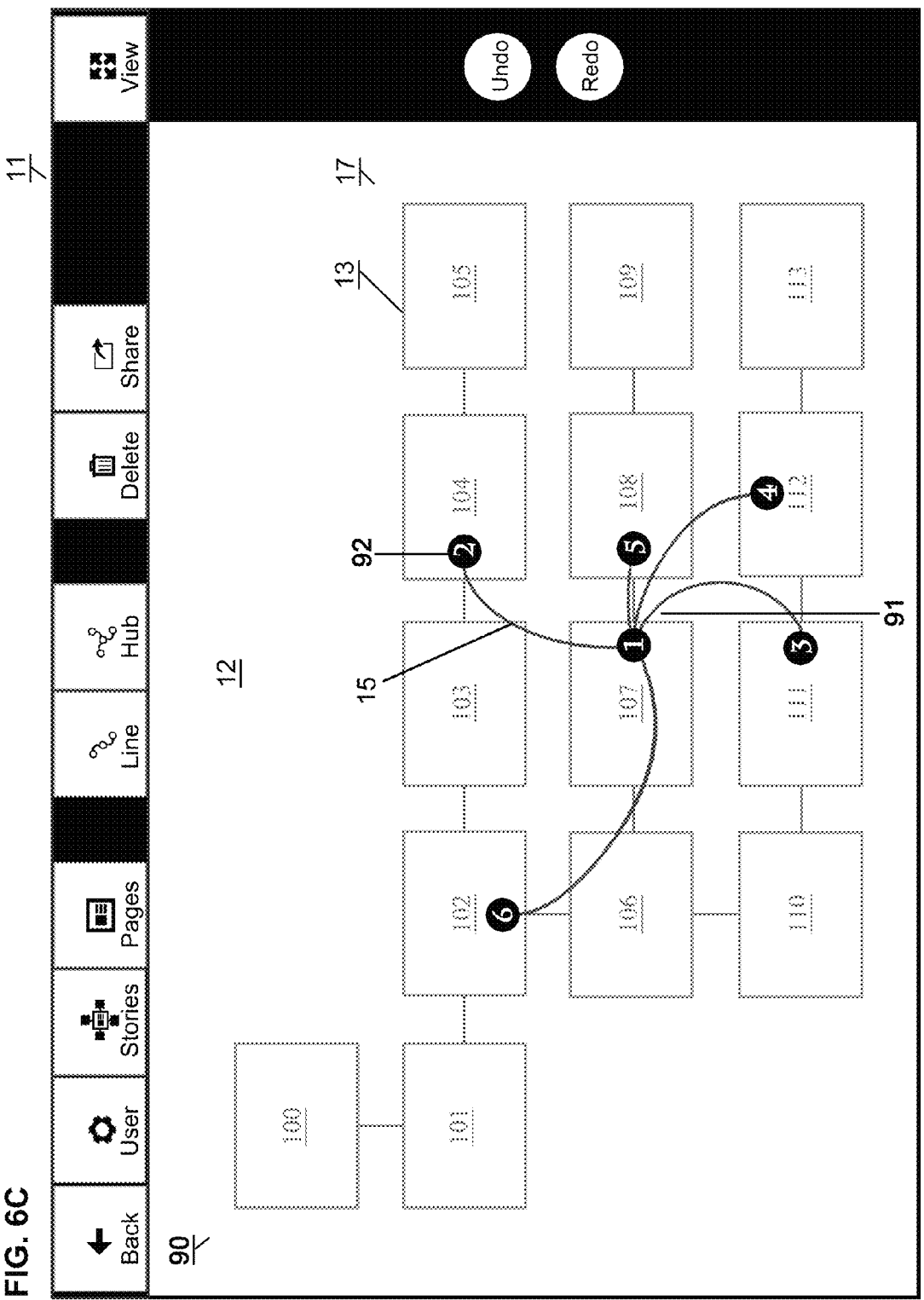
FIG. 6C is a front view of a screen shot of a slide collection illustrating an alternative mechanism and method for creating a hub path within the slide collection.

For another example, a hub path or "hub slide," illustrated in FIG. 6B, is a procedure for designating a slide object as the central node in a distinct hub-and-spoke data structure and which is useful for inserting stopping points within a slide sequence for discussions, question-and-answer sessions, review summaries, or other change-ups. A given slide may be toggled in and out of hub mode 90, allowing the presenter to choose whether and when to let an open discussion lead the way through the slide content or instead to continue onwards along a planned presentation path. The incorporation of this and other novel data structures and behaviors into the properties of slide objects of the present invention are illustrative of the many significant improvements whereby this software empowers consumers to escape from the confines of the linear presentation method and presentation mode of the prior art; and consequently, this empowers consumers to re-use and re-cycle same content for different audiences without wasting time building another slide collection or output file having the same content. In FIG. 6B, the user entered the hub creation mode by activating the "Hub" button 206, and then the user tapped on slide image 106 to create the central node "1" of the hub-and-spoke data structure 91. The nodes 92 are then created by tapping a sequence of other slide images (104, 111, 112, 108) analogously to the way a line path was created. A similar procedure was used to create the hub data structure illustrated in FIG. 6C, where the sequence of slide images tapped was (107, 104, 111, 112, 108, 102). The new paths created in FIGS. 6A, 6B and 6C can be overlays on the underlying data structure, adding alternatives via the linking means to the story paths that were already established, but not abrogating the older story paths.

Figure 7A:
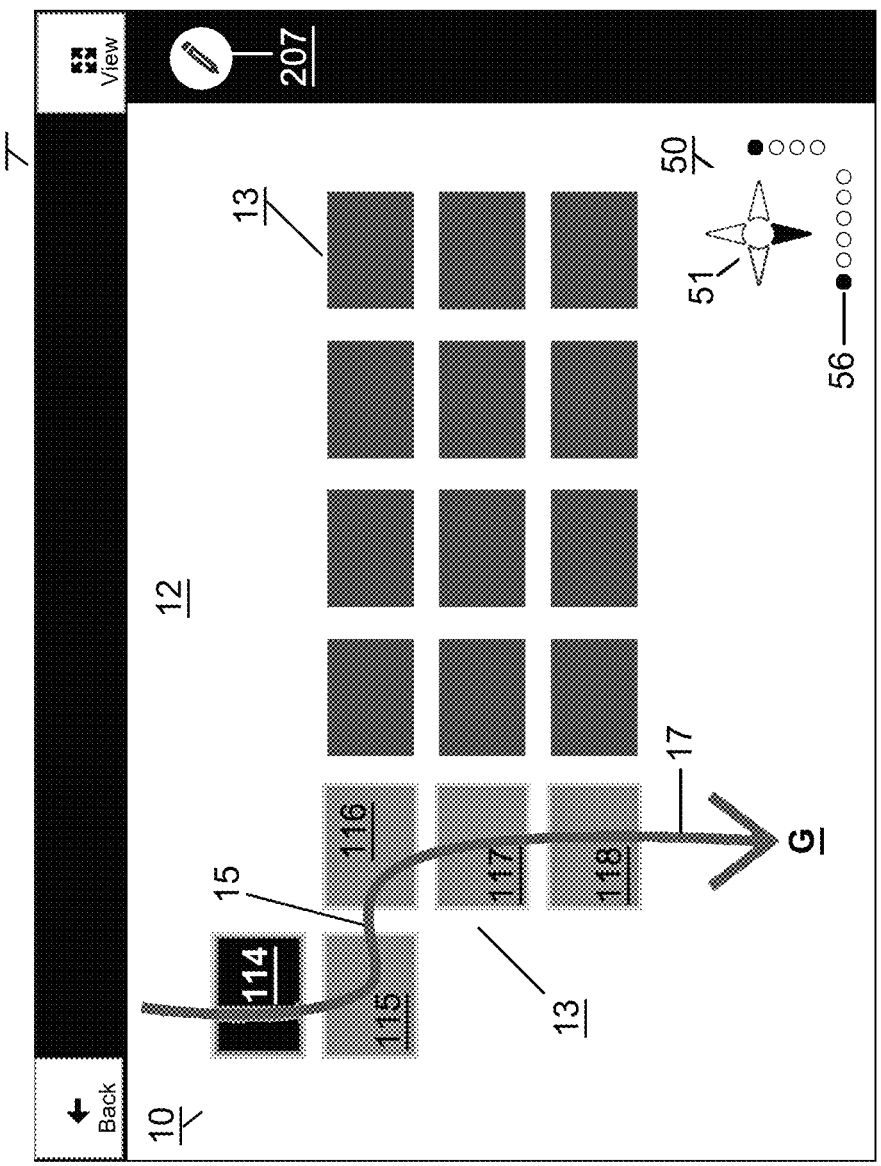
FIG. 7A is a front view of a screen shot of a slide collection illustrating an alternative mechanism for drawing story paths directly onto a collection of slide objects.
Figure 7B:
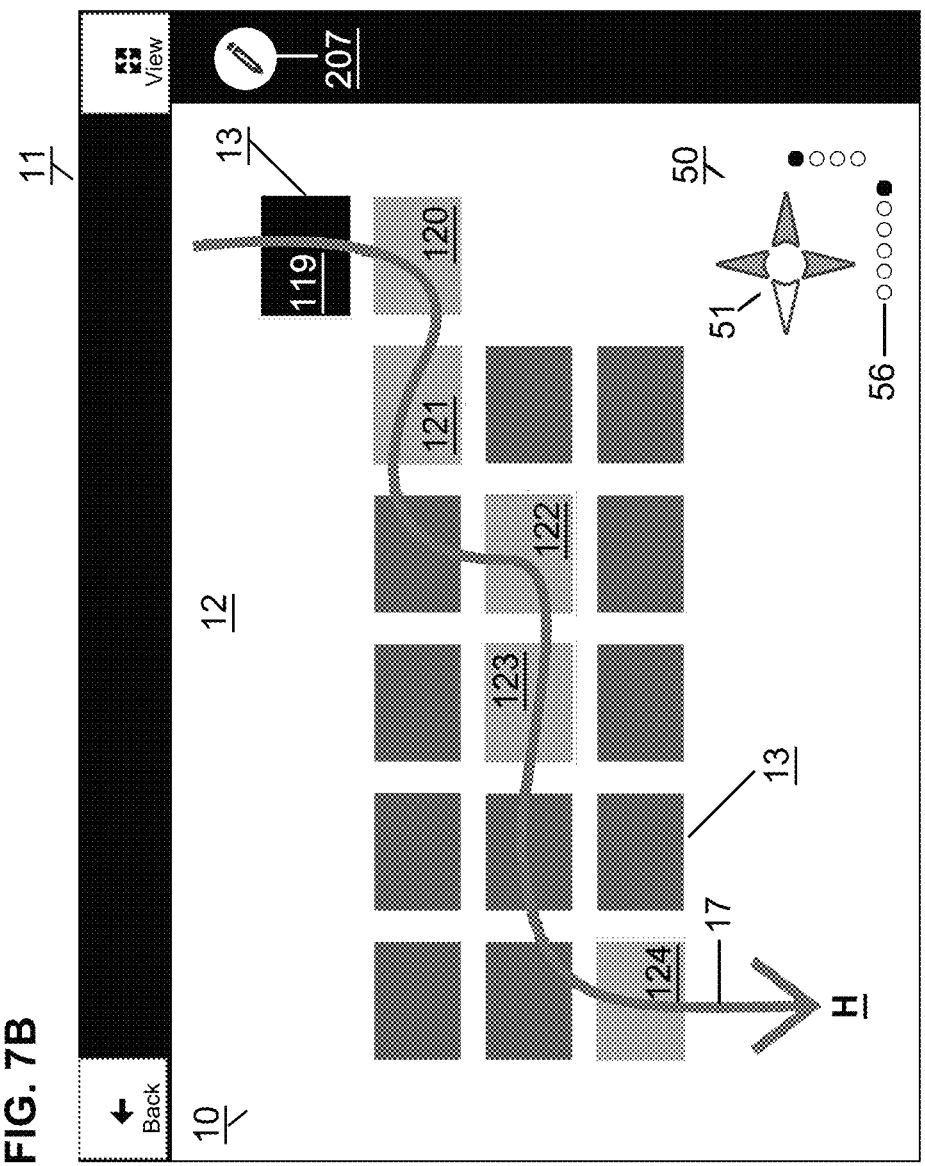
FIG. 7B is a front view of a screen shot of a slide collection illustrating the alternative mechanism for drawing story paths directly onto a collection of slide objects where a jump slide is applied.

FIGS. 7A and 7B illustrate an alternative or additional means for creating story paths within a slide collection, which is by using a finger or stylus or other pointer to draw a story path G directly onto the images of the slide collection 13 in the stage area of the slide collection mode 10. Here, the story map 17 is represented by an arrow drawn by the user; each slide that was traced over, and that sits beneath the path of the arrow 17, is a slide object in the story data structure 18 of the story path G, and the intervals between slides along the path of the arrow symbolize the story links 15. The first slide 114 is the start slide of the story path, which has been filled with a black color for illustration purposes, and the last slide is 118, while the intervening slides in the story path are 115, 116, and 117 (shaded with a light gray color). Unused slides are shaded in a medium gray color and are not numbered. Unlike the slide collection data structure of FIGS. 1A and 1B, the slide collection 13 shown here is unlinked; that is, the slides were arrayed in the collection on the stage view according to designated positions relative to each other in a slide collection data structure, but no links have been established connecting them, or the links have been turned off in the present view. Thus, by this technique, a user can first lay out a population of slides and then trace a story path through them, rather than being required to link the slide objects to each other immediately upon placing them in the stage view. This may be termed the "trace path" editing feature. A user may toggle back and forth between the story map view (as in FIGS. 1A and 1B) and the presently illustrated trace path view. The drawing function may be activated, for example, by a control object such as a pencil tool 207. A navigation means 50 is also provided on the stage, which is particularly useful when more than one page, or more than one layer, of slide objects is present in the slide collection (illustrated below in FIG. 7C).

FIG. 7B illustrates the same slide path-drawing procedure on a different population of slides and wherein a "jump" slide link is created. A jump occurs when slides that are non-adjacent in a first data structure are connected adjacently in a second data structure derived from said first data structure. For example, in this drawing, a slide collection 13 is arrayed in a grid of the visual discussion space 12, and a story path H is drawn connecting the first slide 119 to the last slide 124. The story path H proceeds through slides 120, 121, 122, and 123, which are all adjacent in the underlying slide collection data structure, but then it skips over an unused slide to slide 124, thus making a "jump."

Figure 7C:
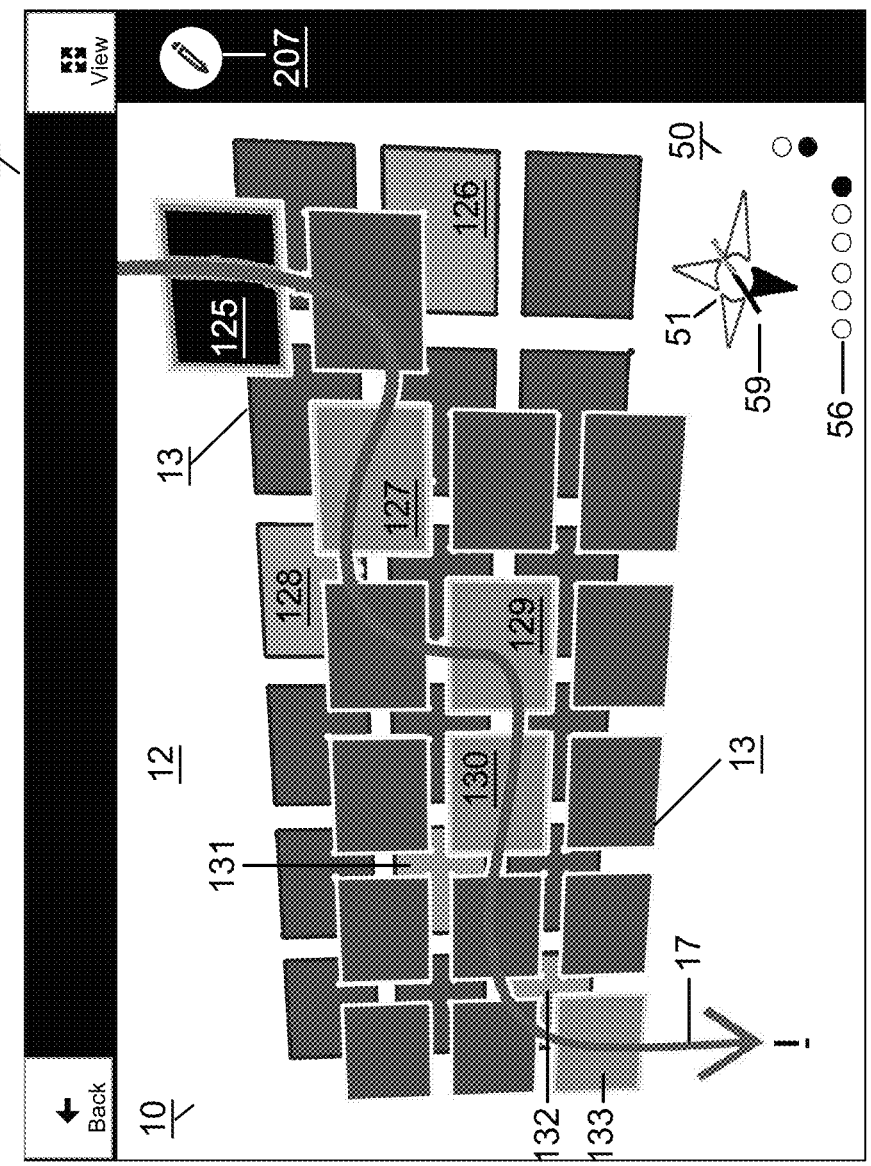
FIG. 7C is a front view of a screen shot of a slide collection illustrating the alternative mechanism for drawing story paths directly onto a collection of slide objects wherein a three-dimensional view is portrayed.

FIG. 7C demonstrates a multidimensional slide collection in a three-dimensional perspective stage view. As previously explained, an arrow is drawn to represent a story path I and a story map 17, in this case beginning at slide 125 and proceeding to slide 133. The perspective, zoom/depth, and other aspects of the three-dimensional view field of the visual discussion space 12 are controlled by manipulating the hands/arms of the compass navigation control object 51. In particular, a handle feature 59 extends from the center of said compass 51 which can be grabbed and moved, pushed and pulled (to user colloquial terms for interacting with an icon on a touch screen) such that as the compass graphic moves, rotates, and changes its angle of aspect, the apparent view of the slide collection data structure also changes accordingly. In this slide collection 13, there are two layers of slide objects in the z dimension, and the depth indicator means 56 represent the x and z dimensions instead of the x and y dimensions. The same three-dimensional view and control capabilities are available in the linked slide collection view of FIGS. 1A and 1B, and a user may toggle between said views.

Figure 8A:
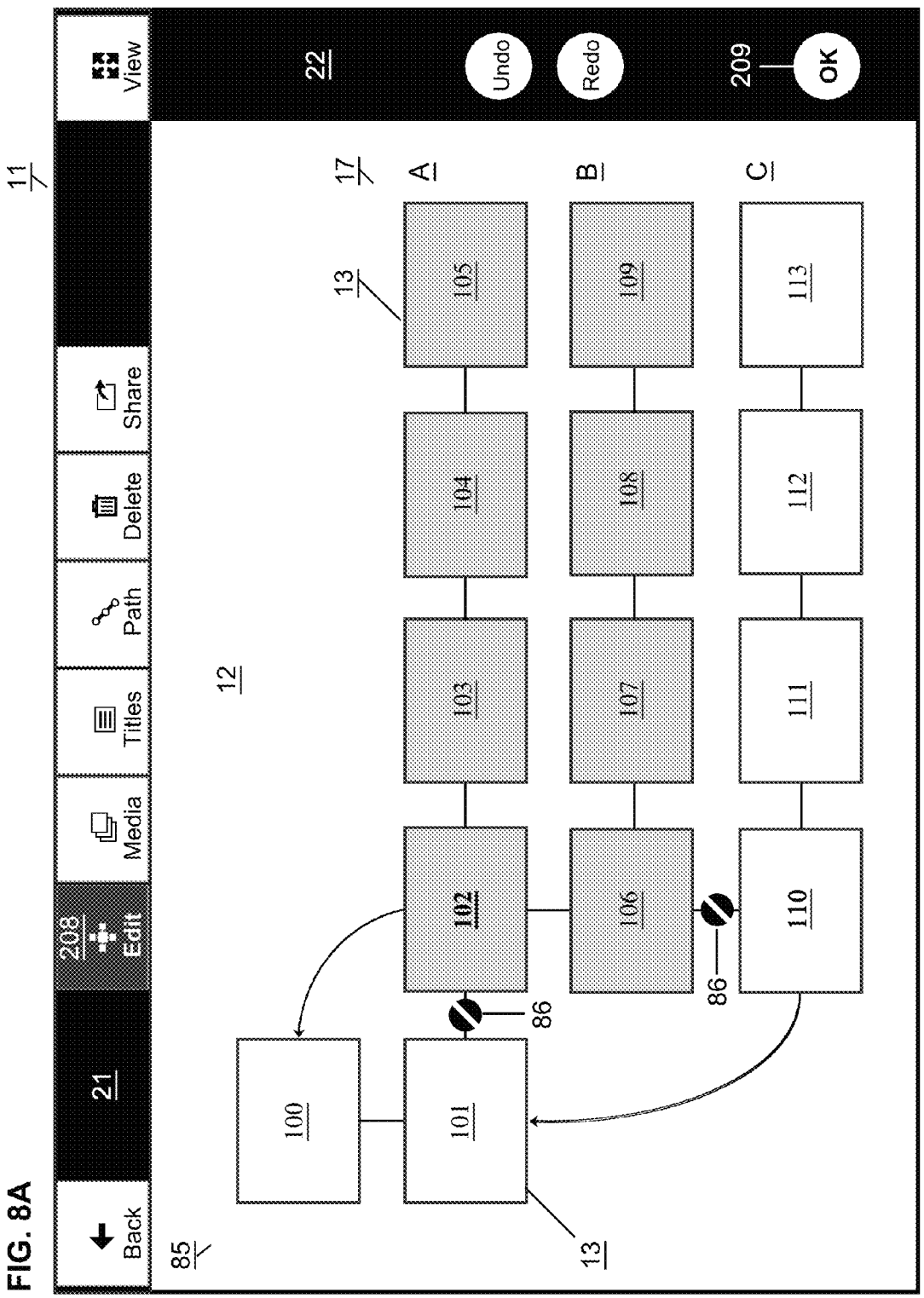
FIG. 8A is a front view of the screen shot of the slide collection in an editing mode before a reorganization of the story paths of the story map has been performed.
Figure 8B:
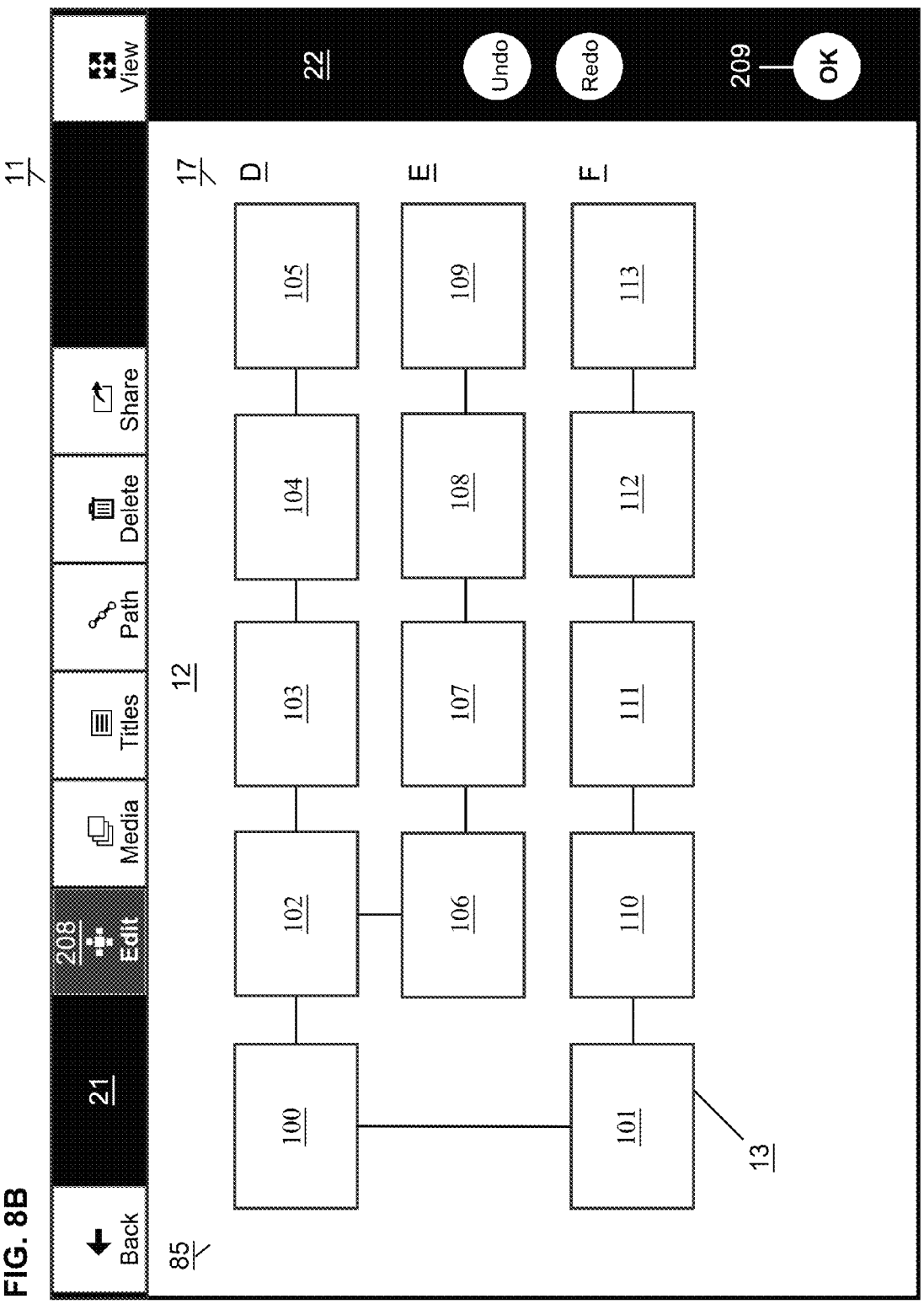
FIG. 8B is a front view of the screen shot of the slide collection in an editing mode after a reorganization of the story paths of the story map has been performed.

Returning now to the linked view of a slide collection, FIGS. 8A and 8B demonstrate the exceptional ingenuity and power of the present invention to manage and organize complex data structures comprising slide objects. FIG. 8A is a front view of the screen shot of the slide collection in an editing mode before a reorganization of the story paths of the story map has been performed. This particular story map editing mode 85 is activated, for example, when the user taps the edit button 208 of the top control panel 21. Then the user selects story links to be broken, which are represented by hatched circles 86. Breaking these two links as illustrated segments the slide collection data structure into three parts, a first part consisting of slides 100 and 101, a second part (shaded medium gray) consisting of slides 102 through 109, and a third part consisting of slides 110-113. The story paths A, B, and C will also be destroyed, after which the default start slides in each part will be slide 100, 102, and 110, respectively, these being the slides with the highest order in the new story map data structures based on their previous position in the sequence of the old story map. The user need only move one of these start slides to transfer the remainder of the part extending therefrom to a new position in the slide collection data structure 13. For example, the user drags slide 102 over and upon slide 100 to link slide 100 to slide 102 while slide 102 is still connected to all of its downstream slides as before according to the previously existing structure; this remainder has been shaded medium gray for clarity, and said movement of slide 102 is represented by a curved arrow in the top area of the stage view. Similarly, the user drags slide 110 over and upon slide 101 to link them, according to the curved arrow in the bottom area of the stage view, bringing the remainder of that part (slides 111-113) along with it. When the user issues a command or places a "break link" object 86 over a story link, the user may be required to hit the OK control object button 209 to effectuate the change. The final state of this slide collection 13 after all the changes have been completed as shown is illustrated in FIG. 8B. Notice that three new slide paths, D, E, and F are the result of the new story map 17. Note also that only four steps were required (the two link-breaking steps and the two slide-dragging steps) in order to transform the entire slide collection and story map so elaborately. These particular commands and editing functions are merely exemplary of this general functionality, and other means for accomplishing the same and similar results are provided in the various embodiments of the invention. In particular, the presentation program may provide logic for automatically determining which links to break and which new links to establish when a user drags a slide to a new position on the stage 12.

Means for Resolving Conflicts During Editing

Figure 9B:
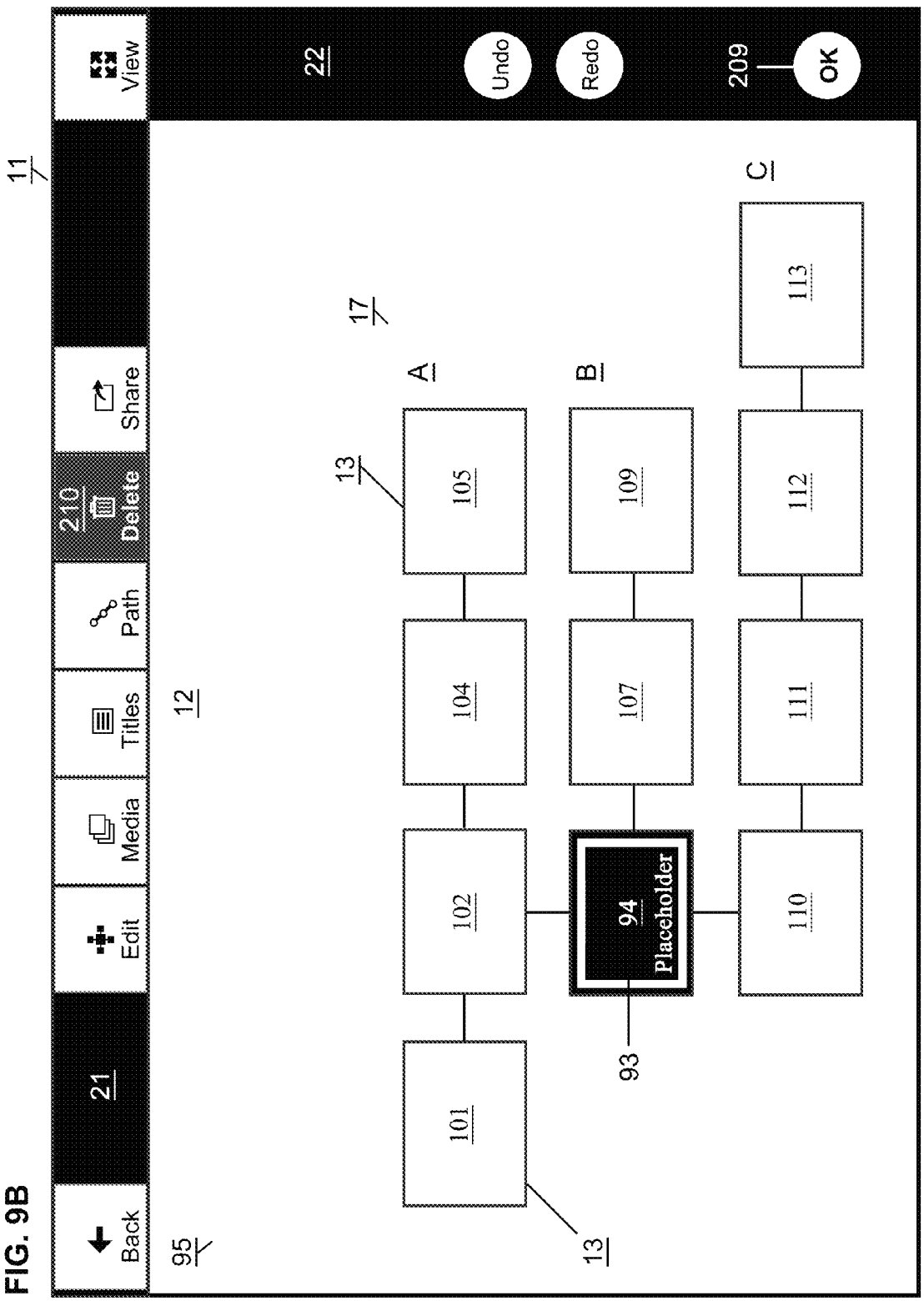
FIG. 9B is a screen shot showing the graphical user interface of the invention in the delete mode after the software has deleted the designated slides and automatically reorganized the data structures affected by said deletions, which reorganization included the insertion of a placeholder slide to prevent an error resulting from the deletion of a slide affecting multiple story paths.

One challenge inherent in the management of complex data structures arises from the fact that one change in one area of the slide collection or of a story path may have profound changes in other areas, even leading to null pointers and other potential errors in the underlying data structures. Therefore, the present invention provides a variety of means for avoiding such conflicts and errors, said means including an artificial intelligence means for generating and inserted a placeholder slide 93 into a placeholder position 94, as illustrated in FIGS. 9A and 9B, and/or means for providing a computer-implemented conflict-resolution routines for assisting the user in making a decision to resolve a conflict or prevent an error (not shown). The placeholder slide is most appropriate in situations where a node that comprised multiple links was destroyed. The conflict resolution routine is most likely to be applied where the user moves a slide to a position or in such a way that uncertainty arises, for example, when multiple possible reorganizations can result from the move with respect to the resulting story map and slide collection data structures. One implementation of this conflict resolution method would comprise a step of providing a message window containing a list of possible changes and requesting that the user select one of each set of options so that the final resulting structures are unambiguously determined.

FIG. 9A shows the graphical user interface 11 in a delete mode 95 which is triggered when the user activates a delete button 210 in the top control panel 21. The user designates one or more slides for deletion, and then taps the OK button 209 to execute the delete function and activate any conflict resolution functions that may be required as a result of the requested deletions. In this example, slides 100, 103, 106, and 108 have been designated for deletion as indicated by shaded lines 96 in their interiors. FIG. 9B shows the resulting slide collection 13 and story map 17 after the execution of the deletions. The start slide for all three story paths A, B, and C defaults to slide 101, and since only one intervening slide (103) was removed from path A, path A persists, although in a modified structure. Likewise, path B persists; however, only because a placeholder slide 93 was inserted where slide 106 was deleted, otherwise paths B and C would have been destroyed since the progression through intervening slide 106 from slide 101 would have been impossible or ambiguous. The same applies for path C which also persists.

Annotations, Speaker Notes and Split-Screen Display Modes

Figure 10A:
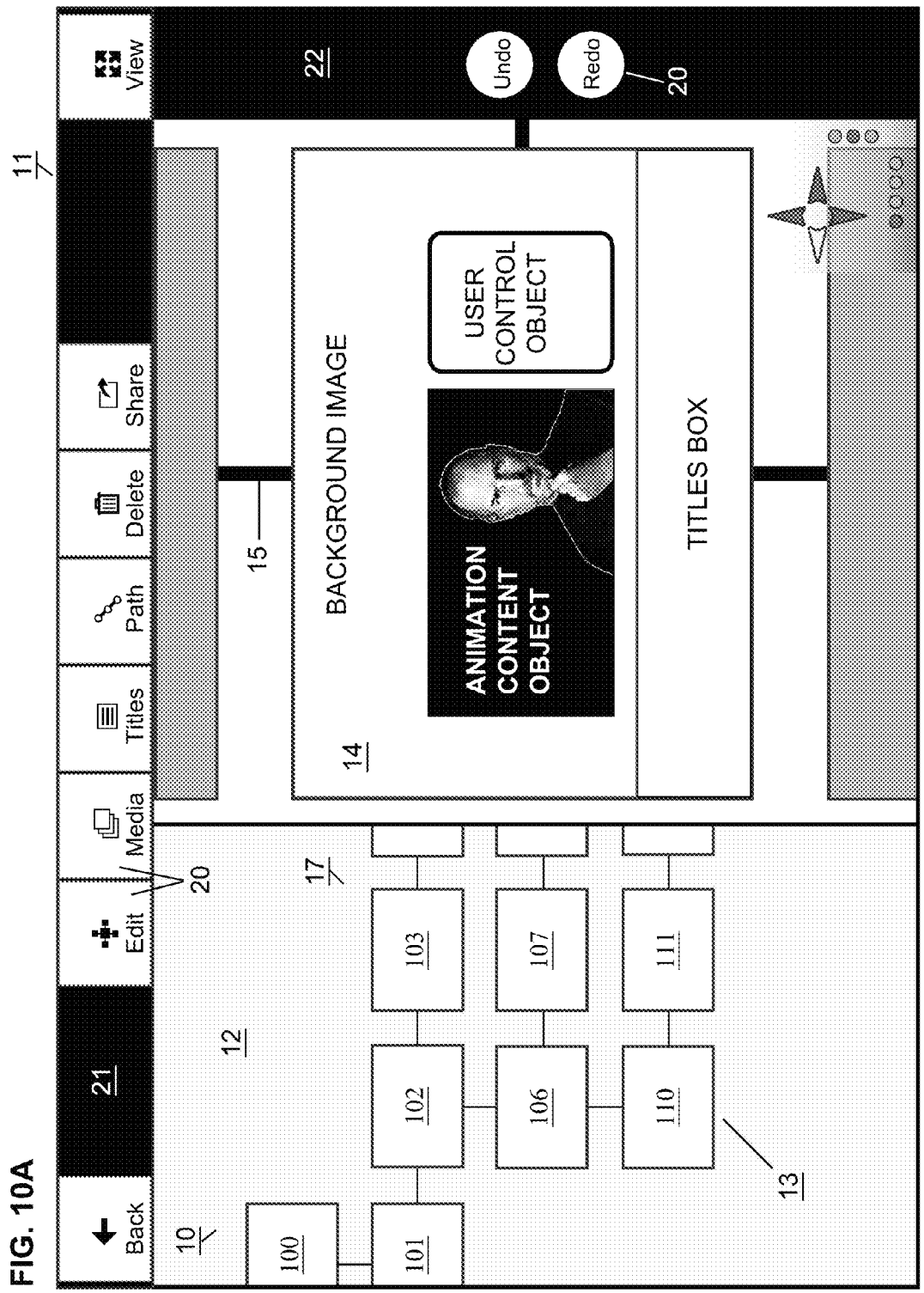
FIG. 10A is a screen shot showing a screen partitioning scheme, or "split-screen" functionality, of the invention where a sliding view panel comprising a particular interface or mode of the GUI is overlaid upon the visual discussion space of the GUI.

In a visual discussion mode, and other modes, the user of the software of the present invention may split the screen of the GUI 11 into halves, thirds, and various other sections where different panels and views are overlaid upon the visual discussion space 12, or upon other present contents output by the video display means of the platform. Split-screen views may be utilized for almost any particular workspace/mode of the invention, enabling for example a dual-view presentation environment as shown in FIG. 10A, wherein a left portion of the video output display comprises the virtual discussion space 12 and a right portion of the display comprises a close-up view of a selected page image 14.

Figure 10B:
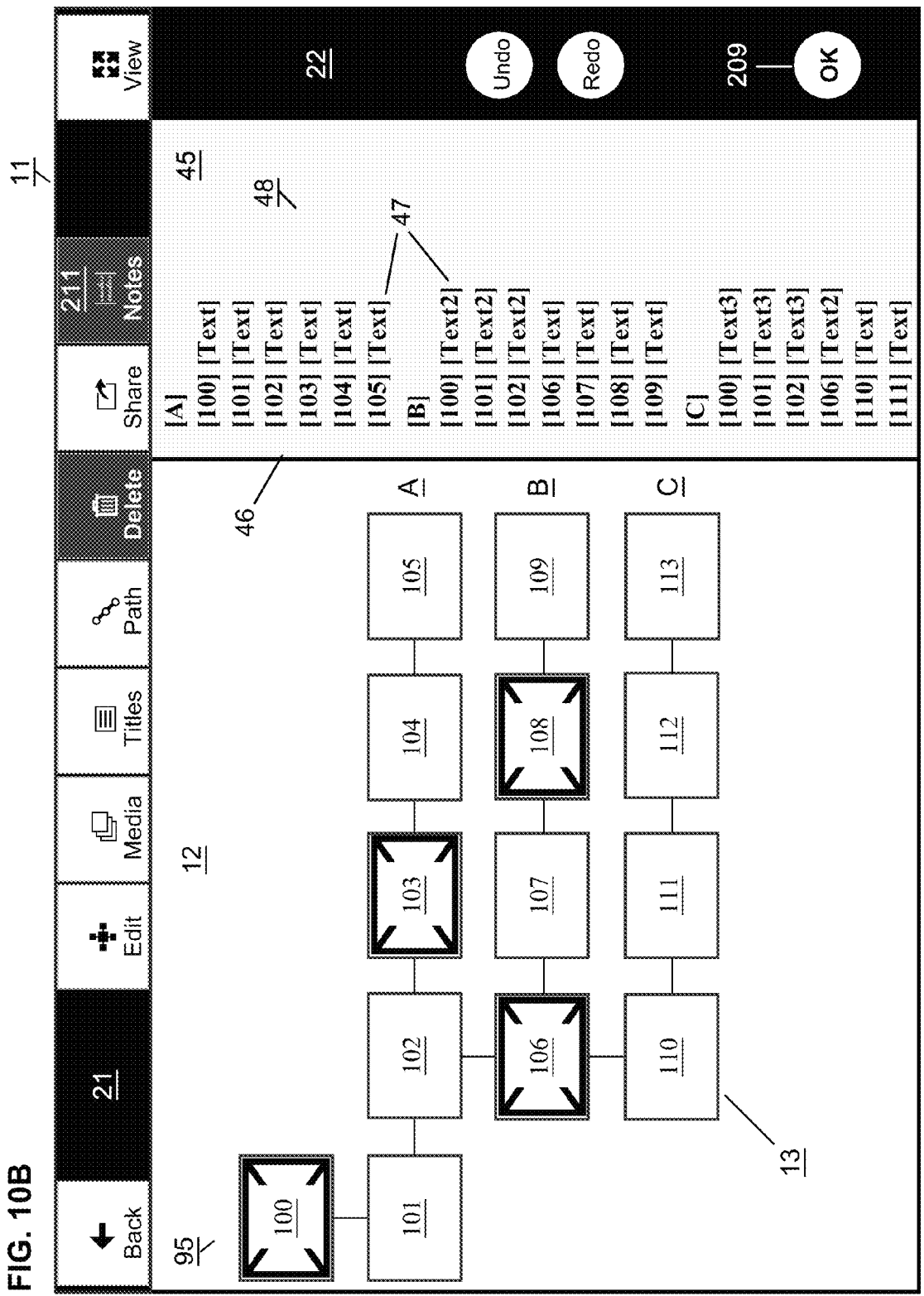
FIG. 10B is a screen shot showing a speaker's notes feature of the invention in an annotations panel occupying a portion of the GUI showing a first sequence of slide notes compiled into a first set of speaker notes corresponding to a first arrangement of the story path.

FIG. 10B is a screen shot of a display mode view showing a speaker's notes feature 45 in the graphical user interface of the invention in an annotations panel 46 occupying a portion of the view within the GUI 11 showing a first sequence of slide notes 47 compiled into a first set of speaker notes 48 corresponding to a first arrangement of the story paths (A, B, and C) in the story map 17 of the slide collection 13 previously displayed in FIGS. 9A and 9B. This panel was opened, for example, after the user tapped the "Notes" button 211 in the top control panel 21.

Figure 10C:
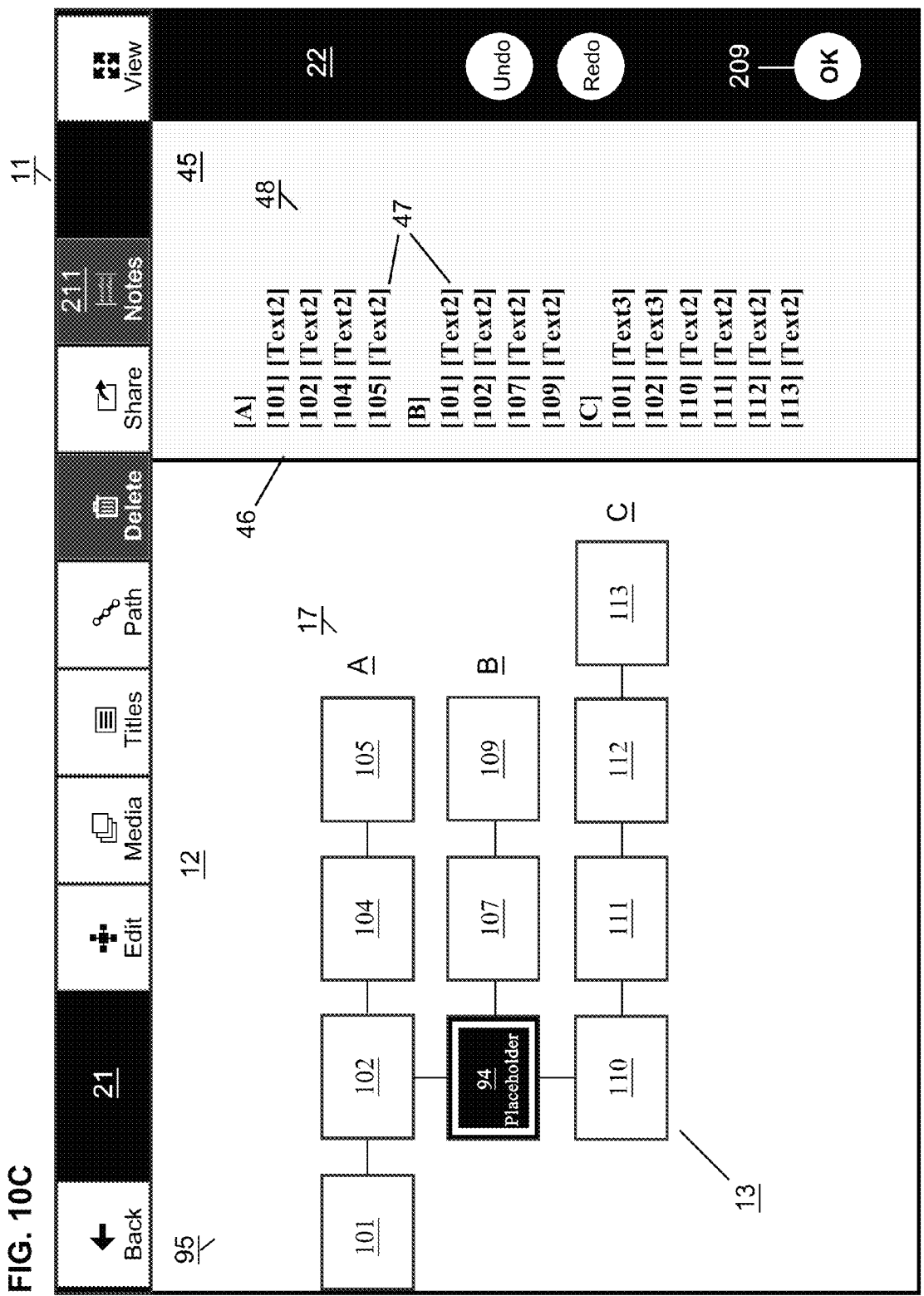
FIG. 10C is a screen shot showing the speaker's notes feature of the invention in the annotations panel occupying a portion of the GUI showing a second sequence of slide notes compiled into a second set of speaker notes corresponding to an edited arrangement of the story path.

Speaker notes can also be nonlinear, comprising a dynamic data structure that changes in synchronicity with changes made to the slide collection 13 and story map 17. For example, FIG. 10C is a screen shot showing the speaker's notes feature 45 in the annotations panel 46 having a second sequence of slide notes 47 compiled into a second set of speaker notes 48 corresponding to the edited arrangement of the story path 17 after the execution of the delete function in FIG. 9B.

More specifically, in FIG. 10B, the user has tapped control button 211 to invoke an annotation mode 45, so that while discussions are taking place, and new insights come about, these new ideas can quickly be added by typing new notes into the designated note table for a particular slide object/page, or so that as the story path is rearranged, the speaker notes script is rearranged accordingly. The software of the platform may enable a variety of means for making and organizing annotations correlating to slides of a slide collection. A first option for adding annotations (not shown) is to use a stylus or pop-up graphical keypad (not shown) to write directly into a text file saved in the slide data structure, or page, to which it pertains. A slide data structure may comprise one or more fields for storing or pointing to text strings, which in turn are accessible by secondary routines that gather and compile such text notes into a speaker notes file which can be displayed 48 according to the sequence order of a live story path, such that they are visible for example in a side panel 46 of the display as a cascade of text strings 47 ordered according to the projected story path, and according to the actual story path up to the present point in the presentation.

For example, in the annotation feature as well as speaker notes feature the invention may accommodate the introduction of a notation slide (not shown) upon command when a speaker wishes to attach input and/or written feedback to a slide object/page. The notation slide may be an overlay slide, layered upon the slide collection data structure 13 analogously to the layering of hubs and line paths discussed earlier, and positioned correlative its corresponding page in the story map 17, where the annotation slide is of a specialized class of slide objects adapted for containing and displaying annotation content. Annotations slides (and other specialized types of slide objects) may not only be added as an overlay page upon the page being annotated, but also intercalated into any existing story path. Thus, the annotation slide can be visualized in the visual discussion space as part of the slide collection data structure 13 but may also remain distinct to reflect its special classification. Also, annotation slides and other types of special slide objects may be identified as having an ordinal position in a separate functionally exclusive data structure comprising only one type of slide object, in this case an annotation type of slide object, so that these overlay pages record secondary content that emerges during a dialogue/discussion and are themselves arranged into a data structure (analogous to a story path). The overlays can also be made dynamic, so that for example they record new information that is dynamically generated during a conversation or input by a participant in the visual discussion taking place. Such functionally exclusive data structures can be fed into various other optional routines of the program, such as the speaker notes feature, to provide a sequence of information-containing elements by which a speaker script may be populated in a display panel for notes or dialogue, such as represented by the speaker notes script 48, for example, of FIGS. 10B and 10C.

Slides created in an annotation mode may be illustrated in the visual discussion space 12 as hovering over, residing nearby, or linked to their associated pages in the slide collection data structure, and they can be toggled on and off; they may also deposit their sequential contents into or through the notes fields of the corresponding slide object for inclusion in speaker notes, dialogue transcripts, and other types of files relating to speaker scripts and written descriptions of story paths. These annotations are saved with the story map and/or slide collection, but may also be separately distributed without the story or its page images, as in a text document format (pdf, doc, xml, html, txt, etc.) and distributed to other parties.

As stated above, speaker notes, due to the behavior of their underlying and corresponding story data structures, may also form nonlinear data structures that may change depending on the path(s) drawn in the visual discussion space, as demonstrated in FIG. 10C. Depending on story path, the discussion notes 48 change to mirror changes in organization of the slide collection 13 data structure when an edit causes a rearrangement of nodes in a story path. Thus, notes applying to a page having a different position in a new arrangement from its original position in a prior arrangement are correspondingly reorganized in the annotations dimension Not only can the applicable annotations be rearranged to reflect the organization of the corresponding pages 14, but also can additional, alternative presenter notes exist to discuss a different version of the story as it emerges from the different arrangement of the story path. Notice that in FIG. 10C, the actual text of the individual slide notes corresponding to certain of the pages has changed because the actual story path has changed; since a different story is being presented, a different script has been generated, which is an advantage above and beyond merely re-arranging slide notes.

This feature highlights the power of having dynamic and/or nonlinear story paths that can be structurally edited by moving pages and adjusting story links; it is responsive to the subtle but powerful maxim that narrating is the art of producing a spatio-temporal manifestation of the sum or product of the concepts presented in one specific topic; therefore changing the position of a page in a story path changes not merely the order of events, but in many cases this also changes the identity and message of the story. When the spatio-temporal arrangement of a narrative can be visualized from a higher point, at the level of its discrete base elements in a visual discussion space, which in this case comprise slide objects and story links, rather than only at the surfaces of slides shown one-at-a-time, then each presentation has a unique "atomic" structure, like a distinct molecule or a chemical formula, which comprises higher-order meaning than can be perceived in a close-up, hands-off slide show. Inferences may be drawn and deductions calculated about narratives, topics, and slide collections based upon their manifesting recognizable morphologies.

For example, FIGS. 11A and 11B illustrate two hypothetical slide collection data structures 13 depicted as graphical representations of their story maps 17 as they would appear in a visual discussion space of the invention. In FIG. 11A, the main story path K runs directly left to right comprising pages 150-155, while at each page 14 therein vertical paths ascend and descend from each of these pages. This is a bottle-brush morphology, and it indicates that there are parallel threads of details running along with the story path K, which details may provide technical or historical or other ancillary information about the slide content of the pages along the main path K. The intention of the presenter is to stay on the main path, but at any time she, or her audience members if so authorized and equipped, may access the aforementioned ancillary details. Thus, the presenter or an independent member of the audience viewing the presentation as a TABLO on his or her own tablet PC or other personal electronic device may acquire the ancillary knowledge they desire by stepping up or down vertically as the narration progresses through K horizontally. If an audience member is authorized and inclined to submit his own content to the presentation, it may be provided in a conditional state such that it may require confirmation by the presenter, and one such user-added page is illustrated by the dark shaded page image in FIG. 11A.

The advantages gained via the present invention's proportional and accurate graphical depiction of the superstructure of a slide presentation, based upon its data structure(s), are not trivial. If a viewer cannot see the conceptual landscape of the presentation, then the viewer is not aware of a dimension of descriptive information that would be valuable for enhancing the precision and depth of understanding a narrative of the presentation. For example, where a page of a slide object has multiple story links and is a node where a story path branches into three paths, this structure signifies that a concept has just been subdivided into a plurality of component concepts, occupying a lower position in a hierarchy, existing as one of three sibling elements, two of which may never have been revealed if this were a slideshow of the prior art. By acquiring this spatio-temporal information, the viewer has immediately expanded his or her conceptual awareness of the subject matter and has also formed synaptic connections to other, formerly hidden relationships, such as said relationship between three sibling concepts branching from a page whose contents present their conceptual common ancestor.

A practical example of these benefits may be expressed in the following scenario. FIG. 11A illustrates one type of data structure that facilitates a visual discussion; presenter gives a player and a tablo to each participant. Presenter then begins at slide 150 and proceeds in a linear sequence from left to right through the middle column, story path K. As she progresses, the audience members may each navigate through their own iteration of the TABLO. The presenter can focus on the core concepts, while the technical specifications of each concept are laid out in greater levels of detail in the descending paths, and examples or practical applications of the concept are provided in the ascending paths. If any concept is confusing, and the audience members are not able to understand it even after probing upwards and downwards in their own viewer, they may ask the presenter to elaborate. Thus, audiences whose members have heterogeneous skill levels, or an unknown depth of knowledge about the concepts in a presentation, may be adapted to. The presenter is thus communicating with the audience on multiple levels, and can quickly move to a different level of detail in the main presentation when audience members signal their preferences or give indications that a certain deviation from the main thread is required to maintain optimal interest and comprehension.

And, if a participant wants to add content to a story path or other data structure of a slide collection, even during a presentation, the platform enables sharing of data objects from libraries over a network. A new slide 165 can be created at the fingertips of a participant, inserted right into the data structure and updated in the presenter's collection, or alternatively, shared with the presenter who herself inserts it into the slide collection, simply by dragging and dropping right in between existing slides where desired.

This description further highlights the great magnitude of advantage provided by the system in its ability to harness and capture the superstructural features, in a way like fingerprints, that visually reveal relationships and patterns and shapes which arise from the conceptual structure of the underlying topic as it must be expressed in discrete slide objects linked in logical sequences driven by the conceptual structure of a topic. The invention can build narratives that have greater depth and richness by imposing nonlinear, even elaborate and recursive story paths, upon the narration storyline, and thereby it can store information in a geometry resembling the neural architecture of a neuronal map, and thereby it can also impart new layers of information content to a multimedia presentation, making them more persuasive, information-dense, more tightly integrated and more comfortably arranged, more stimulating to the eyes and involving more ganglia in the brain by virtue of its expanded dimensionality in terms of both the nonlinearity of its slide data structures and the inclusion of higher-order geometric data describing the relationships among the concept components of the slide collection, thereby enabling the discernment of meaningful traits and patterns that contribute to understanding and being engrossed by the narrative of the presentation.

These data structures, mimicking the neural networks of the mind, are a superior storage means for information compared to linear linked lists or two-dimensional arrays of slide images that show none of the story links, as is typical of the prior art. Neuron-like networks of complex branching connection patterns are a model paradigm for representing concepts as comprising spatially and temporally distinct objects expressing relationships and behaviors according to the slide content and its distribution among the pages of the story map. The present invention displays narratives in distinctive, edifying geometric renditions of a story map teaching quantitative and qualitative lessons about the underlying informational and conceptual components, and conveying higher-order layers of information inherent in a particular slide collection or story path.

In another valuable feature arising from the distinct advantages of the present invention, a page that conveys one simple concept can comprise an element for use in many story paths or slide collections. Furthermore, alternative story paths need not be parallel to each other, but may also intersect and overlap. For example, FIG. 11B depicts a more complex story morph wherein the graphical representation of the story map resembles something like a torpedo or a corkscrew. Therein, some slides are common to all story paths, but for the bulk of the narrative, three intersecting story paths dominate. Page 156, for example, is an intermediate part of story paths M and N but not L. Thus one idea can be used/reused in many stories and one story can be told in many ways, because of the unlimited multidimensional and nonlinear storytelling mechanisms of the present invention. This graphical means for geometrically rendering a story path in a visual discussion space based on said story' paths actual logical data structure as stored in computer memory is not only powerful for delivering presentations, but also for organizing information; because a user of the present invention can see how different ideas are connected and since such connections are very easily editable, the program enables one or more developers, presenters, or everyday people to arrange, connect, edit and rearrange discrete concepts intuitively and visually, which is itself a productivity enhancing feature of the invention.

In these same ways, the speaker notes comprising the narrative's text script for delivering the verbal layer of information germane to the story, must rearrange, and must even be substituted with new speaker notes at some points on a story path, whenever the corresponding pages (i.e., concepts) are rearranged to generate one or more new story paths. After a significant structural edit to the slide collection data structure, even if no slides are added or removed therefrom, the viewer of that presentation is being taken on a different journey than would have been experienced before the edit; with a different purpose, and having unique events and transitions throughout the narrative, and all of this structural matter is informative, and a presentation is therefore made more informative, intuitive, interactive and powerful by the visual discussion paradigm of the present invention. Therefore, alternative slide notes 47 are provided for the same slide objects in different story paths, as represented by the set of speaker notes 48 produced in the annotations panel 46 of FIG. 10C.

The speaker notes features comprise additional means for accomplishing particular functions. For example, they may comprise a means for performing and analyzing word count data, and/or semantic relationship data (i.e., word associations), to automatically determine which sets of speaker notes contain themes or keywords that relate to concepts identified as descriptors of slide objects, descriptors such as metadata associated with a page saved in a library. Alternatively, slide collection data structures can be arranged according to their associations with a most common word used in the speaker notes of a narrative. The applications of the invention will track the most common words that appear on speaker notes, because the discussion is driven by the audience, and so the content is viewed in the order the audience wants to see it, and can be called up or jumped to in the visual discussion space precisely when they want to see it.

The speaker notes features may further comprise means for tracking data associated with speaker notes, such as feedback data from an audience or automatic feedback data based upon behavioral information gleaned from a TABLO that was published by a publishing party and acquired when viewed by another party. A publisher or presenter using the platform of the present invention may edit speaker note content based upon inferences or directly expressed opinion content of one or more consumers. Thus, individual consumers may receive presentations having personalized presentation notes, pages, story paths, and slide contents.

Presentations to Player/Viewer Modules

Figure 12A:
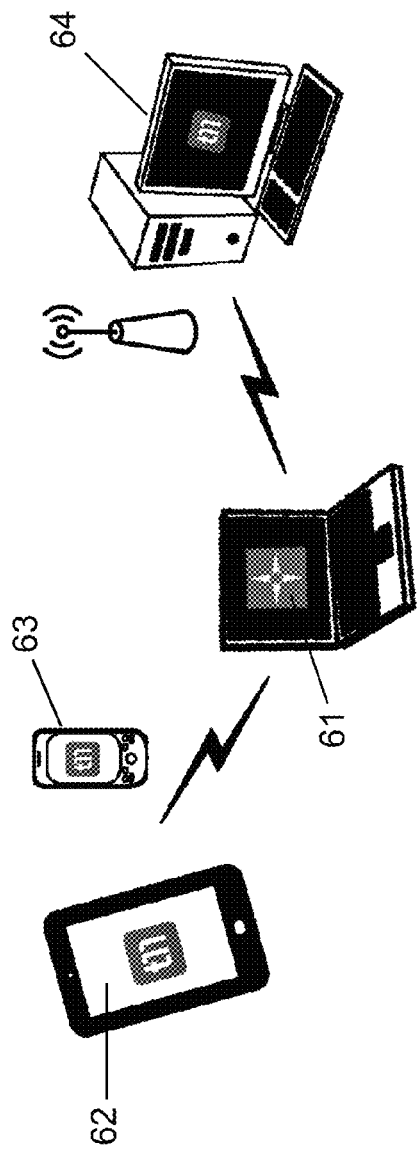
FIG. 12A is a schematic diagram illustrating a mobile visual discussion comprising a plurality of devices communicating with a networking service of the platform of the invention, where a presenter on a laptop computer is hosting a live presentation of a narrative being attended by people on said devices ranging from tablets, to smartphones, to home PCs.
Figure 12B:
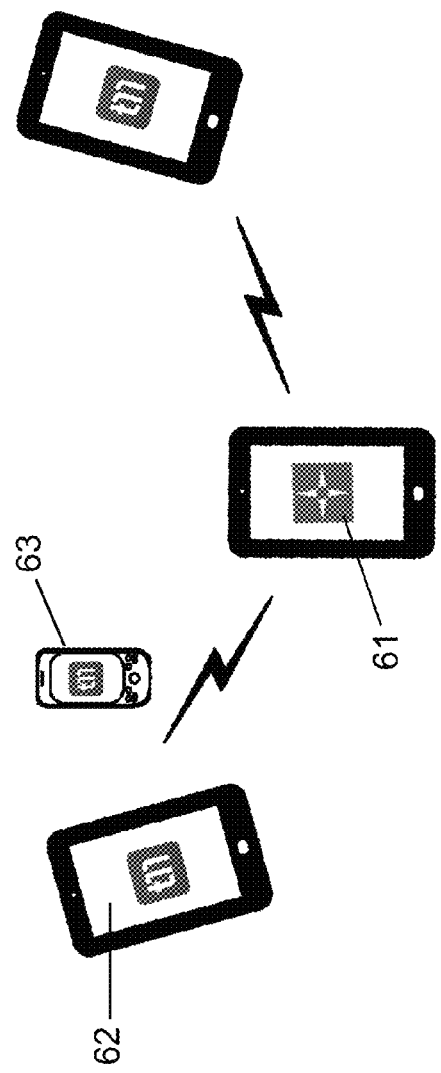
FIG. 12B is a schematic diagram illustrating a mobile visual discussion comprising a plurality of devices in remote locations communicating with a service of the platform of the invention, where a presenter on a tablet PC is hosting a live presentation of a narrative being remotely attended by people on an assortment of other devices over a wireless network.

When at least one of two devices is equipped with the presentation software program of the invention, the one device may be used as a remote control for the application on the other device. A remote control mode on the one device 61 is set while identifying the other device on a network, where such other device might be a tablet PC 62, smartphone 63, or personal computer 64 belonging to an audience member/discussion participant, as sketched in FIGS. 12A and 12B. Then, by interfacing with the application on the slave device(s), the master application 61 may to cause one or more of the controls of the GUI to appear on the display of the remote control device(s), which transmits control information to the slave device in order to execute the presenter's instructions for interacting with the graphical virtual environment. The unframed, full-screen picture of the visual discussion space is output to the video display of the slave device in an audio-video feed of the presentation, while any number of additional devices used by audience members or discussion participants may log into the same network or feed to receive the same audio-video content, or even to receive custom content supplied according to the participant's identifying information or access permissions. TABLOs can be dropped onto other tablet devices locally, and presentations can be shared, live or as prearranged TABLOs, through a master/slave protocol or other means. For example, a presenter 61 can share a TABLO locally with other users on their compatible mobile devices (e.g., iPads) enabling this audience to browse the story map given to them by the presenter while the presenter independently delivers a live presentation to them via a separate video display device (e.g., a projection screen in a meeting room) wherein the presenter may use his or her discretion about how to navigate the visual discussion (e.g., the presentation) through the story path(s) laid out in the story map.

These presentations, comprising live-actual visual discussions, may be saved and published as multimedia objects in cyberspace, such as on a website. A TABLO may be regularly and/or automatically updated to reflect changes in content based on real world events. For example, a presenter is hosting a TABLO online that provides a personal profile comprising pages describing her life history, interests, career activity, and other personal information. She meets someone at a coffee shop and she wants to grant him access to her TABLO-based profile. Rather than directing him to a URL or a social media profile (e.g., Facebook), she can instantly provide him with a viewer for her TABLO, for example by using bluetooth to transmit one or more files to his mobile device. Now, he can access her TABLO directly online through the software of the present invention, and she can update it as needed for an indefinite period of time, ensuring that he and all previously invited viewers will always see the up-to-date information. Thus, a TABLO is so flexible that it can substitute for a social media profile, being presented on the platform from a storage location hosted by the presenter but remaining accessible over the Internet or any other network. And, unlike a website, she has control over all of its structure and privacy options, and viewers can see both the page contents and the link hierarchies that relate the various pages together, telling a story in itself and revealing points of emphasis among the slides, and so on. She can keep her personal TABLO updated and can also get feedback and receive comments on her existing pages, updated pages, and other aspects of her unique visual discussion about herself, even being able to identify the viewing party from whom comments and feedback are received.

Dialogues, Improvisation, Personalization, and Immediate Visual Feedback from Participants:

A presenter can go in front of the audience without a planned story path for the presentation, but instead she has a slide data structure comprising the component concepts of the topic already laid out and linked together in a meaningful spatio-temporal arrangement, and said presenter can deliver an improvised narrative using that previously laid foundation. The drawing tool of FIGS. 7A-7C are especially useful here. This capacity is also useful in personal visual discussions wherein a presenting person may present a topic in a series of TABLOs each of which is personalized for one or more specific audience members. Personalization can be achieved, for example, by applying know personal identifying data comprising information about the receiving person, such as their age, occupation, social values, and so on. Automated methods for this procedure can also be programmed into a TABLO, where a recipient of the TABLO must first enter personal identifying information, or must respond to a series of preliminary interview questions, before entering the visual discussion space. In response to the recipient's entries, a different story map having a correspondingly designated personalized story path (or paths) is presented for that recipient, which may be different from that overlaid upon the slide data structure for another recipient.

This same flexibility also enables the invention to accommodate real-time visual discussions. Due to the visual power of the virtual graphical representation of the data structure, an unscripted dialogue takes place while images are selected on-the-fly and they presentation is able to keep pace with a conversation because the slide collection data structure is organized intelligently and comprises inherent meaningful information, so that any deviation from a planned story path is still logically structured and confined to meaningful data. This intelligent flexibility permits improvisation that dramatically improves the engagement and persuasiveness of a presentation, not only because images themselves are powerful, but because the presenter can summon these images in real-time from non-adjacent pages and paths to stay in lock-step with the interest and attention of the recipient, to show them what they want to see when they want to see it, without pausing in or exiting from the slide collection mode or other graphical environment of the presentation (e.g., while in the prior art there is a "presentation mode" that precludes improvisation and audiences tend to penalize presenters for deviating from their slide stack). Because the present invention does not distinguish between being in the virtual graphical environment in the visual discussion space from being in any special presentation mode, the stage area of the visual discussion space is a gapless extension of the presenter's mind that can be shared with others to create a highly engrossing visual discussion. In this sense, the invention can be described as a means for communicating with one or more persons through the rapid sequential presentation of pages from a logically organized arrangement of topically-related pages in a virtual graphical environment having a visual discussion space.

The Business Environment

Corporate management is increasingly inclined to favor dialogue during business presentations and meetings, and therefore they seek alternatives to the prior art presentation software platforms that only permit monologues and unilateral control over the content of a discussion by one presenter. The present invention satisfies these unmet needs because it accommodates rapid changes in topics and directions. One or more persons involved in the discussion can instantly navigate to a desired point in a slide collection via their own TABLO (if one has been provided to them by the presenter, and such access has been granted by the presenter), while others can view the trajectory and see exactly where the person has decided to take them in the story map, and what areas remain unexplored or closely related. Intricate slide collection data structures can maintain an organized structure to a dialogue while simultaneously permitting the discussion to veer off on an unlimited number of tangential paths or side routes. Although the presentation may move through the slide objects/pages via unpredicted or unplanned routes, everyone involved can visually understand where they are at any moment in relation to the starting point, the planned route, and the other branches of the story map data structure. Because a touch screen is preferentially used to conduct this navigation seamlessly, there is no delay or confusion caused in the pace and flow of the discussion when someone decides to change in directions or locations from within a story data structure. When a person has a question or a comment, they may see from an overview of the slide data structure where a certain slide object resides that is most relevant to their issue, and they may direct the viewer to it, thereby expressing themselves using the structure of the story map and efficiently identifying for the presenter, and everyone else involved, exactly what slide topic they are referencing with their comments. Furthermore, the visual content keeps pace with this moving dialogue; the visual content on the stage moves with the dialogue, and it does so on not just one display screen, but also on the individual displays of each participant, no matter how remotely located they may be. All of this power results from the novel paradigm by which the present invention both provides visual structure to and fluidity of navigation in a nonlinear slide collection data structure presented in a visual discussion space.

For example, in a first hypothetical business meeting scenario, a presenter stands before a group of executives in a meeting room about to deliver a live performance of a presentation of a TABLO that she has been constructing for several months, having included a variety of alternative story paths, layers, nodes, and interactive behaviors within a slide collection data structure comprising the master slide collection data file for this presentation topic, and which is saved in a presentation library in a menu-accessible folder accessed via at least one graphical user control button (e.g., the button identified as, for example, a means for accessing saved pages, stories, presentations, etc.). From within the runtime environment of the presentation software program of the invention, the presenter has the option to output some or all of the elements constituting her slide data structure in one or more of a portable TABLO file. Having already determined the most appropriate slide collection data structure to use as the interactive graphical representation that will be handled live in the visual discussion space during her talk, she then turns her attention to the other participants invited to the meeting, of which there are eight present and one more in the drivers seat of his vehicle stuck in gridlocked traffic twenty miles away.

The presenter announces that she has made the TABLO available for download from a secure website location wherein she has created a virtual room to host the media associated with the business meeting agenda, also including a means for file transfer/exchange between the presenter and each of the participants, and she announces the password and uniform resource locator enabling all participants to log in and download the TABLO file, to open and use it in a virtual graphical environment of an iteration of the presentation software platform running on the server and accessible via any preferred web browser of each participant using whatever personal digital device they prefer, ideally a tablet PC but alternatively a smart phone or hypervision glasses apparatus, and so on. For those participants who have their own installed versions of the software or its stand-alone Player/Viewer application, they may choose to open and explore the TABLO locally on their respective electronic devices. The missing participant in his vehicle has pulled into a parking lot and has downloaded the TABLO from the server to run it on his iPad. Four of the eight participants own personal copies of the full version of the presentation software program and they request to receive the file directly from the presenter's tablet, and she obliges via any file exchanging mechanism known in the arts, including but not limited to: file drop via Bluetooth/wifi/or via the apple airdrop feature. At the presenter's option, the presenter may choose to prevent the participants from using their graphical user interfaces while viewing the contents of the TABLO, or may limit them in their options, according to preferences that may be toggled at any time. But at first, the presenter has begun locking all of the distributed TABLOs into a slave mode and will not loosen her grip until she exits her introduction story path and enters the adjacent main story path which has a more complex geometric arrangement comprising multiple branches and parallel paths, each organized to represent a particular logical relation to the main narrative, but providing room for the participants to roam through alternative and ancillary slide objects and paths if interested in hearing more detailed and diverse information about a concept introduced upstream thereof. Meanwhile, she has included feedback-collection commands in the TABLO that record their every move.

Not only does this ability to limit and control access prevent the participants from becoming distracted by having too much freedom to move forward in time, but it also gives them adequate freedom to explore hierarchies and elaborations of concepts relevant to the instant segment of the performance, according to their interest. These interests can be recorded as feedback and returned to the presenter, which information comprises navigation histories, the amount of time spent in any particular position, area, data structure, or other "place" within the visual discussion space. Feedback data can be gathered and transmitted back to the presenter via various means as understood by persons of ordinary skill in the art of gathering personal identity and behavioral profile data about a person with their consent on an electronic device.

After completing the second part of her performance, the presenter wants to begin a third section where the visual discussion space will provide open access to the participants from each of their unique personal electronic devices and access permissions, where the presenter can authorize or revoke a participants permission to manipulate and/or edit the virtual graphical environment and/or slide collection data structure. Anytime the guy in his car wants to chime in, he can also do likewise by submitting a request to the presenter to connect via his smartphone.

Complementary Software Features of the Presentation Platform

The computer program product of the present invention is operable to cause a data processing apparatus to perform operations comprising the steps of: generating a graphical user interface comprising a plurality of control means for interacting with a slide collection; displaying a slide collection in the GUI, wherein the slide collection comprises a story map corresponding to a slide collection and at least one story data structure, said story data structure comprising at least one slide object and at least one story path; saving said data structures in a memory associated with the apparatus; generating slide object data structures, wherein a slide object comprises a container means for containing a plurality of slide contents and wherein said slide object also comprises a linking means; establishing links via said linking means, where said linking means comprises a means for designating one or more additional slide objects as being adjacently connected by a story link to said slide object; generating interactive graphical images representing said slide objects and story links in the GUI; and, providing at least one means for displaying and publishing the contents of slide objects, said means including the step of providing one or more of a means for generating a presentation output and one or more of a means for displaying said presentation output via the at least one output means of the system, wherein said presentation output constitutes a presentation of a visual discussion. Presentations may be live interactive display means for displaying a story map or slide collection, or they may be multimedia objects playable by third-party software, or they may be executable programs. In preferred embodiments, a presentation comprises at least one presentation control means for controlling at least one of a sequential order, a pace, and an audiovisual aspect of said presentation output of said presentation.

The invention also provides storage means for providing access to media in a media library, and for saving and organizing content in libraries. In preferred embodiments, a media library comprises one or more of a means for organizing, viewing, searching, and sorting a plurality of user-generated content, where user generated content is any data ranging from an element of slide content data, to a lone slide object, to an individual story path, to an entire slide collection and/or story map, to a TABLO for distribution and publishing comprising not only data but also logic encoding instructions about who can handle the data and how, and so on.

The methods of the present invention may further comprise means for instructing the linking means to assign one or more classification values to a story link, where said classification values describe the unique geometry and behavior of each story link in a data structure. A direction value parameter may correspond to the orientation of the link in a virtual Cartesian coordinate grid, wherein said coordinate grid represents the arrangement of one or more of the slide objects within the story data structure and its graphical representation in the visual discussion space of the platform. This may also comprise the creation of pointing means for identifying an adjacent slide object in said story data structure, and orienting means for specifying a relative position of an adjacent slide object in said story data structure. Furthermore, the invention may provide means for integrating a navigation control object into the GUI such that the frame and perspective of the view of the stage can be altered by manipulating handles or other objects on the graphical control object(s) of the navigation means. In preferred embodiments, this perspective view is analogized to the view through a virtual camera looking into the virtual discussion space, and the positions of the camera can be moved, particularly moved by manipulation of the graphical control object(s) of the navigation means. Additionally, the method provides for the incorporation of an identical or analogous navigation means into TABLOs for use with a media player or TABLOs published as an object on a website on the Internet.

Preferred embodiments of the systems and methods of the present invention also include a means for providing a sharing mode, said sharing mode comprising one or more of a means for publishing, viewing, and acquiring user-generated content hosted on one or more third party platforms, said platforms comprising social media, creative forums on the Internet, and web-based publishing services. Likewise, the invention provides a commercial transaction mode comprising one or more of a means for buying, selling, and licensing one or more of said user-generated content. A commercial transaction mode may further comprise methods and means for enabling parties to advertise, discuss, provide, and request the provision of one or more of said user-generated content from other parties.

In preferred embodiments of the commercial transaction mode, a computer-implemented business method enables one or more users to create, manage, and publish non-linear slide-based presentations, said business method comprising the steps of providing the presentation program of the present invention, providing a conditional access means for enabling one or more of a registered user to access and use said presentation program, providing a means for executing financial transactions among said registered users. In the preferred embodiment, the presentation program is hosted on a server and registered users accesses said program on said server over a network, such as via the Internet or via a dedicated application on a computing device. Various steps for earning revenue are provided in the system for the business method, including but not limited to: charging one or more of a usage fee to the registered user, wherein said usage fee corresponds to at least one usage parameter, wherein said usage parameter comprises any of a type of the program feature used by the user on the platform, a time duration of a user's activity on the platform, and a quantity of the user-generated content produced by the registered user of the presentation program, and the like.

The Computing Environment

The invention is adapted to operate on the various personal electronic devices known in the art comprising the Apple iOS, Android, Microsoft Mobile OS and browser based operating systems and machines, and the like. Standard processes known in the art integrate the software of the present invention with all types of video projection screens, monitors, and output devices for publishing, transmitting, displaying, and performing multimedia content. In a preferred embodiment, the software application runs on an Apple iOS iPad tablet computer. Upon opening the application, a graphical user interface launches.

Generally, program modules and features include routines, programs, components, data structures, and other types of logic that perform particular tasks. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices. Embodiments of the invention also include one or more background applications or functions which serve as "plug-ins" and cross-platform commands such as when surfing the web or viewing media so that content data can be downloaded directly into the media libraries of the invention from sources outside the presentation program of the invention.

Local presentations (also referred to herein as in-person presentations) may rely upon a single tablet PC for the purposes of running the presentation program and sending audiovideo output to the output means displaying the content to the audience. Alternatively and additionally, any other hardware or networked-based presentation means may be utilized to present audiovideo output to the audience as would be known to persons of ordinary skill in the art. The live audience is often located in a common area, such as a common room, which is also occupied by the presenter and in which the audience can view a display which displays the electronic presentation. Embodiments of the present invention provide a network-based content management system (CMS). Embodiments of the present invention provide for a software platform to run via a website and for broadcast over a digital data network to a large number of individuals. Embodiments of the present invention provide for a software platform to run on a website, the website being run on multiple mobile devices. For example, the website and thus the software platform embodiments of the present invention are run using HTML5 allowing for cross-platform performance. Embodiments of the present invention provide a platform allowing for linking, associating, and/or embedding one or more social platforms. Embodiments of the present invention provide a nonlinear presentation slide platform which allow for embedding of videos from a different platform, e.g., YouTube, Vimeo, storage medium, cloud. Embodiments of the present invention provide a nonlinear presentation slide platform which allow for dynamic and/or static linking, associating, and/or embedding material or feeds from a storage medium or social platform. Such material and feeds can include photos, RSS feed(s), feeds from Tweets, photos and/or videos from Flickr, material from online or harddrive accounts or other electronic storage locations, videos, links from blog(s), and other embeddable/linkable/as sociable files.

Embodiments of the present invention can be hosted on a remote server or device, a cloud, or a personal server or device. Embodiments of the present invention can be downloaded onto a personal device, e.g., a laptop computer or storage medium. One embodiment according to the present invention includes a server, such as a web server, and any number of end users coupled to a network, such as the Internet, thereby allowing users to remotely, via any number of different computing devices create, edit and share presentations and other documents. Embodiments of the present invention may include or be compatible with a multimedia authoring program which provides movie authoring tools such as those commonly known in the art that enable users to create controls, menu and submenu screens for enabling viewers to navigate contents of a published slide presentation independently of the presenter (e.g., as when a slideshow has been published or shared on the Internet). The invention supports all known multimedia formats, such as HTML5, WMV, MPEG, AVI, mp4 and .mov with H.264 video and Advanced Audio Coding (AAC) audio, and high-definition content, and it includes built-in codecs so many file formats work inside the invention. A network may comprise the internet, a cellular network, a local area network, wireless networks and any other networking means known in the relevant arts; a network may comprise multiple IP-connected devices which can establish a connection with a router, such as via a wireless communication protocol. IP connected devices may include mobile phones, personal computers, tablet devices, laptops, and any other electronic devices.

TABLE 1

Alphanumeric List of Features (a) slide object
(b) slide collection
(c) story paths
(d) story links
(e) presentation of a story
(f) logic encoding linking means
(g) graphical user interface
(h) means for navigating
(i) means for distributing
(j) stand-alone Viewer/Player module
(k) means for collecting and recording feedback
(l) TABLO
(m) annotations and presenter notes
(n) graphical representation of the slide collection
(o) link descriptors
(p) navigation controls and commands
(q) logic for resolving conflicts
(r) navigation control means
(s) business methods
(t) problem-solving means
(u) classifiers
(v) plug-ins

TABLE 2

Numerals of the Drawings

10: slide collection mode, which is a type of visual discussion mode
11: GUI
12: stage; visual discussion space
13: slide collection data structure
14: pages; slide objects
15: story links
16: blank
17: story map
18: story data structure
19: blank
20: control means
21: control panel top
22: control panel right side
- - -
40: slide contents
41: container means
42: linking means
43: user generated content
44: blank
45: speaker notes feature/mode
46: annotations panel
47: slide notes
48: set of speaker notes
49: blank
50: navigation means
51: compass control object
52: arms x
53: arms y
54: filled arm
55: unfilled arm TABLE 2-continued Numerals of the Drawings 56: position indicating means (punctae)
57: horizontally aligned set
58: vertically aligned set
59: handle feature
60: touch screen
61: presenting or master device
62: tablet PC
63: smartphone
64: personal computer
65: laptop
- - -
70: media library
71: library panel
72: full page library view
- - -
80: line path mode
81: line path data structure
82: overlay nodes
83: intervening nodes
84: blank
85: story map editing mode
86: hatched circles; break link object
- - -
90: hub mode
91: hub and spoke data structure
92: overlay nodes
93: placeholder slide
94: placeholder position
95: delete mode
96: shaded lines
- - -
100-199: example pages/slide objects
- - -
200: blank; control objects/buttons
201: view
202: titles
203: slide editing
204: media
205: line path
206: hub path
207: pencil tool
208: edit button
209: OK
210: delete
211: annotations It should be emphasized that the above described embodiments of the present invention exemplify some, but not all, possible implementations of the present invention and have been set forth in order to provide a clear understanding of its qualities. Those skilled in the art will appreciate that the conception upon which this disclosure is based may readily be utilized as a basis for designing of other structures, methods, and systems for carrying out the several purposes of the present invention. The following claims should be regarded as encompassing equivalent and various constructions insofar as they do not depart from the spirit and scope of the methods and devices consistent with the present invention.

What is claimed is:

1. A system for making and using non-linear slide-based multimedia presentations runnable upon a computing apparatus having at least one processor, said system comprising:
a graphical user interface having a selectable slide collection displayable thereon, said slide collection including at least one slide object, said slide object movably selectable into a plurality of relative location arrangements;
at least one container delimited within the at least one slide object, said at least one container controllable for containing, accessing, and displaying slide content data sourced remotely for interaction at the at least one slide object;

relative links automated to determine each at least one slide object by each relative location disposed within the slide collection, said links effective by user selection and manual reposition of any of the at least one slide objects into said relative location arrangements, said relative location arrangements defining a story map;

at least one story path comprising adjacently designated slide objects navigable through the story map; and wherein said relative links automate designation of one or more additional slide objects as being adjacently connected by a story link to said slide object;

a slide collection mode, wherein the slide collection comprises a story map corresponding to one or more of a story data structure, said story data structure comprising at least one slide object and at least one story path;

wherein the at least one story path comprises a contiguous series of linked slide objects, such that a first slide object is contiguously connected by one or more intervening story links to a last slide object, and wherein said story map comprises an interactive graphical representation of said story data structure such that each of said slide objects and each of said story links is represented by a corresponding page image and a corresponding story link image, respectively, and such that at least one user is enabled to functionally interact with said story data structure an interactive visual discussion space for portraying the interactive graphical representation of said story data structure at least one of an embedded media library, said media library enabling user control of slide object data for organizing, viewing, searching, and sharing at least one user-generated content.

2. The system of claim 1, wherein said relative links assign one or more link descriptors to any slide objects linked thereby, wherein said link descriptor comprises at least one direction value parameter corresponding to a directional orientation of the link in a coordinate grid having a plurality of coordinate axes, each of said plurality of coordinate axes corresponding to each of a plurality of directions, said directions comprising at least an x-axis-dimension and a y-axis-dimension, within said coordinate grid.

3. The system of claim 1, further comprising a navigation control enabling selection and repositioning of each at least one slide objects in the story map, wherein said navigation control comprises a graphical control object resembling a compass having arms extending in a plurality of directions, said directions corresponding to each of the plurality of coordinate axes within said coordinate grid.

4. The navigation control of claim 3, further comprising a graphical position-indicator whereby at least one depth parameter pertaining to a relative location of an active slide object is determinable among a plurality of other slide objects arranged along any of said directions within said coordinate grid.

5. The navigation control of claim 4, wherein said graphical position-indicator comprises a linear series of punctae wherein a quantity of said punctae in said linear series indicates a value of said depth parameter and a fill status of any of said punctae in said linear series indicates said relative position of the active slide object within said coordinate grid.

6. The navigation control of claim 5, wherein a first linear series of punctae is depicted in association with a second linear series of punctae, such that the depth parameter of a first dimension is depicted near the depth parameter of a second dimension, respectively.

7. The system of claim 1 wherein a user is enabled rapid page creation for capturing informative data derived from a source outside of the platform of the invention whereby a quantum of said captured informative data is automatically converted into the slide content of a newly generated slide object.

8. The system of claim 1 further comprising at least one commercial transaction mode, said commercial transaction mode enabling buying, selling, and licensing one or more of said user-generated content.

9. The commercial transaction mode of claim 8 further comprising a forum hosted on a network wherein one or more forum participants may advertise, discuss, provide, and request the provision of, one or more of said user-generated content.

10. The system of claim 1 further comprising a web browsing mode whereby informative data derived from a source on the Internet is discoverable, and displayable as a depiction of a web browser panel in the graphical user interface.

11. The system of claim 1 further comprising touch-responsive input and data manipulation.

12. The system of claim 1 further comprising at least one problem-solving hierarchy for solving a data structure conflict arising from a rearrangement of one or more of said slide objects within said story map, wherein said rearrangement comprises any of moving, adding, and deleting said one or more of said slide objects.

13. The problem-solving hierarchy of claim 12 wherein at least one placeholder slide object is automatically generable into a placeholder position in response to user manipulation of any one story path.

14. The problem-solving hierarchy of claim 12 further comprising a conflict-resolution routine for assisting the user in making a decision in order to circumvent the data structure conflict, wherein said conflict-resolution routine comprises a method comprising the steps of:

displaying at least one alert message to a user informing the user of the conflict caused by said rearrangement;

presenting the user with at least one selectable option for circumventing said conflict;

receiving an input from the user identifying a user-selected option from among said at least one selectable option; and, directing an application of the system to execute one or more instructions impinging upon the story map, said instructions corresponding to the user-selected option, thereby circumventing the data structure conflict.

15. The system of claim 1 further enabling audience participation in the visual discussion by dissemination of at least the graphical user interface of the system and the visual discussion space of a presentation output to one or more peripheral electronic devices.

16. The system of claim 15 enabling audience participation and provision of feedback data from one or more of a participating audience member.

17. The system of claim 15 enabling audience participation for integrating feedback data into the slide collection.

18. The system of claim 1 wherein said program features further comprising at least one annotation mode, said annotation mode enabling receipt and storage of at least one quantum of text data that corresponds to a particular slide object in a particular story path, and display of a set of speaker notes comprising a plurality of said quantum of text data in association with a particular story map.

19. A computer-implemented business method for providing a platform on which one or more users may create, manage, and publish non-linear slide-based multimedia presentations, the method comprising the steps of:
   providing the system for making and using non-linear slide-based multimedia presentations of claim 1;
   providing conditional access for enabling at least one authorized user to access and use said system; and,
   enabling financial transactions by said at least one authorized user, and assigning a price value to a plurality of goods and services provided to said authorized user; and
   enabling generation of a fee on behalf of an owner of the platform assessable to said authorized user for one or more uses of the system, thereby generating revenue for the owner.

20. The method of claim 19, wherein said system for making and using non-linear slide-based multimedia presentations is hosted on a server and wherein said authorized user accesses said program on said server via a network.

21. The method of claim 19, wherein said fee corresponds to at least one usage parameter, wherein said usage parameter comprises a measure of use by the user of any of said program features.

22. A system enabling computer-implemented visual discussions of any topics among one or more human users, the system comprising:
   at least one touch-responsive input for enabling a presenter to interact with a graphical user interface comprising a plurality of control means for managing a slide collection, said slide collection comprising one or more slide objects, wherein each of said slide objects comprises a container for accessing and displaying a plurality of slide content data;
   a story link, automatically generable between slide objects to designate one or more additional slide objects as being adjacently connected and designated into a particular story path; and
   a visual discussion space maintained within the graphical user interface operable by action of a multidimensional coordinate grid; and,
   an interactive graphical representation of the slide collection maintained within the visual discussion space;
   a geometric simulation of a data structure corresponding to the slide collection, which simulation accurately and proportionally recapitulates a plurality of spatiotemporal relationships among the slide objects and each story link of the data structure, whereby superimposition of each of said slide objects and each associated story link upon the coordinate grid of the visual discussion space displays one page for each slide object, whereby every story link is portrayed by a story link image connecting two pages;
   wherein said page comprises a page image representing the slide content data of a corresponding slide object, said page image automatically generable from slide objects; and,
   a graphical navigation control for navigating among the pages and story links of the interactive graphical representation of the slide collection in the visual discussion space, said navigation control means comprising a graphical control object resembling a compass whereby at least two distinct forms of narrative information are displayable simultaneously, said forms of narrative information comprising:
      a first direct form conveyed by the sequentially displayed pages of one or more of a story path;
      a second inherent form conveyed by said accurately and proportionally recapitulated geometric simulation;
   sharable user access for view and interaction with one or more slide objects and/or features of the visual discussion space; and
   rapid page generation by capture of narrative data contributed by one or more of said users for automatically convertible into a quantum of said captured narrative data and displayable in the slide content data of one or more slide objects.

23. The system of claim 22 wherein said at least one other person is enabled to view and interact with the at least one slide object and one or more features of the visual discussion space in the virtual graphical environment via a peripheral device.

24. The system of claim 22 enabling acquisition of feedback data from said at least one other person wherein said feedback data is integratable into the slide collection for concurrent display.

* * * * *